United States Patent
Kato et al.

(10) Patent No.: US 10,051,546 B2
(45) Date of Patent: Aug. 14, 2018

(54) COMMUNICATION CONTROL METHOD AND MOBILE TERMINAL

(71) Applicant: TOHOKU UNIVERSITY, Sendai-shi, Miyagi (JP)

(72) Inventors: Nei Kato, Sendai (JP); Hiroki Nishiyama, Sendai (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 56 days.

(21) Appl. No.: 15/321,395

(22) PCT Filed: May 29, 2015

(86) PCT No.: PCT/JP2015/065565
§ 371 (c)(1),
(2) Date: Dec. 22, 2016

(87) PCT Pub. No.: WO2016/002404
PCT Pub. Date: Jan. 7, 2016

(65) Prior Publication Data
US 2017/0164264 A1 Jun. 8, 2017

(30) Foreign Application Priority Data
Jul. 1, 2014 (JP) .................................. 2014-136232

(51) Int. Cl.
*H04W 40/14* (2009.01)
*H04L 12/733* (2013.01)
(Continued)

(52) U.S. Cl.
CPC ........... *H04W 40/14* (2013.01); *H04L 45/122* (2013.01); *H04W 4/06* (2013.01); *H04W 8/005* (2013.01); *H04W 84/18* (2013.01); *H04W 88/04* (2013.01)

(58) Field of Classification Search
CPC ....... H04W 40/14; H04W 4/06; H04W 8/005; H04W 84/18; H04W 88/04; H04L 45/122
See application file for complete search history.

(56) References Cited

U.S. PATENT DOCUMENTS 6,907,257 B1 6/2005 Mizutani et al.
2015/0334555 A1* 11/2015 Seo ....................... H04W 84/18
370/254

(Continued)

FOREIGN PATENT DOCUMENTS

JP 2001-156787 A 6/2001

OTHER PUBLICATIONS

Jan. 3, 2017 International Preliminary Report on Patentability issued in International Patent Application No. PCT/JP2015/065565.
(Continued)

*Primary Examiner* — Jenee Holland
(74) *Attorney, Agent, or Firm* — Oliff PLC

(57) ABSTRACT

In a communication control method and a mobile terminal it is possible to realize multi-hop communication having three or more hops in a routing system based on a star-type network connection topology which is more efficient than conventional table drive-type and storage transfer-type routings. An operation of relaying transfer data stored within a mobile terminal before the dissolution of s group to a mobile terminal which newly becomes a group fellow from the outside of the group is repeated any number of times by the repeated execution of the dissolution/reconfiguration of the group. Consequently, it is possible to realize multi-hop communication for relaying and transferring the transfer data even if the upper limit (two hops) of the number of relay hops in a star connection-type system is exceeded.

15 Claims, 22 Drawing Sheets

(51) Int. Cl.
*H04W 4/06* (2009.01)
*H04W 8/00* (2009.01)
H04W 88/04 (2009.01)
H04W 84/18 (2009.01)

(56) References Cited

U.S. PATENT DOCUMENTS

2015/0382252 A1* 12/2015 Yu .................. H04W 8/005
 370/331
2016/0128116 A1* 5/2016 Kim ................. H04W 76/14
 370/329

OTHER PUBLICATIONS

Aug. 18, 2015 International Search Report issued in International Patent Application No. PCT/JP2015/065565.
Junpei Kuroiwa et al; "Stable Clustering for Group Mobility in Mobile Ad-Hoc Networks;" Dai 19 Kai Multimedia Tsushin to Bunsan Shori Workshop; Information Processing Society of Japan; Oct. 2010; pp. 1-6.
Hideya Ochiai et al; "Topology Change Tolerant Routing for Delay Tolerant Networks;" Information Processing Society of Japan; Sep. 2009; vol. 50; No. 9; pp. 2312-2326.
Masato Tsuru et al; "Delay Tolerant Networking Technology—The Latest Trends and Prospects;" DTN; 2011; No. 16; pp. 57-68.
Anders Lindgren et al; "MobiHoc Poster: Probabilistic Routing in Intermittently Connected Networks;" Mobile Computing and Communications Review; 2003; vol. 7; No. 3; pp. 19-20.

* cited by examiner

Stable WiFi Ad Hoc mode Link

DTN Link with WiFi Ad Hoc mode

Fig.8
(a)
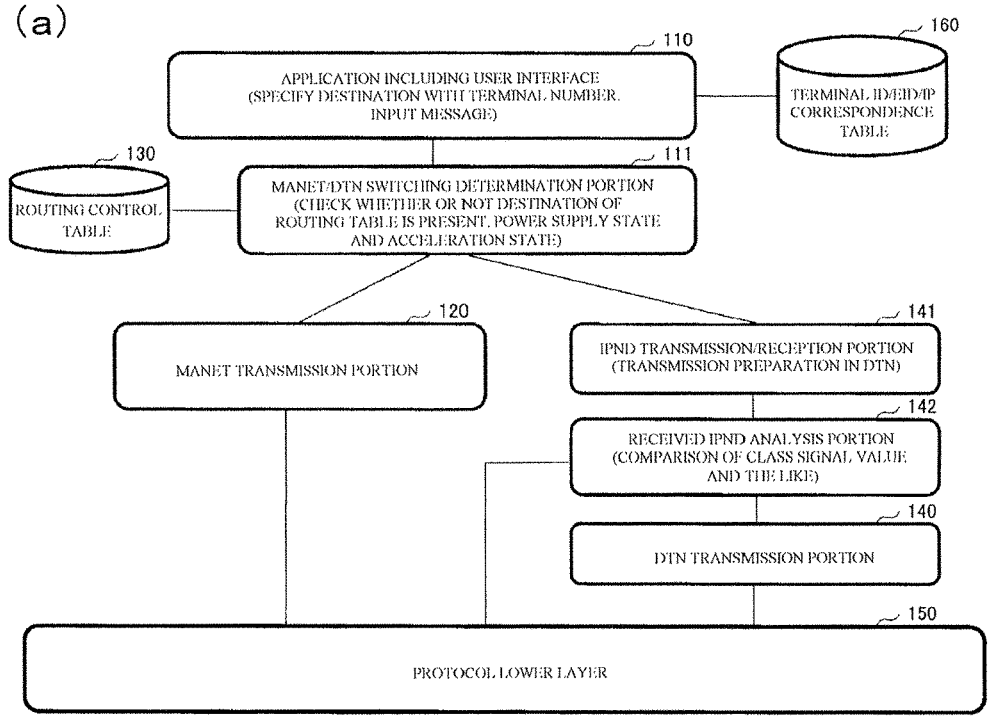
(b)
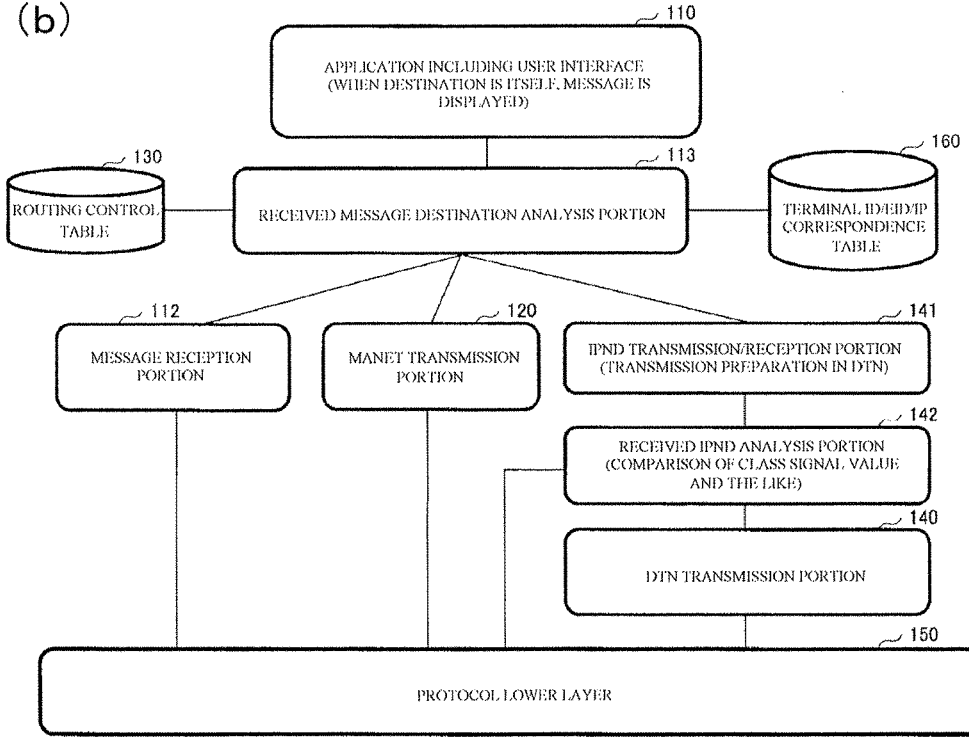

Fig.27

| LABEL | DESCRIPTION OF STATE CHANGE TRIGGER PHENOMENA |
|---|---|
| A | PRESENT TERMINAL IS TERMINAL (UNPARTICIPATED TERMINAL) WHICH DOES NOT PARTICIPATE IN ANY TERMINAL GROUP, AND PRESENT TERMINAL RECEIVES GROUP PRESENCE NOTIFICATION BEACON TO DETECT THAT TERMINAL GROUP CAPABLE OF BEING PARTICIPATED IN IS PRESENT ADJACENT THERETO. |
| B | PRESENT TERMINAL IS TERMINAL (UNPARTICIPATED TERMINAL) WHICH DOES NOT PARTICIPATE IN ANY TERMINAL GROUP, AND PRESENT TERMINAL DOES NOT RECEIVE AT ALL GROUP PRESENCE NOTIFICATION BEACON DURING TIME-OUT PERIOD TO RECOGNIZE THAT TERMINAL GROUP CAPABLE OF BEING PARTICIPATED IN IS NOT PRESENT ADJACENT THERETO. |
| C | PRESENT TERMINAL IS SELECTED AS PARENT NODE (GO) BY MUTUAL SELECTION BASED ON INTENT VALUE BETWEEN TERMINALS (UNPARTICIPATED TERMINALS) WHICH DO NOT PARTICIPATE IN ANY TERMINAL GROUP. |
| D | AT LEAST ONE CHILD NODE TERMINAL IS WIRELESSLY CONNECTED TO PRESENT TERMINAL BEING OPERATED AS PARENT NODE (GO) TO FORM NEW GROUP HAVING PRESENT TERMINAL AS PARENT NODE (GO). |
| E | ALL UNPROCESSED COMMUNICATION REQUESTS WITHIN EXISTING TERMINAL GROUP ARE PROCESSED, AND THUS ACTIVITY OF COMMUNICATION WITHIN TERMINAL GROUP IS EXHAUSTED. |
| F | BEFORE DISSOLUTION OF EXISTING TERMINAL GROUP, PROCESSING FOR SELECTING, BASED ON INTENT VALUE, TERMINAL WHICH NEWLY BECOMES PARENT NODE WITHIN EXISTING TERMINAL GROUP IS STARTED. |
| G | IN PROCESSING FOR SELECTING, BASED ON INTENT VALUE, TERMINAL WHICH NEWLY BECOMES PARENT NODE WITHIN EXISTING TERMINAL GROUP, PRESENT TERMINAL IS NOT SELECTED AS PARENT NODE (NEW GO). |
| H | IN PROCESSING FOR SELECTING, BASED ON INTENT VALUE, TERMINAL WHICH NEWLY BECOMES PARENT NODE WITHIN EXISTING TERMINAL GROUP, PRESENT TERMINAL IS SELECTED AS PARENT NODE (NEW GO). |
| I | PRESENT TERMINAL IS WIRELESSLY CONNECTED TO ADJACENT TERMINAL GROUP DETECTED BY PRESENT TERMINAL TO PARTICIPATE IN PRESENT TERMINAL GROUP. |
| J | TERMINAL WHICH IS BEING OPERATED AS PRESENT NODE (GO) WITHIN EXISTING TERMINAL GROUP IS CHANGED FROM STILL MODE TO HIGH MOBILITY MODE, AND THUS PRESENT TERMINAL SUDDENLY STOPS OPERATION AS PARENT NODE (GO), WITH THE RESULT THAT PRESENT TERMINAL GROUP NEEDS TO BE TEMPORARILY DISSOLVED. |
| K | PRESENT TERMINAL IS NOT SELECTED AS PARENT NODE (GO) BY MUTUAL SELECTION BASED ON INTENT VALUE BETWEEN TERMINALS (UNPARTICIPATED TERMINALS) WHICH DO NOT PARTICIPATE IN ANY TERMINAL GROUP. |

Fig.28

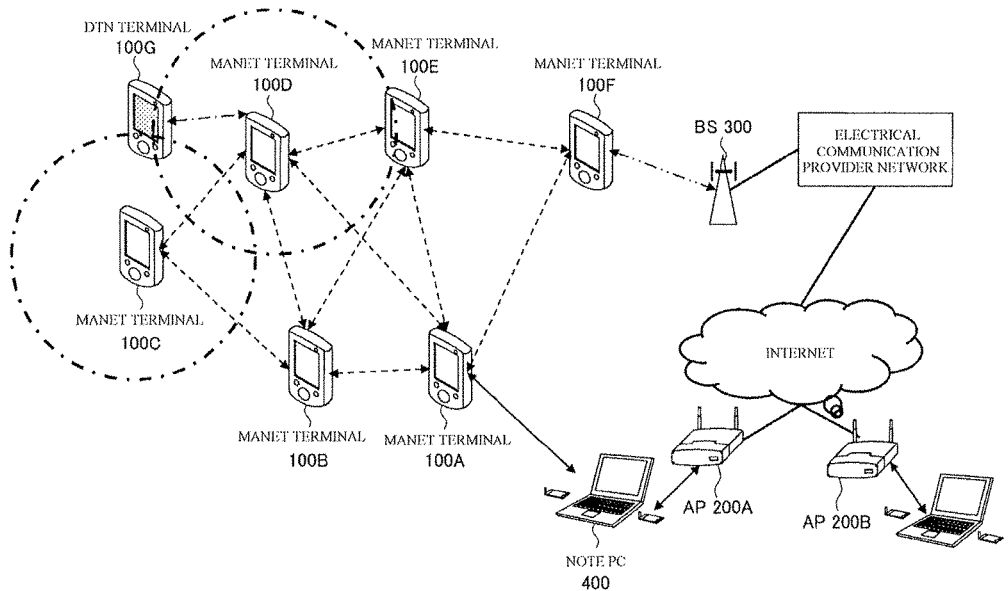

Fig.29
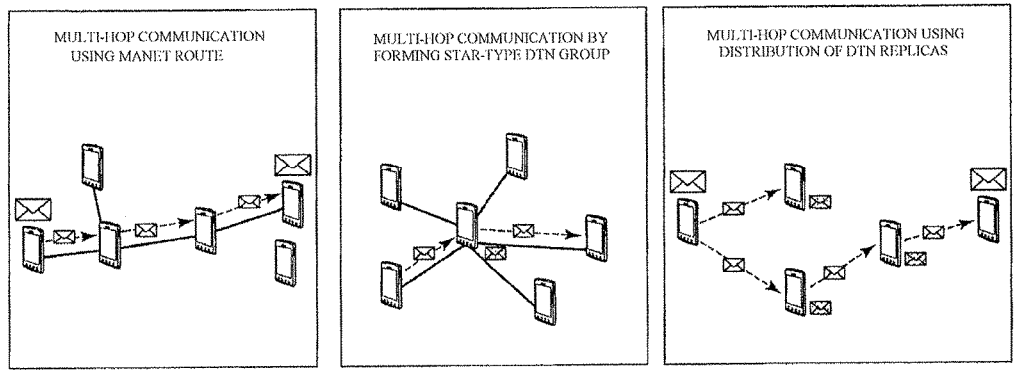
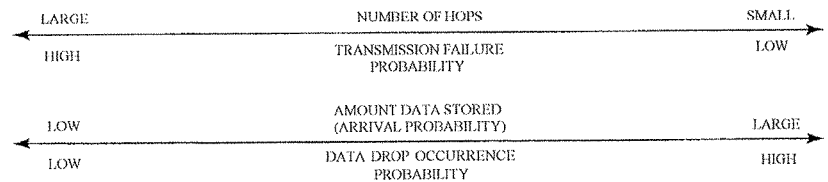
Fig.30
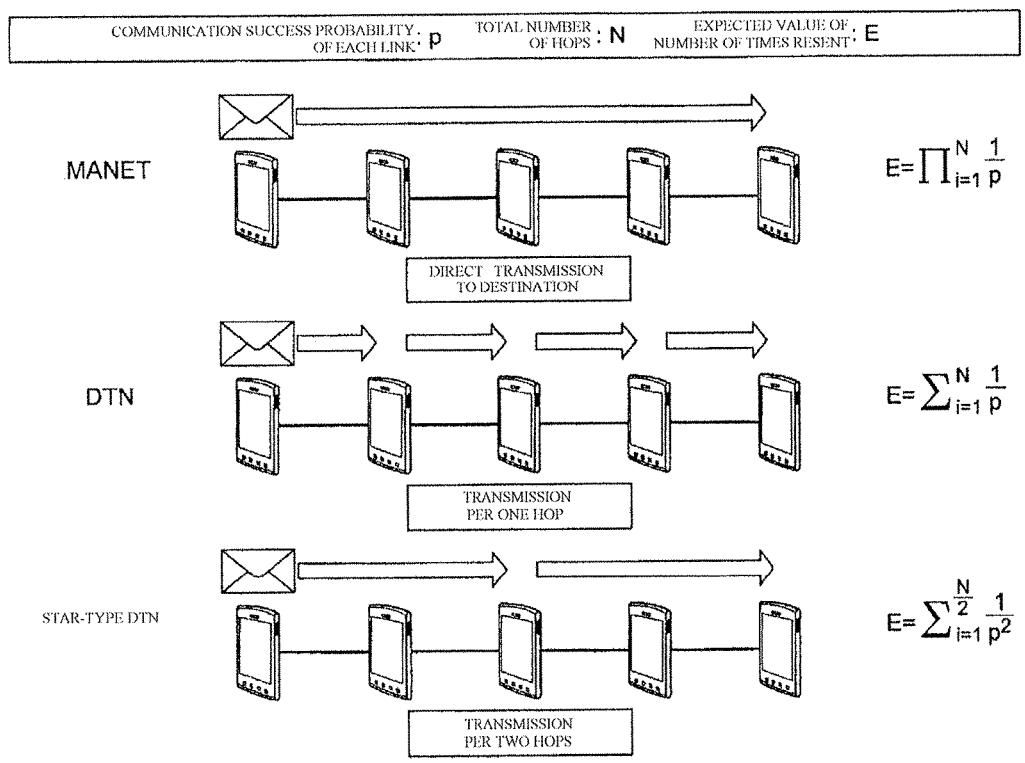

COMMUNICATION CONTROL METHOD AND MOBILE TERMINAL

TECHNICAL FIELD

The present invention relates to a novel packet relay control system between mobile terminals, and more specifically, relates to a communication control method of the packet relay control system which is performed between mobile terminals in order to improve reliability and efficiency when End-To-End communication is performed between mobile terminals without the intervention of a wireless access point and to a mobile terminal.

BACKGROUND ART

In recent years, for example, a technology, such as a wireless ad-hoc network, for performing End-To-End communication between mobile terminals without the intervention of a wireless access point has been known. Realization systems which are presently and widely known on packet relay control for performing End-To-End communication between mobile terminals without the intervention of a wireless access point are broadly divided into a "table drive type (see, for example, Non Patent Literatures 1 and 2 below)" and a "storage transfer type (see, for example, Non Patent Literatures 3 and 4 below)".

In the storage transfer-type packet relay system described above, a relay mobile terminal storing data is in a state where it can simultaneously and wirelessly communicate with two or more adjacent mobile terminals, and when the relay mobile terminal has the two or more mobile terminals as adjacent nodes, in order to enhance a probability that the data reaches a final destination, a routing control system described below is adopted. Specifically, a data relay operation in which each relay mobile terminal storing data transfers a plurality of copies of data to a plurality of adjacent nodes is sequentially repeated, and thus a large number of copies of data are spread between mobile terminals which can communicate with each other. The mechanism of such data spread is known as infection-type routing control (Epidemic Routing), estimation-type routing control (Estimation Routing), coding-type routing control (Coding Routing) or the like (see for example, Non Patent Literatures 9 to 11 below).

A "star connection-type packet relay system" disclosed in Non Patent Literatures 5 to 8 is an improved-type system in which in the storage transfer-type packet relay system described above, communication between mobile terminals is controlled in units of a terminal group. In the star connection-type packet relay system, in each terminal group, around a group owner (GO: Group Owner) serving as a parent node terminal, one or more mobile terminals serving as child node terminals perform wireless connection so as to form a star-type network connection topology.

As described above, in the wireless network environment for performing communication between mobile terminals without the intervention of the wireless access point, it is expected that in the future, a wide variety of packet relay systems are used to operate the network. The wide variety of packet relay systems described above include the table drive type, the storage transfer type and the like, and in the storage transfer-type system, as a routing control system for relaying and transferring packets, various systems such as the infection-type routing control (Epidemic Routing), the estimation-type routing control (Estimation Routing) and the coding-type routing control (Coding Routing) are used.

Consequently, it is also expected that in the future, in the wireless network environment described above, in order to seamlessly realize packet relay control on transfer data between mobile terminals, the network is operated in the form in which mutual cooperative operations are performed between different packet relay control systems. It will be necessary that each of the mobile terminals which relay and transfer data be continue a packet relay operation while switching to an appropriate packet relay control system according to the change in conditions (for example, the stability of a wireless channel state, terminal mobility and a terminal density within an adjacent area) under which the terminal is placed.

Even if in the wireless network environment described above, the various packet relay systems described above are appropriately used according to the conditions or are used by being combined, the following problems are still present. In other words, a problem in the reachability of communication, a problem in the scalability of a communication capacity, a problem in the efficiency of communication and a problem in the optimization of the efficiency of the consumption of power in a terminal caused by the systems are not solved. Specifically, the problems are as follows.

(1) In the table drive-type relay system, when the mobility of each mobile terminal is increased, and a wireless channel state between mobile terminals becomes unstable, the topology of the entire network becomes unstable, with the result that a packet arrival failure rate in the End-To-End is rapidly increased. In other words, in the table drive-type relay transfer system, the End-To-End communication route becomes very unstable.

(2) In the table drive-type relay system, routing information is constantly exchanged between a plurality of mobile terminals, and thus terminal batteries are remarkably consumed or the communication capacity is reduced.

(3) In the storage transfer-type relay system, in the data transfer of the End-To-End, a communication delay occurs randomly and without limitation. Moreover, in the storage transfer-type packet relay transfer system in which the End-To-End communication route is not determined until the packet reaches the final destination, it is impossible to guarantee the arrival of the packet in the End-To-End regardless of whether or not the communication state is satisfactory.

(4) When the amount of communication relayed and transferred exceeds the upper limit of the communication capacity which can be supported according to the buffer-memory capacity on each relay terminal, since transfer data overflows from the buffer-memory, in the storage transfer-type packet relay transfer system, a drop in the relay transfer data can be produced.

(5) As a routing control system adopted by the storage transfer-type system, the system illustrated above such as the infection-type routing control (Epidemic Routing), the estimation-type routing control (Estimation Routing) or the coding-type routing control (Coding Routing) has the following problems. Specifically, in these routing control systems, the probability that data reaches the final destination can be increased whereas a very large number of data transfers are produced simultaneously and in parallel between a large number of relay mobile terminals within the network, and thus the efficiency of the communication and the efficiency of the terminal power consumption are lowered.

As the point that is common to the problems (1) to (5) described above, as the number of hops in the End-To-End communication route from the transmission source terminal to the final destination terminal within the wireless network is increased, the following problems are more likely to occur. Specifically, disadvantageously, when a table drive-type relay system is used, as long as a wireless channel state within a wireless network and a radio wave condition are not maintained to be ideal, the period during which the communication route is stably present is shortened, and the probability that the communication route is stably maintained is lowered. Moreover, disadvantageously, when a storage transfer-type relay system is used, as the number of hops in the End-To-End communication route is increased, the probability that the packet reaches the final destination is lowered, with the result that a communication delay time necessary for the arrival is increased.

On the other hand, in the "star connection-type relay system" described above, due to the following reasons, most of various problems on the table drive type and the storage transfer type which are examined as described above are overcome.

In the "star connection-type relay system", the topology of the entire network is simplified into a very simple star-type topology. Hence, in this system, not only relay transfer control on the packet performed on the mobile terminal is simplified but also the processing burden of packet relay transfer control by a CPU on the mobile terminal is reduced. Furthermore, in this system, it is possible to significantly reduce the number of times a message is transmitted and received which is necessary for sharing data between mobile terminals within a terminal group as compared with the "table drive type" and the "storage transfer type". Consequently, when the mobile terminals within the terminal group share data, the terminal power consumed by each of the mobile terminals within the terminal group can be saved. The advantage described above is not limited to the "star connection-type relay system" but is common to a relay system in which a large number of mobile terminals are grouped into terminal groups and in which packet relay transfer is performed by communication between the terminals within each of the terminal groups. In the following description, the relay system in which, as described above, a large number of mobile terminals are grouped into terminal groups and in which terminal-to-terminal communication is performed within each of the terminal groups is referred to as the "relay system based on the terminal group".

In the "relay system based on the terminal group" described above, the End-To-End communication route from the transmission source terminal of the packet to the final destination terminal is not extended beyond the outer edge of the terminal group to which the transmission source terminal belongs. Specifically, the number of hops in the End-To-End communication route depends on the size of the terminal group to which the transmission source terminal belongs, and the size of the terminal group refers to the maximum value of the number of hops in the communication route from a child node terminal located on the outer edge of the terminal group to a GO which is a parent node.

In the "relay system based on the terminal group", it is possible to appropriately select the size of the terminal group according to a wireless channel state and a radio wave condition within the adjacent area around the transmission source terminal and the presence density and the condition of the geographical arrangement of other mobile terminals. Hence, the size of the terminal group is appropriately selected according to the conditions as described above, and thus it is possible to appropriately restrict the upper limit of the number of hops in the End-To-End communication route according to the conditions. Consequently, it is possible to avoid the above-described problems caused by increasing the number of hops in the End-To-End communication route.

Hence, in the wireless network environment in recent years, as a packet relay system which can solve the problems in the scalability of the communication capacity, the efficiency of the communication, the optimization of the efficiency of the consumption of terminal power and the stability of the End-To-End communication route that are found in the "table drive-type" and "storage transfer-type" systems, the "relay system based on the terminal group" is regarded as promising.

CITATION LIST

Non Patent Literature

Non Patent Literature 1: RFC3626 "Optimized Link State Routing Protocol (OLSR)" Internet Engineering Task Force, October 2003

Non Patent Literature 2: RFC3561 "Ad hoc On-Demand Distance Vector (AODV) Routing" Internet Engineering Task Force, July 2003

Non Patent Literature 3: RFC4838 "Delay-Tolerant Networking Architecture" Internet Engineering Task Force, April 2007

Non Patent Literature 4: RFC5050 "Bundle Protocol Specification" Internet Engineering Task Force, November 2007

Non Patent Literature 5: Wi-Fi Direct, http://www.wi-fi.org/discover-and-learn/wi-fi-direct, Wi-Fi Alliance.

Non Patent Literature 6: LTE Direct, http://www.qualcomm.com/solutions/wireless-networks/technologies/lte/lte-direct, Qualcomm Incorporated.

Non Patent Literature 7: Zigbee (registered trademark), http://www.zigbee.org/, Zigbee Alliance.

Non Patent Literature 8: Bluetooth (registered trademark), http://www.bluetooth.com/Pages/Bluetooth-Home.aspx, Bluetooth.com Non Patent Literature 9: Hideya Ochiai et. al: "Message Routing Coping with Variations in Topology with Assumption of DTN Environment", Information Processing Society of Japan Journal Vol. 50, No. 9, Pages 2312 to 2326, September 2009

Non Patent Literature 10: Masato Tsuru et al: "Present and Future of the DTN Technology", Institute of Electronics, Information and Communication Engineers, Communications Society magazine, No. 16, Spring 2011 Issue Non Patent Literature 11: Written by A. Lindgren, A. Doria and O. Schelen: "Probabilistic Routing in Intermittently Connected Networks," Mobile Computing and Communications Review, vol 7, no. 3, pp. 19-20, Jul 2003

SUMMARY OF INVENTION

Technical Problem

However, when the mobile terminals are grouped into terminal groups, and the terminals are connected to each other with a connection topology around a group owner (GO: Group Owner), the following problem occurs. In the system of relaying communication in units of a terminal group based on the network connection topology as described above, the maximum number of hops in which data can be transferred is restricted by the size of the terminal group. In other words, in the "relay system based on the terminal group" which relays and transfers communication in units of a terminal group based on the network connection topology as described above, the packet relay transfer operation of the End-To-End is closed within the terminal group, and thus it is disadvantageously impossible to realize multi-hop communication which has a predetermined number of hops or more.

For example, as an example of the "relay system based on the terminal group", the "star connection-type relay system" described above is assumed. In the system of relaying communication in units of a terminal group based on the star-type network connection topology, the maximum number of hops in which data can be transferred is disadvantageously two hops. In other words, in the system of relaying communication in units of a terminal group based on the star-type network connection topology, the packet relay transfer operation of the End-To-End is closed within the terminal group, and thus it is disadvantageously impossible to realize multi-hop communication which has three or more hops.

Hence, even when in the wireless network environment described above, as the packet relay system, the "relay system based on the terminal group" described above is used, the problem in the reachability of communication caused by the present system is not solved yet.

In view of the foregoing problem, an object of the present invention is to provide a communication control method and a mobile terminal in which the "relay system based on the terminal group" relaying communication in units of a terminal group based on the network connection topology as described above is adopted as a packet relay system and in which simultaneously, multi-hop communication capable of performing data relay transfer over an arbitrary number of hops exceeding the restriction of a predetermined number of hops.

Solution to Problem

According to the present invention, there is provided a communication control method including, in a wireless network in which terminal-to-terminal communication of a packet is relayed in units of a terminal group formed with a relay terminal selected from two or more mobile terminals and one or more mobile terminals connected to the relay terminal, a communication control operation of repeatedly performing: a step in which when any terminal within a first terminal group determines that a communication activity between terminals within the first terminal group drops below a predetermined threshold value, the terminal within the first terminal group selects a new relay terminal based on a priority calculated on an individual mobile terminal basis, and in which the first terminal group is dissolved; and a step in which the selected new relay terminal forms a second terminal group together with a mobile terminal capable of being wirelessly connected to the selected new relay terminal, and in which each mobile terminal within the second terminal group is made to start communication, where the priority is calculated such that efficiency of spread of the packet between an unspecified large number of mobile terminals is improved through the dissolution of the first terminal group and the formation of the second terminal group, and a communication route between mobile terminals connected to the relay terminal within the first and second terminal groups and the relay terminal satisfies a predetermined stability condition.

Advantageous Effects of Invention

As described above, in the present invention, since the existing group is dissolved and reconstructed, and thus a mobile terminal outside the group newly becomes a group fellow with a mobile terminal storing relay data before the dissolution, the relay data is relayed and transferred to the terminal which newly becomes the group fellow within the new group after the reconstruction. Hence, in the present invention, the operation of relaying the transfer data stored within the mobile terminal before the dissolution of the group to the mobile terminal which newly becomes the group fellow from the outside of the group is repeated any number of times by the repeated execution of the dissolution/reconfiguration of the group. Consequently, in the present invention, it is possible to realize the multi-hop communication for relaying and transferring the transfer data even if the upper limit (two hops) of the number of relay hops in the relay system performing terminal-to-terminal communication on an individual terminal group basis is exceeded.

At that time, for example, since in the present invention, the mobile terminal in which immediately before the dissolution of the group, the number of adjacent node terminals outside the group is the largest is set to the GO for the group after the reconstruction, when seen from the GO, the number of terminals which are newly added to the group fellow from the outside of the group can be maximized after the reconstruction of the group. The adjacent node terminal refers to an adjacent mobile terminal which responds to the adjacent search beacon issued by the present terminal so as to be wirelessly connected as the subsequent hop node to the present terminal. Consequently, in the present invention, in the process in which the dissolution and reconstruction of the group described above are repeated, the efficiency of the spread and the speed of the spread of the stored data in the relay transfer within the group described above can be maximized.

Consequently, in the present invention, a wide variety of packet relay systems are used together, and thus it is possible to realize a mechanism which can solve the problems in the reachability of the communication, the scalability of the communication capacity, the efficiency of the communication and the optimization of the efficiency of the consumption of terminal power described above.

BRIEF DESCRIPTION OF DRAWINGS

FIG. 8 is a diagram showing the configuration of the interior of the mobile terminal 100 as a collection of abstract function blocks using an example of the configuration in a first operated state (a) and an example of the configuration in a second operated state (b) in the mobile terminal according to the present invention;

FIG. 27 is a table illustrating trigger conditions necessary for the occurrence of the change of each of the states in the state change diagram shown in FIG. 26 in the present embodiment;

FIG. 28 is a diagram showing a network structure in which a MANET mode terminal and a DTN mode terminal perform direct communication within the same terminal group;

FIG. 29 is a diagram illustrating a comparison between the present embodiment and a conventional technology (MANET and DTN);

FIG. 30 is a diagram illustrating a comparison between the present embodiment and the conventional technology (MANET and DTN)

DESCRIPTION OF EMBODIMENTS

Figure 1:
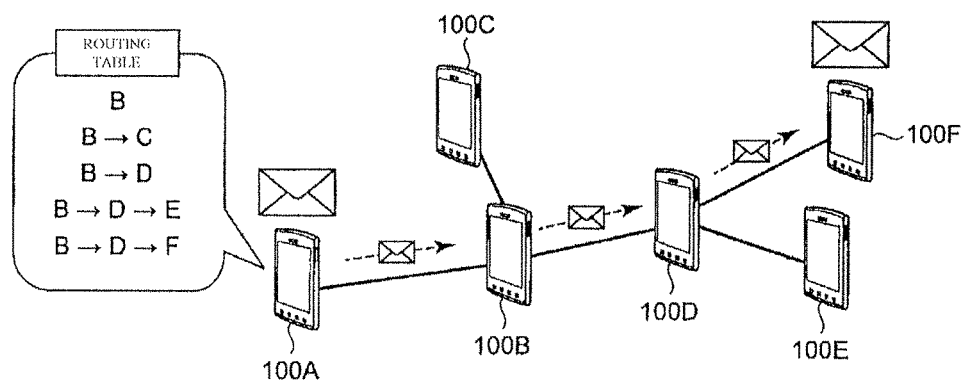
FIG. 1 is a diagram illustrating a scenario in which in a MANET network, as the number of route hops is increased, a probability that End-To-End transmission fails is increased.

In areas such as a mountainous area and a remote island in which a wireless base station and a wireless access point are not sufficiently prepared or in areas in which a wireless base station and a wireless access point are damaged by a disaster such as an earthquake or a typhoon, a wireless network communication infrastructure for mobile terminals that are provided by a communication carrier or the like is not utilized at all. Hence, it is necessary to provide a technology in which without utilizing such a wireless network communication infrastructure at all, wireless communication can be directly performed between mobile terminals. As an example of such a technology, an ad-hoc network technology is present.

The ad-hoc network system is a technology in which without need of a centralized control station such as a base station for cellular phones, a plurality of mobile terminals perform data communication with other mobile terminals which are within a predetermined adjacent area and which can perform communication, in which mobile terminals halfway from the mobile terminal of a transmission source to the mobile terminal of a transmission destination sequentially relay data like a bucket brigade and in which thus it is possible to perform distant data communication. At present, as a large number of packet relay transfer control protocols (ad-hoc routing control protocols), packet relay transfer protocols and the associated technologies disclosed in Non Patent Literatures 1 to 8 described above are proposed.

These terminal-to-terminal packet relay transfer technologies are common in that the mobile terminals realize multi-hop communication in a coordinated manner. Consequently, in the terminal-to-terminal packet relay transfer technologies as described above, without depending on a wireless base station or the like, a plurality of mobile terminals capable of performing communication with each other are collected, and thus it is possible to autonomously establish a wireless network. Moreover, in the terminal-to-terminal packet relay transfer technologies as described above, a plurality of mobile terminals capable of performing communication with each other are collected, and thus it is possible to flexibly form an appropriate network topology according to the conditions.

A wireless network environment in which the present embodiment is realized is a wireless network environment in which without the intervention of a wireless access point and a base station, mobile terminals autonomously form a network, and in which the mobile terminals perform communication with each other. At the same time, the wireless network environment in which the present embodiment is realized is a wireless network environment in which a wide variety of packet relay systems are operated. The wide variety of packet relay systems described above include table drive-type, storage transfer-type (including cases where the infection-type routing control (Epidemic Routing), the estimation-type routing control (Estimation Routing), the coding-type routing control (Coding Routing) or the like is used) and star connection-type relay systems.

In the present embodiment, it is assumed that a relay system is adopted in which in the wireless communication network environment described above, mobile terminals are grouped into terminal groups, and in which in each of the terminal groups, terminal-to-terminal communication is performed. In this way, in the present embodiment, the problems in the scalability of the communication capacity, the efficiency of the communication, the efficiency of the consumption of terminal power and the instability of the End-To-End communication route are solved. Then, a mechanism is realized in which it is possible to perform multi-hop communication capable of realizing packet relay transfer over three or more hops that cannot be performed in the relay system based on the terminal group, and this is the target of the present embodiment.

In the following description of the present specification, before the description of the present embodiment, the technologies associated with the present embodiment will first be described with reference to FIGS. 1 to 3. Then, a specific example of the wireless network environment in which the present embodiment is realized will be described with reference to FIGS. 4 to 6. Then, an example of the configuration of the mobile terminal which can be used in the present embodiment will be described with reference to FIGS. 7 to 9. Then, the basic operating principle of the present embodiment and technical advantages in comparison with a conventional technology will be described with reference to FIGS. 10 to 22. A detailed operation procedure for practicing the present embodiment will be described with reference to FIGS. 23 to 25. A state transition which indicates the transition of the operational state of mobile terminals that perform packet relay transfer control according to the present embodiment will be described with reference to FIGS. 26 and 27. A comparison between the present embodiment and the conventional technology (MANET and DTN) will be described with reference to FIGS. 28 to 31.

<1> Technologies Associated with the Present Embodiment (1-A) Table Drive-type Relay System An ad-hoc network which is formed by packet relay control specified by an OLSR or an AODV is standardized as a MANET (Mobile Ad Hoc Network), in an Internet Engineering Task Force (Non Patent Literatures 1 and 2). The MANET is a system in which based on a table drive-type packet relay transfer control protocol, routing information including route information is constantly exchanged between a plurality of mobile terminals, and in which a routing control table is updated to the latest state by the exchanged routing information. In this way, in the packet relay transfer based on the MANET, communication can be started based on the route information held when the communication is required. Here, wireless communication coverages overlap each other, and mobile terminals which can perform direct wireless communication with each other serve as adjacent nodes within the network. In the ad-hoc network described above, since the mobile terminals serving as the adjacent nodes constantly exchange the routing information with each other, a plurality of mobile terminals present within the wireless network need to be able to constantly perform direct wireless communication with each other. In the table drive-type packet relay transfer, the mobility of each mobile terminal is low, and when the wireless channel state between mobile terminals is stable, the topology of the entire network remains stable. Hence, as long as the topology of the entire network is stable, in the table drive-type packet relay transfer, a link between the mobile terminals serving as the adjacent node within the network is so stable as to be the End-To-End. On the other hand, in the table drive-type packet relay transfer, as the mobility of each mobile terminal is increased, and the wireless channel state between mobile terminals becomes unstable, the topology of the entire network becomes unstable, with the result that the packet reachability in the End-To-End is rapidly lowered.

FIG. 1 shows how data is routed between a plurality of mobile terminals 100A to 100F which are wirelessly connected to each other according to the table drive-type packet relay transfer control such as the MANET. In FIG. 1, a routing control table (routing information) stored within the mobile terminal 100A is illustrated, and the routing control table (routing information) includes the following transfer route information based on the transmission source of the mobile terminal 100A.

(r1) The mobile terminal 100B is directly and wirelessly connected to the mobile terminal 100A in one hop.

(r2) The mobile terminal 100C is indirectly and wirelessly connected to the mobile terminal 100A through the mobile terminal 100B in two hops.

(r3) The mobile terminal 100D is indirectly and wirelessly connected to the mobile terminal 100A through the mobile terminal 100B in two hops.

(r4) The mobile terminal 100E is indirectly and wirelessly connected to the mobile terminal 100A through the mobile terminal 100B and furthermore the mobile terminal D in three hops.

(r5) The mobile terminal 100F is indirectly and wirelessly connected to the mobile terminal 100A through the mobile terminal 100B and furthermore the mobile terminal D in three hops.

FIG. 1 shows how transfer data based on the transmission source of the mobile terminal 100A is routed through the route (r5) recorded in the routing control table within the mobile terminal 100A to the mobile terminal 100F which is the final destination.

(1-B) Storage Transfer-type Packet Relay Transfer System

On the other hand, in view of the point in which the End-To-End communication route up to the communication party cannot always be found, that is, the point in which a plurality of mobile terminals present within the wireless network cannot always communicate with each other, the DTN adopts a so-called storage transfer (Store and Forward)-type relay system. The ad-hoc network based on the DTN is standardized in the Internet Engineering Task Force (Non Patent Literatures 3 and 4). In this system, when the direct End-To-End communication route is not present between the transmission source terminal which has data to be transmitted and the destination terminal, the transmission source terminal transmits the data to a relay mobile terminal which is interposed between the transmission source terminal and the destination terminal. The relay mobile terminal temporarily stores the data received by itself therewithin until any of the other relay mobile terminals responds to an adjacent search beacon fed by itself. Thereafter, when any of the other relay mobile terminals responds to the adjacent search beacon, and thus it is possible to communicate with the other relay mobile terminal, the data is transferred to the other relay mobile terminal. In the storage transfer-type packet relay transfer, a plurality of relay mobile terminals repeat the transfer described above, and thus the data is finally transferred to the destination terminal. The storage transfer-type packet relay transfer differs from the table drive-type packet relay transfer in which the End-To-End communication route is previously determined by performing the routing control within a network layer in that such an assumption is not necessary. In other words, in the storage transfer-type packet relay transfer like the DTN, the End-To-End transfer route is not identified before the start of the packet relay transfer, and the procedure for the relay transfer of the packet to the other mobile terminal which happens to respond to the adjacent search beacon issued by the mobile terminal storing the packet is simply repeated.

In the storage exchange-type packet relay transfer like the DTN, as the adjacent node which responds to the adjacent search beacon from the relay mobile terminal storing the data, two or more relay mobile terminals may be present. In this case, as the method which can be performed by the relay mobile terminal storing the data so as to select the terminal to which the data is transferred, for example, the following methods are present: a method infection-type routing control (Epidemic Routing)) of transferring the data to all the adjacent nodes; and a method of selecting, under predetermined conditions, adjacent nodes corresponding to the number obtained by multiplying the number of all adjacent nodes by a data transmission probability p and performing the transfer. These methods including the infection-type routing control (Epidemic Routing) are methods for spreading the data between a large number of mobile terminals which are in the process of performing the storage transfer-type packet relay operation such the DTN, and are data spread systems which are performed as part of the storage transfer-type packet relay operation. In these data spread systems, a data relay operation in which each of the relay mobile terminals storing the data transfers a plurality of copies of the data to a plurality of adjacent nodes is sequentially repeated. Consequently, in these data spread systems, a large number of copies of the data are spread within the wireless network, and thus it is possible to increase the probability that the data reaches the final destination. On the other hand, in these data spread systems, a very large number of data transfers are produced simultaneously and in parallel between a large number of relay mobile terminals within the network, and thus the efficiency of the communication and the efficiency of the terminal power consumption are lowered. It is understood that the reason why the problem described above occurs is that in the mechanism of the infection-type routing control (Epidemic Routing) or the like for spreading a large number of copies of the data between a large number of mobile terminals present within the wireless network, the following mechanism is missing. Specifically, the mobile terminal which stores the data to be delivered to the final destination does not have a mechanism for appropriately selecting, from a plurality of adjacent node terminals capable of simultaneously performing communication, the adjacent node terminal serving as a data relay destination which most efficiently delivers the stored data to the final destination.

Figure 2:
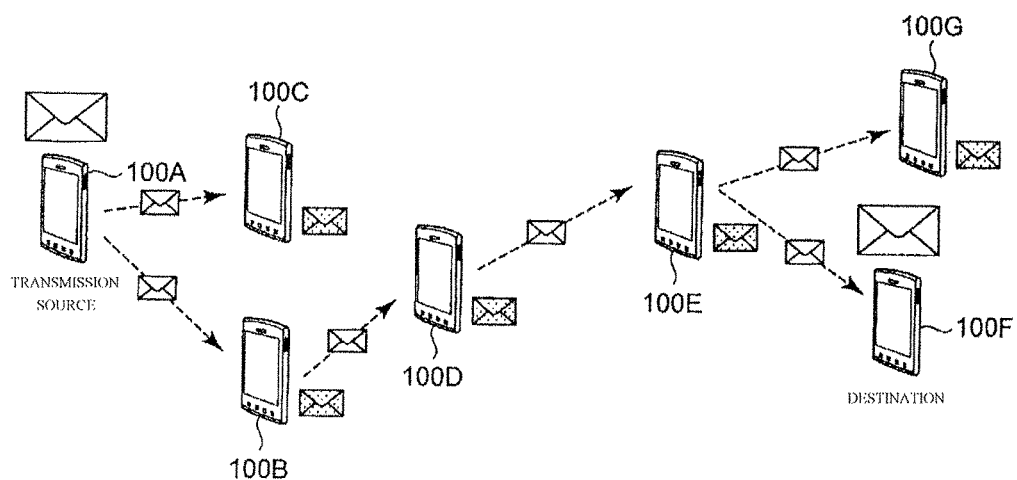
FIG. 2 is a diagram illustrating a scenario in which in a DTN network, as the amount of End-To-End transfer information per unit time is increased, the occurrence of a data drop on a communication route is increased, with the result that the amount of information capable of being transmitted in the End-To-End per unit time is restricted.

FIG. 2 shows how the transfer data is relayed and transferred like a bucket brigade between mobile terminals which identify each other so as to be connected to each other by the transmission of the adjacent search beacon and the response thereto. In FIG. 2, it is assumed that the transmission source of the transfer data is the mobile terminal 100A, and that the final destination of the transfer data is the mobile terminal 100F. In the scenario of FIG. 2, the transfer data is relayed and transferred from the mobile terminal 100A to the mobile terminals 100B and 100C which respond to the adjacent search beacon from the mobile terminal 100A, and the same relay and transfer are repeated in the manner of a bucket brigade, with the result that the transfer data reaches the mobile terminal 100E. Then, the mobile terminal 100E of FIG. 2 relays and transfers the transfer data to the mobile terminals 100F and 100G which respond to the adjacent search beacon issued by itself, with the result that the transfer data reaches the mobile terminal 100F which is the final destination.

(1-3) Star Connection-type Packet Relay Transfer System

Figure 3:
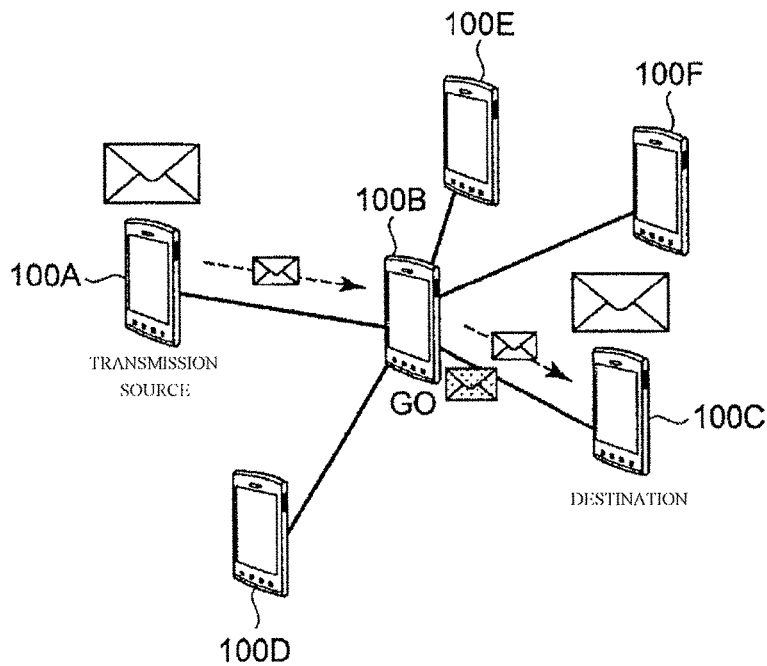
FIG. 3 is a diagram illustrating a scenario in which in a star-type DTN network, the upper limit of the number of hops capable of performing packet relay transfer is restricted to two hops.

FIG. 3 shows a network configuration in which the transfer data is relayed by the star connection-type packet relay transfer system. Specific examples of the star connection-type packet relay transfer system include a system (see Non Patent Literature 5) which is standardized as Wi-Fi Direct in Wi-Fi Alliance and other systems (see Non Patent Literatures 6 to 8). In this system, a plurality of mobile terminals capable of performing wireless communication with each other form a group, and the communication is performed between mobile terminals in each group. This group is the same conception as IBSS (Independent Basic Service Set) in the ad-hoc mode of IEEE802.11 wireless LAN and BSS (Basic Service Set) in the infrastructure mode thereof. One of a plurality of mobile terminals which belong to each group is operated as a group owner (GO: Group Owner). Since the GO within each group manages the communication of the entire group under control by itself, and behaves as a wireless access point within the group, the GO appears as if it was the wireless access point from the mobile terminals other than the GO. In other words, the role played by the GO within each group is the same as the role of the wireless access point which manages, over the entire BSS, the communication between wireless terminal devices belonging to the BSS in the infrastructure mode of IEEE802.11 wireless LAN. One or more of the other mobile terminals located adjacent to the GO respond to the adjacent search beacon from the GO so as to be wireless connected to the GO, with the result that a group around the GO is formed. Hence, the star connection-type packet relay transfer system is common to the DTN system in that another mobile terminal which happens to be close thereof responds to an adjacent search beacon issued from one mobile terminal, and that thus between these two mobile terminals, wireless connection capable of relaying and transferring data is formed. Hence, the star connection-type packet relay transfer system is also referred to as a star-type DTN system.

FIG. 3 shows the star-type network connection topology around the GO as described above. FIG. 3 shows how the communication between the mobile terminals wirelessly connected to the GO within the group is relayed and transferred by the GO serving as a hub. Specifically, FIG. 3 shows how the transfer data transmitted from the mobile terminal 100A which is the transmission source is relayed by the GO to the mobile terminal 100C which is the final destination.

(1-4) Examinations

Hence, in the table drive-type packet relay transfer like the MANET, since the link between the mobile terminals adjacent to each other within the network is stable in the End-To-End, the packet issued from the transmission source reaches the final destination in the End-To-End with a high probability, and a communication delay is unlikely to occur. By contrast, disadvantageously, in the table drive-type packet relay transfer, the routing information is constantly exchanged between a plurality of mobile terminals, and thus the batteries of the terminals are remarkably consumed, and the communication capacity is reduced.

Since in the table drive-type packet relay transfer, the routing information is constantly exchanged between the mobile terminals serving as the adjacent nodes, a plurality of mobile terminals present within the wireless network needs to constantly perform direct wireless communication with each other. Furthermore, in the table drive-type packet relay transfer, in order to perform a stable operation, it is essential that the topology of the entire network be stable such that the integrity of a routing information table for each of the mobile terminals is maintained beyond a certain degree. Hence, in the table drive-type packet relay transfer, when the mobility of each mobile terminal is increased, and the wireless channel state between mobile terminals becomes unstable, the topology of the entire network becomes unstable, with the result that as the End-To-End communication route becomes unstable, the packet reachability in the End-To-End is rapidly lowered.

On the other hand, in the storage transfer-type packet relay transfer like the DTN, at the expense of a random unlimited communication delay, a large communication capacity is allowed, and the terminal power is not consumed by the exchange of the routing information. By contrast, disadvantageously in the storage transfer-type packet relay transfer in which the End-To-End communication route is not determined until the packet reaches the final destination, as compared with the table drive-type packet relay transfer at the time of the stable operation, the reachability of the packet in the End-To-End from the transmission source to the final destination is lower than that of the table drive-type packet relay transfer.

Moreover, in the storage transfer-type packet relay transfer like the DTN, the upper limit of the communication capacity capable of performing the relay and transfer is restricted according to the buffer-memory capacity on each mobile terminal which relays and transfer data by a series of packet relay transfer operations. Specifically, since the amount of communication relayed and transferred exceeds, according to the buffer-memory capacity on each mobile terminal, the upper limit of the communication capacity that can be supported, the transfer data overflows from the buffer-memory, in the storage transfer-type packet relay transfer, a drop in the relay transfer data can be produced.

Furthermore, as another problem, whether or not a plurality of mobile terminals present within the wireless network can constantly communicate with each other is varied from time to time according to the geographical arrangement of the mobile terminals and the wireless access point, the reachable range of the wireless communication coverage or the like.

In the star connection-type packet relay transfer system, the star-type network connection topology around the GO is adopted, and thus as compared with the other packet relay systems, the packet relay transfer processing is significantly simplified, with the result that it is possible to reduce the packet relay transfer processing burden caused by each mobile terminal. By contrast, in the star connection-type packet relay transfer system, since within each group, a plurality of mobile terminals communicate with each other through the star-type connection around the GO, the range capable of transferring data by the packet relay transfer is limited to the same group. Hence, in the star connection-type packet relay transfer system, when it is assumed that two mobile terminals other than the GO within one group are a first terminal and a second terminal, the maximum number of hops capable of transferring data by the packet relay transfer between mobile terminals is up to two hops from the first terminal too the second terminal through the GO.

The wireless network environment assumed in the present embodiment is a network environment which is operated by using a plurality of different packet relay transfer systems described above. However, in the wireless network environment described above, the problems in the reachability of the communication, the scalability of the communication capacity, the efficiency of the communication and the optimization of the efficiency of the consumption of terminal power are not solved yet.

(1-5) Other Associated Technologies

In view of a problem in which in the wireless ad-hoc network based on the DTN, since the mobility of the mobile terminal is high, the physical network topology is constantly varied unstably, and thus it is difficult to grasp the current overall picture, Non Patent Literature 9 proposes a solution for this problem. Specifically, instead of a system in which in order to find the current overall picture of the network, for example, all nodes mutually spread the routing information to synchronize the entire network, a system is proposed in which data delivery is performed only by finding a relationship with the adjacent nodes. For example, in Non Patent Literature 9, with reference to the potential values of the adjacent nodes, the stored data is recurrently transferred to adjacent nodes whose potential values are low.

In view of the problem in which the topology of the entire network operated based on the DTN is constantly varied and unstable, an object of the packet relay transfer system disclosed in Non Patent Literature 9 is to overcome the vulnerability of the data transfer in the End-To-End caused by the instability of the network topology. However, unlike the present invention, the technology disclosed in Non Patent Literature 9 is not a technology which optimizes the operation of the entire network in order to improve the efficiency of the power consumption of each mobile terminal and the scalability of the communication capacity.

Hence, even if in the wireless network environment assumed in the present embodiment and described above, the invention disclosed in Non Patent Literature 9 is used together with the various conventional packet relay systems, it is impossible to effectively solve the problems in the reachability of the communication, the scalability of the communication capacity, the efficiency of the communication and the efficiency of the consumption of terminal power.

<2> Illustrative Wireless Network Environment

The wireless network environment in which the present embodiment is realized is a network environment which is operated by using various relay transfer systems including the table drive type, the storage transfer type and the star connection type. As described later, in the wireless network environment, each mobile terminal performs the packet relay transfer operation while switching to an appropriate packet relay transfer system according to variations in the adjacent conditions. An example of such a wireless network environment will be described below with reference to FIGS. 4 to 6.

Figure 4:
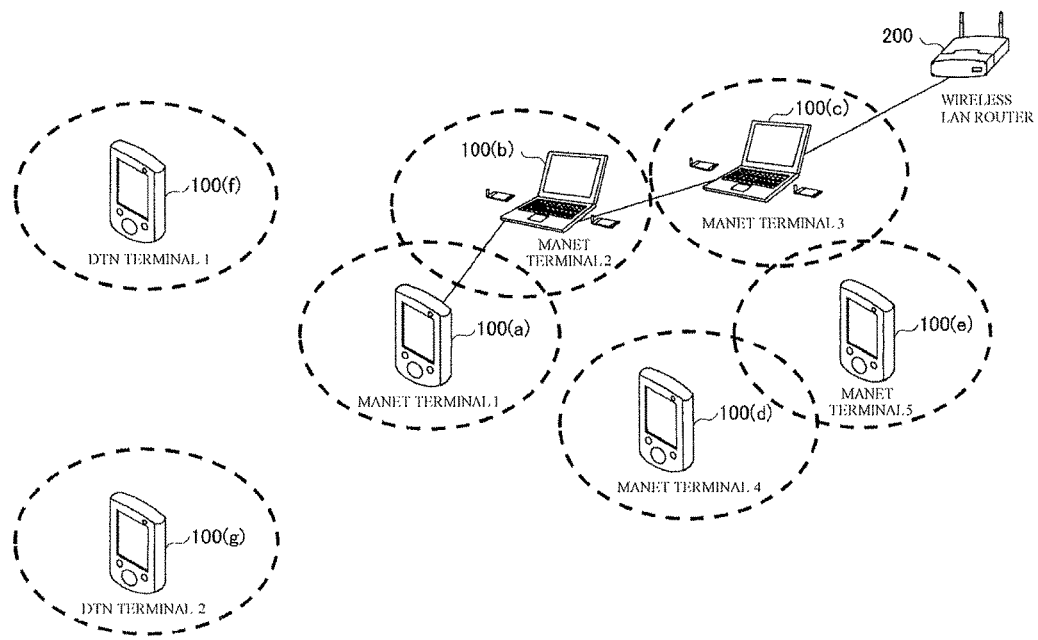
FIG. 4 shows an example of an ad-hoc network in which a packet relay transfer control protocol based on a MANET standard and a packet relay transfer control protocol based on a DTN standard are used in a mixed manner.

FIG. 4 shows an example of a wireless network which uses together a relay transfer control protocol based on the MANET standard and a relay transfer control protocol based on the DTN standard. In the following description, in FIG. 4 a mobile terminal which performs the relay transfer control protocol based on the MANET standard is referred to as a MANET terminal, and a mobile terminal which performs the relay transfer control protocol based on the DTN standard is referred to as a DTN terminal.

In the ad-hoc network of FIG. 4, a plurality of MANET terminal 1 100(*a*) to MANET terminal 5 100(*e*) need to be able to constantly perform direct wireless communication. Hence, the wireless communication coverages of the MANET terminal 1 100(*a*) to the MANET terminal 5 100(*e*) overlap each other. Then, the MANET terminals are directly connected to a wireless LAN router 200 in the ad-hoc mode of a wireless LAN so as to perform communication or the MANET terminals directly connected thereto sequentially relay a signal (packet) to another MANET terminal like a bucket brigade so as to perform communication. In this way, the MANET terminals can form an ad-hoc network based on the MANET.

Figure 5:
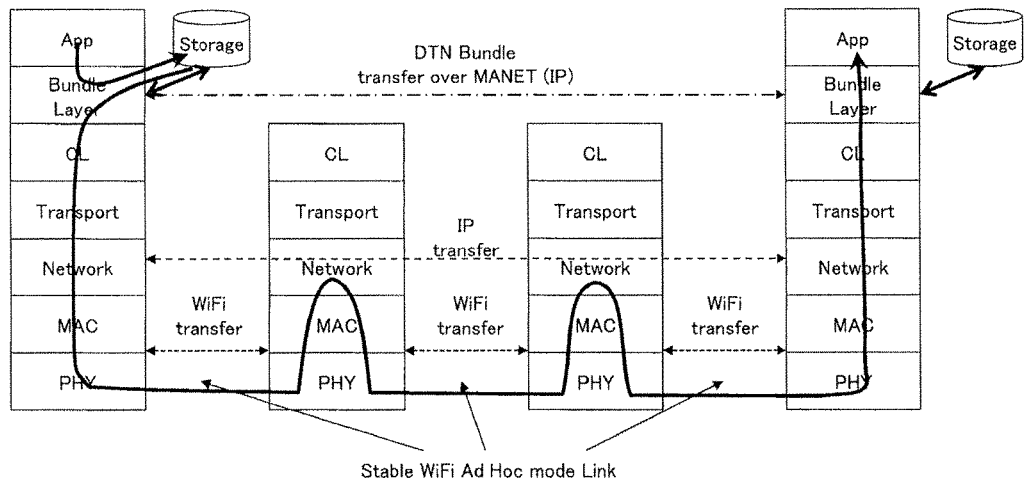
FIG. 5 is a diagram showing a network layer in which between MANET terminals, a packet relay using a routing control table and the exchange of routing information are performed and protocol layer lowers than it.

Each MANET terminal exchanges the routing information at regular intervals with all the other MANET terminals whose wireless communication coverages overlap each other, and with the exchanged routing information, a routing control table is updated to the latest state. The routing control table is a search table with which it is possible to search for the address of another MANET terminal serving as the subsequent hop node to which a packet received on a routing route needs to be relayed. As shown in FIG. 5, the packet relay and the exchange of the routing information using the routing control table described above are performed by each MANET terminal in a network layer (for example, an IP layer) and in a protocol layer (for example, a Wi-Fi protocol) lower that the network layer.

Figure 6:
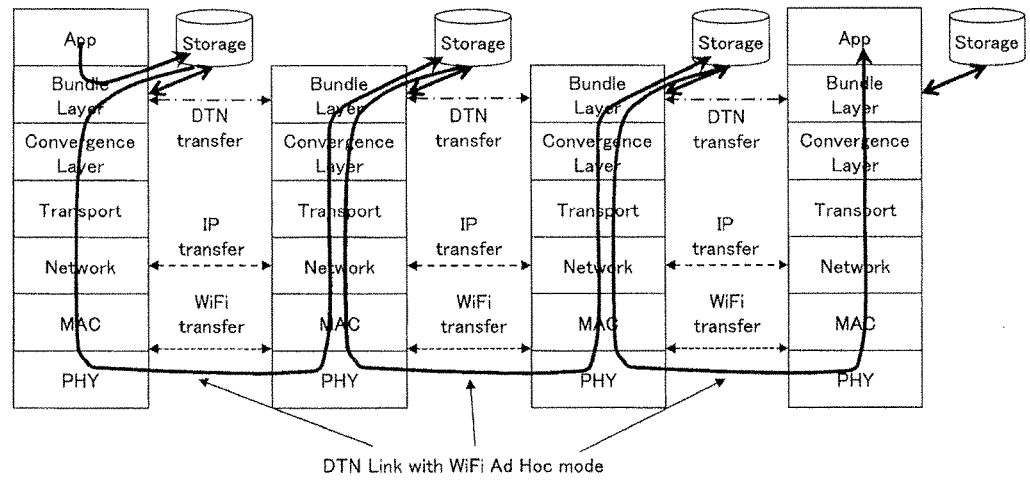
FIG. 6 is a diagram illustrating, as an example of packet relay transfer control based on a DTN, relay transfer control which is standardized in RFC5050 of an Internet Engineering Task Force.

On the other hand, the communication coverages of a DTN terminal 1 100(*f*) and a DTN terminal 2 100(*g*) shown in FIG. 4 are not connected to any of those of the MANET terminal 1 100(*a*) to the MANET terminal 5 100(*e*), and when the DTN terminal 1 100(*f*) and the DTN terminal 2 100(*g*) are far away from each other, it is impossible to perform communication between the DTN terminals. Then, when the DTN terminal 1 100(*f*) and the DTN terminal 2 100(*g*) are so close to each other that they can communicate with each other, the DTN terminal 1 100(*f*) and the DTN terminal 2 100(*g*) transfer the stored transmission data to each other. In this case, the DTN terminal 1 100(*f*) and the DTN terminal 2 100(*g*) can form an ad-hoc network based on the DTN. FIG. 6 illustrates, as an example of the packet relay transfer based on the DTN, relay transfer control which is standardized in RFC5050 of the Internet Engineering Task Force. As shown in FIG. 6, the control of the storage and transfer of the transmission data described above is performed between the Bundle layers of the adjacent DTN terminals which are so close to each other that they can communicate with each other. In FIG. 6, the Bundle layer is located higher than general transport layer/network layer such as widely used TCP/IP, and for the storage and transfer of the transmission data, data is exchanged between an application layer and the transport layer while a storage is being accessed.

In order to operate, in FIG. 4, the two ad-hoc networks formed based on the two types of relay systems of the MANET and the DTN as an integral single network, it is necessary to realize the following function.

In other words, the function of automatically switching, according to the conditions and states into which a plurality of mobile terminals are brought, the packet relay transfer operation performed by each mobile terminal to any one of the relay transfer based on the MANET and the relay transfer based on the DTN which is more suitable is necessary. A specific description will be given below. The geographical arrangement of a plurality of mobile terminals, the reachable range of the wireless coverage or the like is varied from time to time, and thus whether each mobile terminal can continuously and stably perform communication with the other mobile terminals or each mobile terminal can only intermittently perform communication therewith is varied. Hence, the function of automatically switching, according to the conditions and states into which each mobile terminal is brought at each time, the packet relay transfer operation which needs to be performed by each mobile terminal to any one of the relay transfer based on the MANET and the relay transfer based on the DTN which is more suitable.

<3> Configuration of Mobile Terminal According to the Present Embodiment

An example of the configuration of a mobile terminal which can be used in the present embodiment will be described below with reference to FIGS. 7 to 9.

Figure 7:
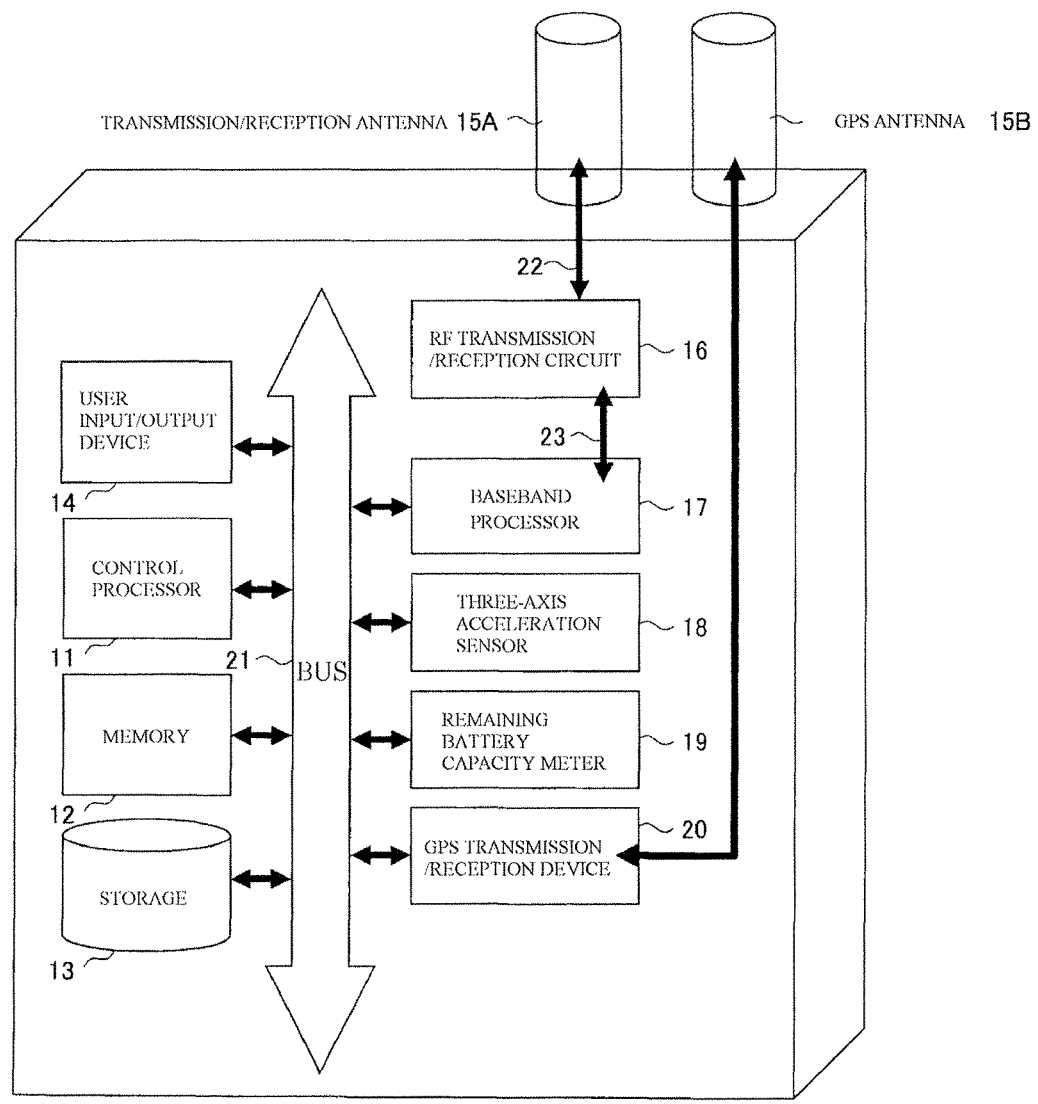
FIG. 7 is a diagram showing, as an example of the configuration of a mobile terminal according to the present invention, the configuration of a mobile terminal 100 in a hardware structure formed with a plurality of circuit modules.

FIG. 7 is a diagram showing, as an example of the configuration of the mobile terminal according to the present embodiment, the configuration of a mobile terminal 100 in a hardware structure formed with a plurality of circuit modules. In FIG. 7, the mobile terminal 100 is formed with a control processor 11, a memory 12, a storage 13, a user input/output device 14, a transmission/reception antenna 15A, a GPS antenna 15B, a RF transmission/reception circuit 16, a baseband processor 17, a three-axis acceleration sensor 18, a remaining battery capacity meter 19, a GPS transmission/reception device 20 and a bus 21. The control processor 11, the memory 12, the storage 13, the user input/output device 14, the baseband processor 17, the three-axis acceleration sensor 18, the remaining battery capacity meter 19 and the GPS transmission/reception device 20 are electrically connected with the bus 21, and exchange information with each other through the bus 21. The RF transmission/reception circuit 16 is electrically connected to the baseband processor 17 with a signal line 23, and the transmission/reception antenna 15 is electrically connected to the RF transmission/reception circuit 16 with a signal line 22.

The control processor 11 performs software stored within the memory 12 which is a volatile memory so as to control the entire mobile terminal 100, and simultaneously stores, in the memory 12, temporary data generated or data read externally. The storage 13 is a nonvolatile memory in which data loaded on the memory 12 and data stored from the memory 12 are stored for a long period of time, and simultaneously functions as a storage place where data and packets are stored by the mobile terminal 100 while the mobile terminal 100 is in the process of performing the storage exchange-type packet relay operation like DTN. The user input/output device provides a user interface in the mobile terminal 100.

When the mobile terminal 100 receives an information signal from another terminal, the baseband processor 17 performs the following processing. The baseband processor 17 first receives, from the RF transmission/reception circuit 16, a baseband signal which is received by the transmission/ reception antenna 15A and which is subjected to signal processing by being down-converted from a RF frequency band to a baseband frequency band with the RF transmission/reception circuit 16. Then, the baseband processor 17 processes the received baseband signal to generates a baseband symbol. The baseband processor 17 finally converts the generated baseband signal into a digital bit series, and transmits, through the bus 21, the digital bit series to the control processor 11. When the mobile terminal 100 transmits an information signal to another terminal, the baseband processor 17 performs processing opposite to the above processing.

The three-axis acceleration sensor 18 detects an acceleration vector applied to the mobile terminal 100 when the mobile terminal 100 is physically moved, and transmits, according to a request from the control processor 11, through the bus 21, data indicating the acceleration vector to the control processor 11. The remaining battery capacity meter 19 detects the remaining battery capacity of the mobile terminal 100, and transmits, according to a request from the control processor 11, through the bus 21, data indicating the remaining battery capacity to the control processor. The GPS transmission/reception device 20 communicates a satellite signal with the GPS satellite (not shown) through the GPS antenna 15B, and transmits the phase timing information of the satellite signal received through the bus 21 to the control processor 11 in order to calculate the present position of the mobile terminal 100 based on the satellite signal received from the GPS satellite.

FIGS. 8(a) and 8(b) are diagrams showing, as an example of the configuration of the mobile terminal according to the present embodiment, a collection of abstract function blocks interconnecting configurations within the mobile terminal 100. In FIGS. 8(a) and 8(b), the mobile terminal 100 is formed with an application 110 including a user interface, a MANET/DTN switching determination portion 111, a message reception portion 112, a received message analysis portion 113, a MANET transmission portion 120, a routing control table 130, a DTN transmission portion 140, an IPND transmission/reception portion 141, a received IPND analysis portion 142, a protocol lower layer 150 and a correspondence table 160. FIGS. 8(a) and 8(b) differ from each other in the connection relationship between the function blocks described above and the flow of information between the function blocks depending on the state of an operation being performed by the mobile terminal 100. Specifically, FIG. 8(a) shows the connection relationship between the function blocks within the mobile terminal 100 when the mobile terminal 100 performs an operation of starting the End-To-End transfer according to an instruction to perform the End-To-End transfer of data and packets from a user through the application 110. On the other hand, FIG. 8(b) shows the connection relationship between the function blocks within the mobile terminal 100 when the mobile terminal 100 receives a packet transferred from another mobile terminal by the packet relay transfer operation and further performs the operation of relaying it.

The application 110, the MANET/DTN switching determination portion 111, the message reception portion 112, the received message analysis portion 113, the MANET transmission portion 120, the DTN transmission portion 140, the IPND transmission/reception portion 141, the received IPND analysis portion 142 and the protocol lower layer 150 are constantly stored in the memory 12 in FIG. 7, and can be used as software programs which are performed by the control processor 11.

The functions and roles of the function blocks in FIG. 8(a) will first be described. The application 110 which receives an instruction from the user requests, through the MANET/DTN switching determination portion 111, the MANET transmission portion 120 or the IPND transmission/reception portion 141 to start the End-To-End transfer of data and packets to a desired destination terminal. Specifically, when the desired destination terminal is specified by the user as the form of a terminal ID, the application 110 first references the correspondence table 160 which will be described later to convert the terminal ID into the corresponding IP address. Then, the application 110 delivers the IP address and the data and packets to be subjected to the End-To-End transfer to the MANET/DTN switching determination portion 111, and requests the MANET/DTN switching determination portion 111 to start the relay transfer operation of the data and packets. The MANET/DTN switching determination portion 111 switches, according to the conditions, the operation mode of the mobile terminal 100 between a MANET mode in which the mobile terminal 100 uses the routing based on the MANET to perform communication and a DTN mode in which the mobile terminal 100 uses the packet relay transfer based on the DTN to perform communication. Specific criteria for under what conditions the MANET/DTN switching determination portion 111 switches the operation mode of the mobile terminal 100 to the MANET mode and under what conditions the MANET/DTN switching determination portion 111 switches the operation mode of the mobile terminal 100 to the DTN mode will be described later.

When the MANET/DTN switching determination portion 111 switches the operation mode of the mobile terminal 100 to the MANET mode, the MANET/DTN switching determination portion 111 provides an instruction to perform the startup to the MANET transmission portion 120. Thereafter, the MANET transmission portion 120 performs the relay processing of the data and packets while referencing the routing control table 130, at the same time, periodically exchanges the routing information with the adjacent nodes which are other mobile terminals capable of performing direct wireless communication and thereby updates the details of the routing control table 130.

The routing control table 130 associates each of routing information entries which are a list of routing control information used by the mobile terminals for routing the packet based on the MANET system and which form the table with a specific End-To-End transfer route. Specifically, each routing information entry holds a pair of the IP address of the final destination and the IP address of the adjacent node to which the present terminal directly relays the packet on the specific End-To-End transfer route associated with itself. Since the topology of the wireless ad-hoc network formed with the mobile terminals is varied from time to time, each of the mobile terminals periodically exchanges routing information with the adjacent nodes, and thereby needs to update the routing control table 130 to the latest details at regular time intervals. Specifically, the routing control table 130 used in the MANET system constantly holds the latest correspondence relationship between the End-To-End transfer route and the specific adjacent nodes serving as the packet relay destination within the network which is synchronized as a whole by the periodic exchange of the routing information between the adjacent nodes. For any reason, it is likely that the periodic exchange of the routing information between the adjacent node is stagnated and that thus on part of the entries within the routing control table 130, the correspondence relationship between the End-To-End transfer route and the specific adjacent nodes serving as the packet relay destinations is not in the latest state. In this case, the MANET transmission portion 120 deletes the entry in which the correspondence relationship is not updated to the latest state by determining that the entry is invalid.

The functions and roles of the DTN transmission portion 140, the IPND transmission/reception portion 141 and the received IPND analysis portion 142 will then be described. When the application 110 switches the operation mode of the mobile terminal 100 to the DTN mode, the application 110 provides an instruction to perform the startup to the IPND transmission/reception portion 141. Thereafter, in order to search for other mobile terminals serving as the adjacent nodes capable of performing direct wireless communication with the mobile terminal 100, the IPND transmission/reception portion 141 feeds an IPND (IP Neighbor Discovery) packet which is the adjacent search beacon, and waits for any of the adjacent mobile terminals to respond to the IPND packet. Here, if the mobile terminal 100 has received the packet which needs to be relayed to the adjacent mobile terminals, the mobile terminal 100 stores the received packet within the DTN transmission portion 140 through the received IPND analysis portion 142 while waiting for the response. When the response is received from one or more of the adjacent mobile terminals, the DTN transmission portion 140 uses wireless connection information included in the response so as to wirelessly connect to the mobile terminal which is the response transmission source, and transfers the received packet stored to the mobile terminal to which the DTN transmission portion 140 is wirelessly connected.

When the IPND transmission/reception portion 141 within the mobile terminal 100 detects the transmission of the IPND packet from the other adjacent mobile terminal and receives it, the received IPND analysis portion 142 performs the following operations. The received IPND analysis portion 142 first receives the IPND packet from the IPND transmission/reception portion 141, and returns, based on the transmission source information within the received IPND packet, a response to the DTN terminal which is the transmission source of the IPND packet. Then, the received IPND analysis portion 142 performs analysis processing on the received IPND packet so that on the data and packets transferred from the DTN terminal which is the transmission source of the IPND packet, another mobile terminal corresponding to the subsequent hop node which is the relay destination is determined. Thereafter, when the data and packets are transferred from the DTN terminal which is the transmission source of the IPND packet, the received IPND analysis portion 142 stores the data and packets within the DTN transmission portion 140 and then passes the control to the IPND transmission/reception portion 141 so that the data and packets are transferred to the mobile terminal corresponding to the subsequent hop node determined by the analysis processing. Finally, the IPND transmission/reception portion 141 to which the control is passed uses the same procedure described above to transfer the data and packets to the adjacent mobile terminal corresponding to the subsequent hop node.

Hence, in a series of packet relay transfer control performed based on the DTN by the DTN transmission portion 140, the IPND transmission/reception portion 141 and the received IPND analysis portion 142, without identification of the End-To-End transfer route before the start of the packet relay operation, the following operation is only repeated until the packets reach the final destination. Specifically, in the packet relay transfer control based on the DTN, one or more of the other mobile terminals which happen to respond to the IPND (that is, the adjacent search beacon) fed by the mobile terminal storing the packets are recognized as the adjacent nodes, and the operation of relaying the packets to the adjacent nodes is repeated.

The protocol lower layer 150 provides a wireless transfer means of a data link level for communicating, with the adjacent mobile terminals, the control information such as the routing information, the IPND packet or the response thereof and the data and packets while the mobile terminal 100 is being operated in the MANET mode or the DTN mode.

As described above, the correspondence table 160 is used for the conversion with the IP address corresponding to the terminal ID specified by the user, and is also assessed and used by the application 110 in the following case. Specifically, the case mentioned above is a case where the mobile terminal 100 which is being operated in the MANET mode needs to relay and transfer the data and packets to the adjacent mobile terminal which is being operated in the DTN mode or a case opposite thereto. In these cases, the application 110 uses the correspondence table 160 in order to perform conversion processing between EID which is packet destination identification information specific to the DTN mode and the IP address and the terminal ID for identifying each mobile terminal. The details of the packet relay processing between the MANET terminal and the DTN terminal and the conversion processing using the correspondence table 160 performed at that time will be described later.

The functions and roles of the function blocks in FIG. 8(b) will then be described. When the data and packets transferred from the other mobile terminal by the packet relay transfer are received by the protocol lower layer 150 within the mobile terminal 100, the message reception portion 112 receives the data and packets from the protocol lower layer 150. Then, the received message analysis portion 113 receives the data and packets from the message reception portion 112, analyzes the destination IP address of the data and packets and determines to which one of the application 110, the MANET transmission portion 120 and the IPND transmission/reception portion 141 the data and packets are passed according to the results of the analysis. Specifically, the determination is as follows.

(a) When the destination IP address agrees with the IP address of the mobile terminal 100 itself, since the final destination of the data and packets can be determined to be the mobile terminal 100, the data and packets are passed to the application 110.

(b) When the routing information entry corresponding to the destination IP address can be searched for from the routing control table 130, the routing using the routing control table 130 in the MANET mode can be performed. Hence, when in such a case, the MANET/DTN switching determination portion 111 does not switch the operation mode of the mobile terminal 100 to the DTN mode, the data and packets are passed to the MANET transmission portion 120.

(c) When neither of the cases (a) and (b) described above applies, since it is necessary to perform the packet relay transfer in the DTN mode, the data and packets are passed to the IPND transmission/reception portion 141.

In FIG. 8(b), the configurations and operations of the application 110, the MANET transmission portion 120, the routing control table 130, the DTN transmission portion 140, the IPND transmission/reception portion 141, the received IPND analysis portion 142, the protocol lower layer 150 and the correspondence table 160 are the same as in the case of FIG. 8(a).

Figure 9:
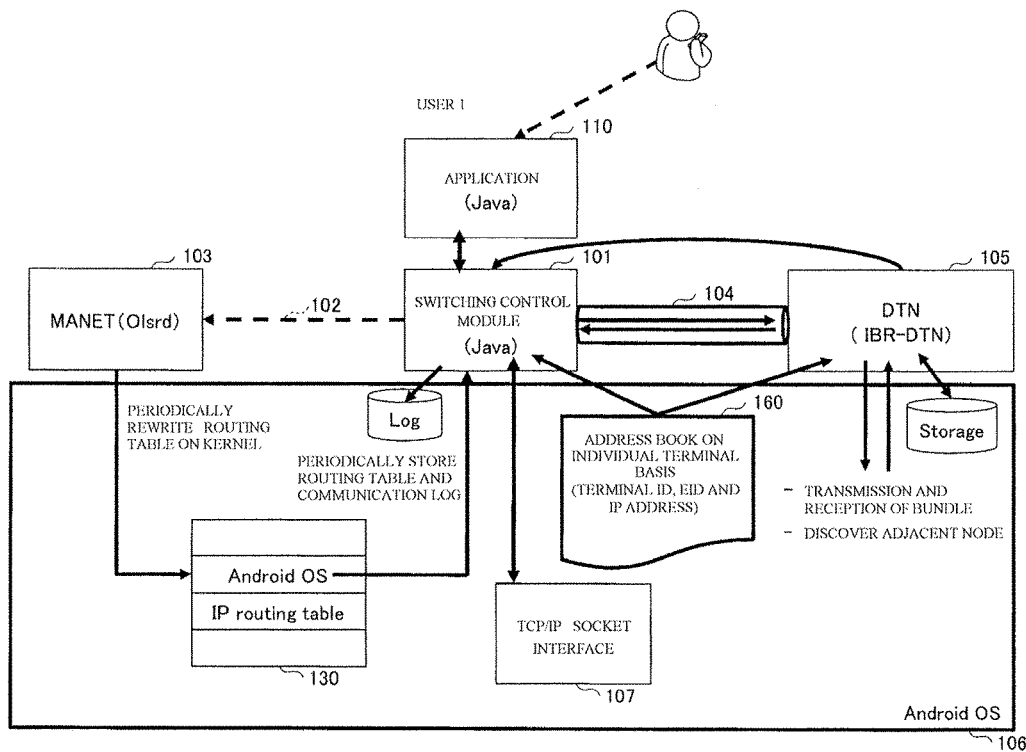
FIG. 9 is a diagram showing, as an example of the configuration of the mobile terminal according to the present invention, a software structure within the mobile terminal 100 which is formed with a plurality of software configuration elements and a plurality of data structures.

FIG. 9 is a diagram showing, as an example of the configuration of the mobile terminal according to the present embodiment, a software structure within the mobile terminal 100 which is formed with a plurality of software configuration elements and a plurality of data structures. In FIG. 9, the mobile terminal 100 operated by a user 1 includes the application 110, a switching control module 101 which is called as a run-time library from the application, a MANET model 103 which is connected to the switching control module 101 through a first application level (APL) socket interface 102 and a DTN module 105 which is connected to the switching control module 101 through a second APL socket interface 104. The mobile terminal 100 further includes an OS/API 106 which is an execution environment in which the application 110, the switching control module 101, the MANET model 103 and the DTN module 105 are performed as software. The OS/API 106 includes the same routing control table 130 and correspondence table 160 as in FIGS. 8(a) and 8(b) as internal data structures which can be assessed from the application 110, the MANET model 103 and the DTN module 105. Moreover, the OS/API 106 includes a TCP/IP socket interface 107 as an interface through which the switching control module 101 receiving an instruction from the application 110 uses a routing function in the MANET mode to transmit and receive the data and packets in the End-To-End. In an embodiment, the mobile terminal 100 can adopt Android OS (registered trademark) as the OS/API 106.

The application 110, the switching control module 101, the MANET model 103, the DTN module 105 and the OS/API 106 are loaded from the storage 13 in FIG. 7 and are constantly stored on the memory 12, and can be used as software programs which are performed by the control processor 11 in FIG. 7. The routing control table 130 and the correspondence table 160 are implemented as data structures which are constantly stored on the memory 12, and the details of the data structures are retracted into the storage 13 (FIG. 7) which is a nonvolatile memory, together with the communication log of the mobile terminal 100 at regular intervals.

The function and role of the application 110 in FIG. 9 are the same as those of the application 110 in FIGS. 8(a) and 8(b), and thus the description thereof will be omitted. The switching control module 101 is a run-time library module which is linked to the application 110, and is a module which implements the functions of the three portions that are the MANET/DTN switching determination portion 111, the message reception portion 112 and the received message analysis portion 113 in FIGS. 8(a) and 8(b). When the switching control module 101 switches the operation mode of the mobile terminal 100 to the MANET mode, the switching control module 101 transmits, through the first APL socket interface 102, an instruction to perform the startup to the MANET model 103 and activates the operation of the MANET model 103. When the switching control module 101 switches the operation mode of the mobile terminal 100 to the DTN mode, the switching control module 101 transmits, through the second APL socket interface 104, an instruction to perform the startup to the DTN module 105 and activates the operation of the DTN module 105.

When the MANET model 103 is activated by the instruction to perform the startup from the switching control module 101, among the functions performed by the MANET transmission portion 120 in FIGS. 8(a) and 8(b), the MANET model 103 performs the function of periodically exchanging the routing information with the other mobile terminals (adjacent nodes) capable of performing direct wireless communication and thereby updating the details of the routing control table 130. When the DTN module 105 is activated by the instruction to perform the startup from the switching control module 101, the DTN module 105 performs the same functions as those of the DTN transmission portion 140, the IPND transmission/reception portion 141 and the received IPND analysis portion 142 in FIGS. 8(a) and 8(b).

The OS/API 106 not only provides the execution environment of the MANET model 103 and the DTN module 105 but also has the role of performing the same function as the protocol lower layer 150 of FIG. 7 when seen from the MANET model 103 and the DTN module 105. Furthermore, among the functions performed by the MANET transmission portion 120 in FIGS. 8(a) and 8(b), the OS/API 106 performs the function of routing the data and packets while referencing the routing control table 130.

When the mobile terminal 100 is operated in the MANET mode, the operation of transmitting and receiving the data and packets in the End-To-End by the switching control module 101 which receives the instruction from the application 110 is performed through the TCP/IP socket interface within the OS/API 106 whereas when the mobile terminal 100 is operated in the DTN mode, the operation of transmitting and receiving the data and packets in the End-To-End by the application 110 is performed through the second APL socket interface 104 and the DTN module 105.

Figure 10:
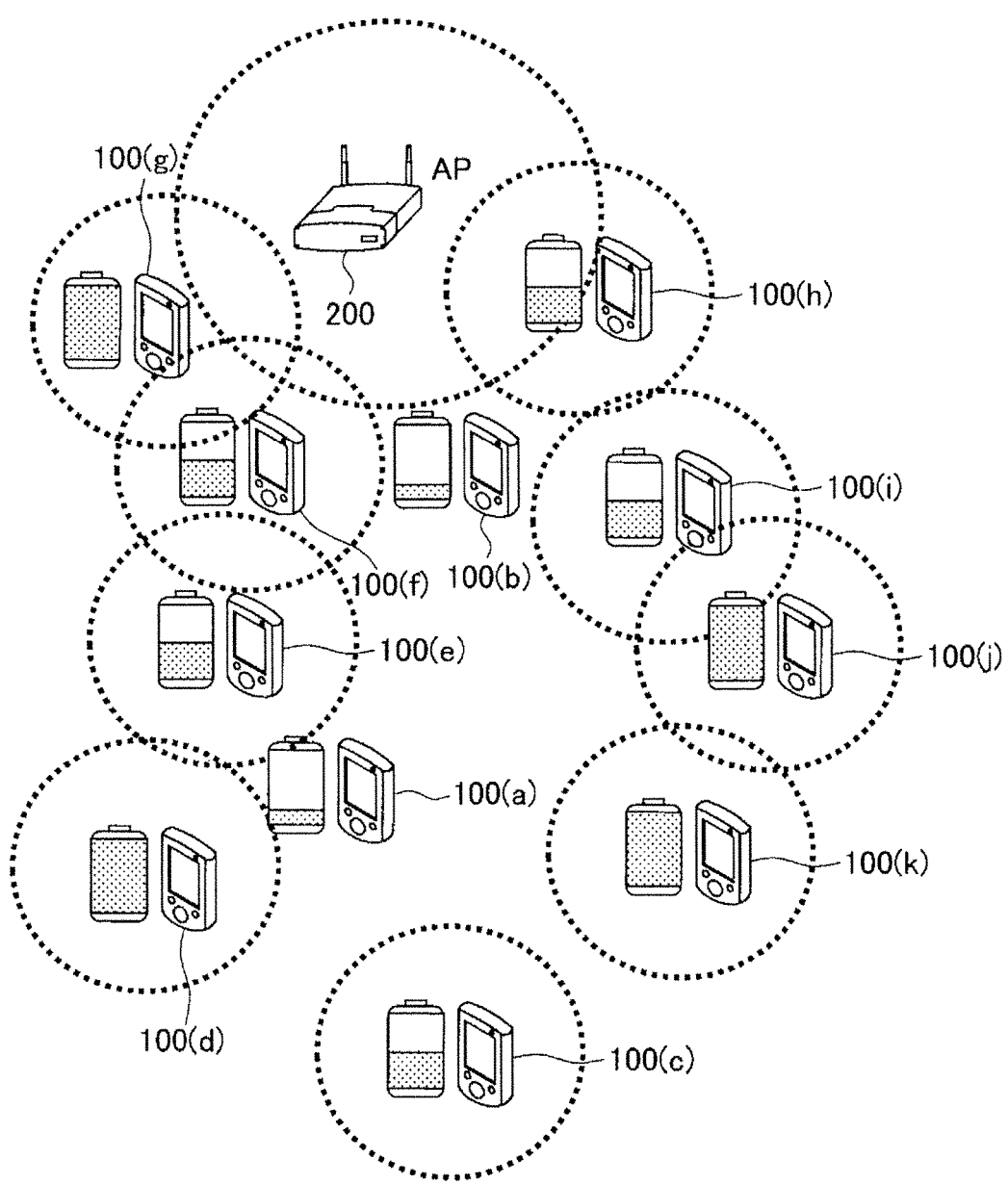
FIG. 10 is a diagram showing a wireless ad-hoc network which is formed with a plurality of mobile terminals 100-(a) to 100-(k) and a wireless access router 200 in order to illustrate a switching function between the MANET and the DTN.
Figure 11:
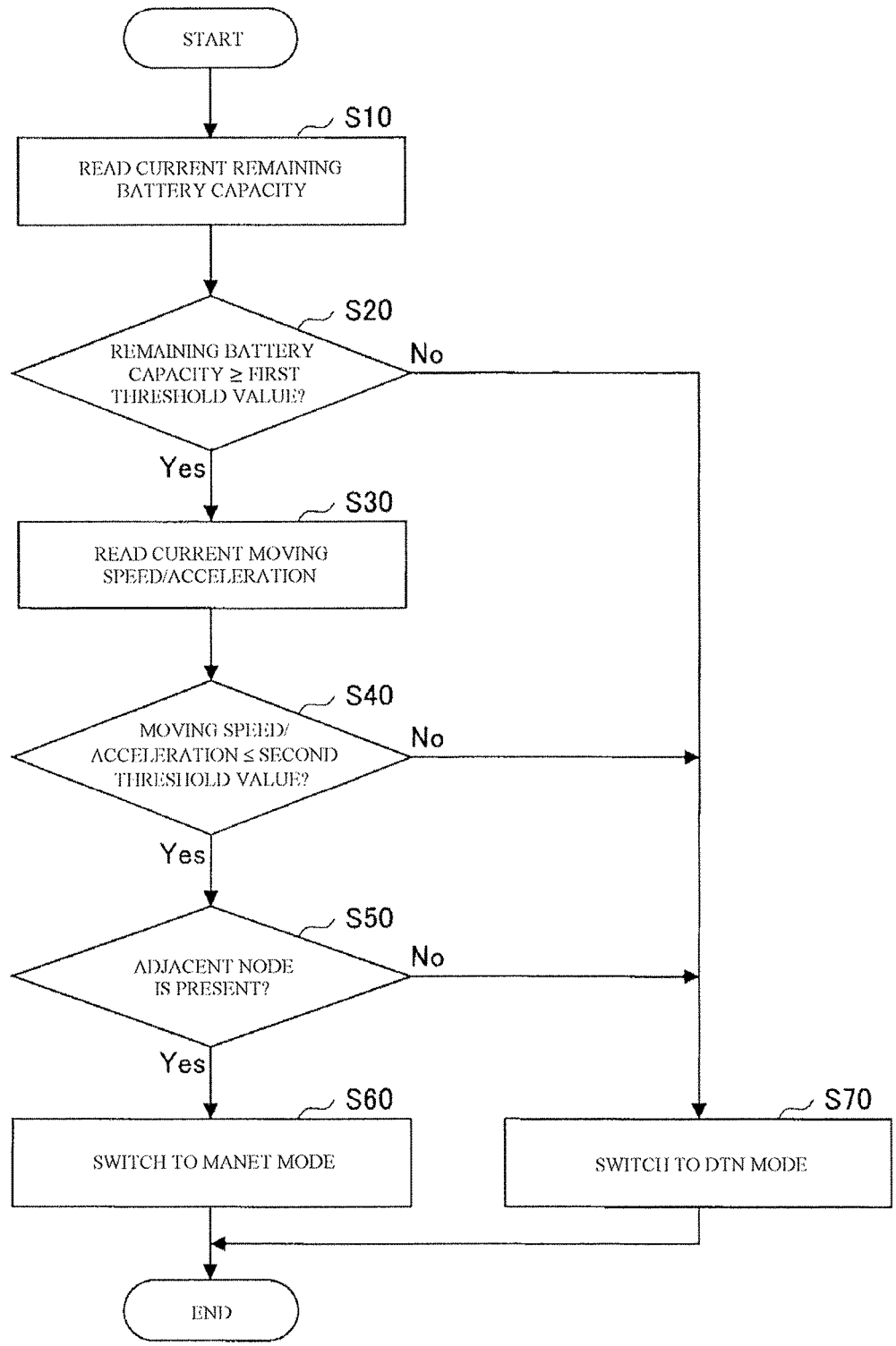
FIG. 11 is a flow chart illustrating the flow of an operation of switching the execution of the packet relay control between a MANET mode and a DTN mode.

<4> Embodiment for Realizing the Function of Switching the Packet Relay Transfer Operation Performed by the Relay Movement Terminal Between the MANET and the DTN FIGS. 10 and 11 are diagrams for illustrating a communication operation performed between mobile terminals in order to realize the function of switching the packet relay operation performed by the relay movement terminal between the MANET and the DTN. An embodiment of the communication operation for realizing the function of switching the packet relay operation performed by the relay movement terminal between the MANET and the DTN will be described with reference to FIGS. 10 and 11.

FIG. 10 shows a wireless ad-hoc network which is formed with a plurality of mobile terminals 100-(a) to 100-(k) and the wireless access router 200 in order to illustrate the switching function between the MANET and the DTN described above. It is now assumed that in FIG. 10, the switching control module 101 being performed on the mobile terminal 100-(a) detects that the remaining battery capacity of the mobile terminal 100-(a) being operated in the MANET mode is very low. Here, the switching control module 101 determines that the mobile terminal 100-(a) cannot stand power consumption caused by the periodical exchange of the routing information with the other mobile terminals 100-(d) and 100-(e) serving as the adjacent nodes and the updating of the routing control table 130. Consequently, the switching control module 101 switches the execution of the packet relay control on the mobile terminal 100-(a) from the MANET mode to the DTN mode in which a smaller amount of power is consumed.

It is also assumed that in FIG. 10, the switching control module 101 being operated on the mobile terminal 100-(b) detects that the mobile terminal 100-(b) being operated in the MANET mode is moved at high speed and thus the wireless channel state between the mobile terminal 100-(f) serving as the adjacent node and the wireless access router 200 becomes unsatisfactory. Here, the switching control module 101 determines that it becomes difficult for the mobile terminal 100-(b) to exchange the routing information with the adjacent node under the satisfactory wireless channel and that at the same time, it is difficult to maintain the stable routing route. Consequently, the switching control module 101 switches the execution of the packet relay control on the mobile terminal 100-(b) from the MANET mode to the DTN mode in which it is not assumed that the stable routing route is maintained.

It is also assumed that in FIG. 10, the switching control module 101 being performed on the mobile terminal 100-(c) detects that the mobile terminal (adjacent node) capable of performing direct wireless communication with the mobile terminal 100-(c) being operated in the MANET mode is not present. For example, such a condition can occur when the mobile terminal 100-(c) is moved a long distance from the original place so as to be far away from the wireless communication coverage of the wireless access router 200 and the wireless communication coverages of all the other mobile terminals. Here, the switching control module 101 determines that it is impossible for the mobile terminal 100-(c) to exchange the routing information with any of the adjacent nodes. Hence, the switching control module 101 determines that it is impossible to update, to the latest state, the correspondence relationship between the adjacent nodes and the End-To-End transfer route which is held by the mobile terminal 100-(c) within the routing control table 130 for each of the routing information entries. Consequently, the switching control module 101 switches the execution of the packet relay control on the mobile terminal 100-(c) from the MANET node to the DTN mode in which it is not necessary to exchange continuous routing information with the adjacent nodes.

FIG. 11 is a flow chart illustrating the flow of an operation of switching the execution of the packet relay control between the MANET mode and the DTN mode by the switching control module 101 (FIGS. 8 and 9) which is performed by the control processor 11 (FIG. 7) within the mobile terminal 100.

In FIG. 11, the processing flow is started from the execution of S10, and the switching control module 101 receives the current remaining battery capacity from the remaining battery capacity meter 19 (FIG. 7) through the bus 21 (FIG. 7). Then, in S20, the switching control module 101 compares the received remaining battery capacity with a first threshold value to determine whether or not the remaining battery capacity is equal to or more than the first threshold value. If the result of the determination is yes, the processing flow proceeds to S30 whereas if it is no, the processing flow proceeds to S70. In S30, the switching control module 101 receives an acceleration vector on the mobile terminal 100 from the three-axis acceleration sensor 18 (FIG. 7) through the bus 21 (FIG. 7), and calculates the current moving speed and the current acceleration. In S40, the switching control module 101 compares any one of the moving speed and the acceleration received with a second threshold value to determine whether or not any one of the moving speed and the acceleration is equal to or less than the second threshold value. If the result of the determination is yes, the processing flow proceeds to S50 whereas if it is no, the processing flow proceeds to S70. In S50, the switching control module 101 determines whether or not another mobile terminal corresponding to the adjacent node capable of performing direct wireless communication with the present terminal is present. If the result of the determination is yes, the processing flow proceeds to S60 whereas if it is no, the processing flow proceeds to S70. The determination as to whether or not the adjacent node is present when seen from the present terminal can be realized by, for example, the following two methods. One of them is a method in which the switching control module 101 searches the routing control table 130 stored within the memory 12 (FIG. 7) and in which whether or not address information or identification information on another mobile terminal serving as the adjacent node is registered within the routing control table 130 is determined. The other method is a method in which at periodical times notified by an isolated node monitoring timer (not shown) incorporated within the mobile terminal, the present terminal determines whether or not a beacon is transmitted from another MANET terminal. In any case, if the correspondence relationship between the adjacent nodes and the End-To-End transfer route held by the specific routing information entry within the routing control table 130 is not updated to the latest one, the routing information entry is deleted as an invalid entry. Consequently, if it is impossible to search for the routing information entry holding the latest details of the correspondence relationship from the routing control table, the switching control module 101 determines that there is no adjacent node. In S60, if the packet relay operation being performed by the mobile terminal 100 is in the DTN mode, it is switched to the MANET mode. In S70, if the packet relay operation being performed by the mobile terminal 100 is in the MANET mode, it is switched to the DTN mode.

In a variation according to the present invention, in S30 of the flow chart shown in FIG. 11, in order to calculate the moving speed and the acceleration of the mobile terminal 100, it is possible to use, instead of the data on the acceleration vector acquired from the three-axis acceleration sensor 18 (FIG. 7), the phase timing information of the GPS satellite signal acquired from the GPS transmission/reception device 20 (FIG. 7). Specifically, the control processor 11 calculates time-series data on the current position of the mobile terminal 100 based on the phase timing information of the satellite signal continuously acquired from the GPS transmission/reception device 20, and calculates, from the result of the analysis of the time-series data, the moving speed and the acceleration of the mobile terminal 100. Hence, that the control processor 11 calculates the moving speed (or the acceleration) of the mobile terminal 100 with the means described above can be adopted as an alternative means for calculating the moving speed (or the acceleration) based on the acceleration vector acquired from the three-axis acceleration sensor 18.

<5> Basic Operating Principle in the Present Embodiment

The present embodiment can be practiced in the mobile terminal 100 shown in FIG. 7 as communication control software which is read on the memory 12 and which is performed by the control processor 11. More specifically, the present embodiment can be implemented in the software structure diagram of the mobile terminal 100 shown in FIG. 9 as part of the functions of the application 110. The present embodiment can be practiced within the wireless network environment shown in FIG. 4 as the packet relay transfer method that is performed by a coordinated operation in which a plurality of mobile terminals relay and transfer the packets to each other. The mobile terminal according to the present embodiment such as the terminal illustrated in FIG. 3 can be practiced as a device for performing the packet relay transfer method according to the present embodiment.

In the wireless network environment shown in FIG. 4, the network is operated in the form in which a plurality of different types of packet relay systems including the MANET mode and the DTN mode are present in a mixed manner. Moreover, in the wireless network environment shown in FIG. 4, each mobile terminal performs the packet relay transfer operation while switching to an appropriate packet relay transfer system according to the variation in the adjacent conditions. The present embodiment is realized based on the wireless network environment described above, and each mobile terminal used in the present embodiment switches the packet relay operation of the present terminal between the MANET mode and the DTN mode according to the variation in the conditions under which the present terminal is placed as shown in FIG. 10. Examples of the variation in the conditions described above include the stability of the wireless channel state, the mobility of the terminal and the variation in the density of the terminals within the adjacent area. In the present embodiment, a large number of mobile terminals which are performing the relay transfer operation of data while switching the packet relay operation between the MANET mode and the DTN mode are organized in units of a terminal group having the network connection topology formed around the GO.

Specifically, in the "relay system based on the terminal group" used in the present embodiment, each of the mobile terminals forming the terminal group is a terminal which is performing the relay transfer operation of data while switching the packet relay operation between the MANET mode and the DTN mode according to the conditions. In other words, in the "relay system based on the terminal group" used in the present embodiment, each terminal group is formed with a collection of the terminals where the MANET mode terminals and the DTN mode terminals are present in a mixed manner. In the "relay system based on the terminal group" used in the present embodiment, the communication between the terminals performed within the terminal group is realized by switching the packet relay operation between the MANET mode and the DTN mode according to the conditions. Hence, it may be necessary that within each terminal group, the MANET mode terminal and the DTN mode terminal directly communicate with each other as the subsequent hop nodes, and that thus the packet relay transfer be performed. A specific method in which the MANET mode terminal and the DTN mode terminal having different packet relay transfer mechanisms directly communicate with each other as the subsequent hop nodes within the same terminal group so as to perform the packet relay transfer will be described later.

In the "relay system based on the terminal group" used in the present embodiment, the End-To-End communication route from the transmission source terminal of the packet to the final destination terminal is not extended beyond the outer edge of the terminal group to which the transmission source terminal belongs. Specifically, the number of hops in the End-To-End communication route depends on the size of the terminal group to which the transmission source terminal belongs, and the size of the terminal group refers to the maximum value of the number of hops in the communication route from the child node terminal located on the outer edge of the terminal group to the GO which is the parent node.

In the "relay system based on the terminal group", it is possible to appropriately select the size of the terminal group according to the wireless channel state and the radio wave condition within the adjacent area around the transmission source terminal and the presence density and the condition of the geographical arrangement of other mobile terminals. Hence, the size of the terminal group is appropriately selected according to the conditions as described above, and thus it is possible to appropriately restrict the upper limit of the number of hops in the End-To-End communication route according to the conditions. Consequently, in the wireless network in which the "table drive-type" or the "storage transfer-type" packet relay transfer is performed, it is possible to avoid the above-described problems caused by increasing the number of hops in the End-To-End communication route.

In the present embodiment, since the size of the terminal group is appropriately selected according to the wireless channel state and the radio wave condition within the adjacent area around the transmission source terminal and the presence density and the condition of the geographical arrangement of other mobile terminals, the size of the terminal group is selected based on the following criteria.

In the present embodiment, for one or more mobile terminals which attempt to wirelessly connect to the GO as the child node terminal within each terminal group, the degree of the stability of the End-To-End communication route with the GO is evaluated. The degree of the stability of the End-To-End communication route between the GO and each child node terminal can be evaluated with the following indexes. For example, the geographical linear distance between the terminal which attempts to newly connect to the GO as the child node terminal and the GO, the number of hops in the communication route between the GO and the terminal which attempts to connect thereto and the like can be used as the indexes for the degree of the stability of the communication route. Moreover, a beacon for communication route diagnosis is reciprocated a plurality of times between the GO and the terminal which attempts to connect thereto, and the communication success rate of the beacon for diagnosis and the average round-trip time of the beacon for diagnosis are measured, with the result that these values can also be used as the indexes for the degree of the stability of the communication route.

If as a result of the evaluation of the degree of the stability of the End-To-End communication route with the GO by the terminal which attempts to connect to the GO, the degree of the stability of the communication route is higher than a predetermined threshold value, the terminal wirelessly connects to the GO as the child node terminal to participate in the terminal group around the GO. If as a result of the evaluation of the degree of the stability of the End-To-End communication route with the GO by the terminal which attempts to connect to the GO, the degree of the stability of the communication route is lower than the predetermined threshold value, the terminal does not wirelessly connect to the GO, and does not participate in the terminal group around the GO. As described above, the network connection topology of the terminal group is formed with one or more child node terminals in which the degree of the stability of the End-To-End communication route with the GO around the GO is equal to or more than the predetermined threshold value, and the size of the resulting terminal group is selected as an appropriate size.

The target of the present embodiment is to realize multi-hop communication without the restriction of the number of hops for relaying and transferring data in the network connection topology formed in units of a terminal group with the group owner (GO: Group Owner) described above. In other words, the present embodiment discloses the technology in which transfer data can be relayed even if the upper limit of the number of hops capable of relaying the transfer data is exceeded in the "relay system based on the terminal group" where the packets are relayed based on the network connection topology formed in units of a terminal group around the GO.

Figure 26:
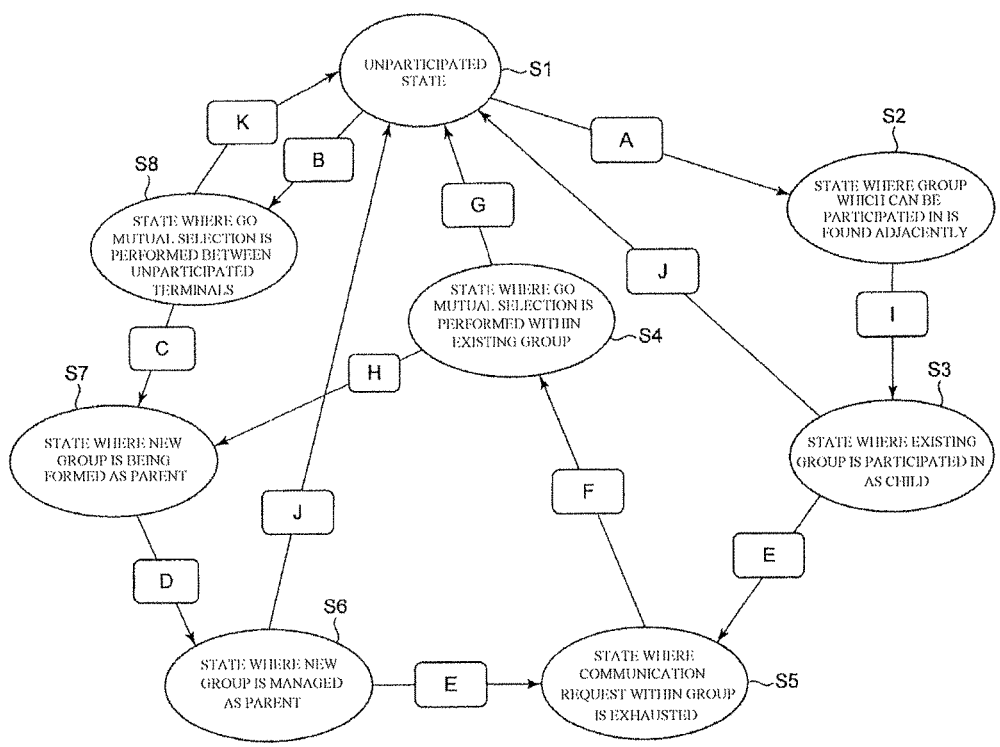
FIG. 26 is a state change diagram showing the change of the state of the operation of each mobile terminal which performs packet relay transfer control according to the present embodiment.

FIG. 26 shows a plurality of terminal states which can be taken, when in the wireless network environment shown in FIG. 4, each of a plurality of mobile terminals performs the packet relay transfer according to the present embodiment, by each of the mobile terminals. The terminal state of each mobile terminal is changed between a plurality of terminal states shown in FIG. 26 according to various trigger phenomena which occur in the process of the execution of the packet relay transfer according to the present embodiment. The conditions of the occurrence of the trigger phenomenon triggering this state change are shown in FIG. 27. The process of the execution of the packet relay transfer according to the present embodiment will be described in detail later in the later description of the present specification.

The "star connection-type relay system" shown in FIG. 3 is the simplest example of the system (relay system based on the terminal group) in which the packets are relayed based on the network connection topology formed in units of a terminal group around the GO.

Hence, in the following description of the present specification, a mechanism for realizing the packet relay system according to the present embodiment in the star connection-type network connection topology performing the "star connection-type relay system" which is the simplest example of the "relay system based on the terminal group" will be described as a first example.

Then, as an example which is more complicated than the "relay system based on the terminal group", a mechanism for realizing the packet relay system that is targeted for a large-scale terminal group in which within one terminal group, the GO (parent node terminal) and the child node terminal can be connected two or more hops apart will be described as a second example.

<5-1> First Example

As a result of the selection of the size of the terminal group based on the degree of the stability of the End-To-End communication route up to the parent node terminal serving as the GO in the "relay system based on the terminal group" according to the present embodiment, in any of the terminal groups, the size is constantly one hop. The first example corresponds to this special case. Since in the first example, in any of the terminal groups, the size is constantly one hop, the network connection topology of each terminal group is the star-type network connection topology shown in FIG. 3, and within the terminal group, the packets are relayed and transferred in the "star connection-type packet relay system".

In the star-type connection network in which the "star connection-type packet relay system" shown in FIG. 3 is performed, the number of hops capable of relaying the transfer data is restricted to two hops. Hence, the first example discloses a technology capable of relaying the transfer data in the star-type connection network shown in FIG. 3 even if the upper limit of the number of hops described above is exceeded. Specific examples of the "star connection-type packet relay system" shown in FIG. 3 include the system (see Non Patent Literature 5) which is standardized in Wi-Fi Alliance as Wi-Fi Direct and other systems (see Non Patent Literatures 6 to 8). For example, the following restrictions on the implementation are present in the "star connection-type packet relay system" specified in the Wi-Fi Direct standards.

Only one GO (Group Owner) is present within one terminal group.

It is possible to perform communication in the form of the star-type connection in which other mobile terminals serving as the child nodes are wirelessly connected to the GO serving as the present node.

It is impossible to transfer, during the operation of the terminal group, the role of the GO from the parent node to the child node, and in order to change the terminal which is operated as the GO, it is necessary to reconfigure the terminal group.

Each mobile terminal which does not participate in the terminal group, when the GO is present within a range where the present terminal can perform communication, wirelessly connects to the GO to participate in the terminal group.

When at least two or more mobile terminals do not participate in any terminal group, an operation for collecting these mobile terminals to form the terminal group is performed.

Under the restrictions on the implementation described above, in the Wi-Fi Direct system, it is impossible to dynamically change the configuration of the terminal group in order to perform the End-To-End transfer of the transfer data with the multi-hop communication from the transmission source to the final destination. Under the restrictions on the implementation described above, in the Wi-Fi Direct system, it is also impossible to dynamically select the optimal GO according to the communication conditions varied from time to time in order to perform the End-To-End transfer with the multi-hop communication. Under the restrictions on the implementation described above, in the Wi-Fi Direct system, it is also impossible to optimize the selection of the child node terminal which is made to participate in each terminal group in order to perform the End-To-End transfer of the transfer data with the multi-hop communication. Consequently, under the restrictions on the implementation described above, in the Wi-Fi Direct system, it is impossible to realize the multi-hop communication without the restriction of the number of hops for relaying and transferring data.

Hence, in the first example, for example, in the "star connection-type relay system" which is specified in the Wi-Fi Direct standards or the like, a mechanism capable of relaying the transfer data even if the upper limit (two hops) of the number of hops described above is exceeded is realized. Specifically, while the relay operation of the transfer data based on the "star connection-type packet relay system" shown in FIG. 3 is being performed, the dissolution and reconfiguration of the existing group are repeated according to the conditions, and each time the group is dissolved/reconfigured, the member configuration and the group shape of the group are changed. Consequently, when the old group is dissolved and a new group is formed, the transfer data is relayed between the mobile terminal which stores the transfer data before the dissolution of the old group and the mobile terminal which newly becomes a group fellow from the outside of the old group.

The dissolution and reconfiguration of the group are repeated, and thus the operation of relaying the transfer data which is stored within the mobile terminal before the dissolution of the group to the mobile terminal which newly becomes a group fellow after the formation of a new group is repeated any number of times. Consequently, as in the storage transfer-type packet relay system like the DTN, it is possible to realize the multi-hop communication without the restriction of the number of hops in the form in which each time the mobile terminal storing the transfer data can be newly and wirelessly connected to another mobile terminal, the transfer data is relayed like a bucket brigade.

At that time, since in the first example, immediately before the dissolution of the group, the mobile terminal in which the number of adjacent node terminals outside the group is the largest is set to the GO for the group after the reconstruction, when seen from the GO, the number of terminals which are newly added to the group fellow from the outside of the group can be maximized after the reconstruction of the group. Consequently, in the present example, in the process in which the dissolution and reconstruction of the group described above are repeated, the efficiency of the spread and the speed of the spread of the stored data in the relay transfer within the group described above can be maximized.

Specifically, when the GO determines that the dissolution of the current terminal group and the reconfiguration of the group are needed, all the mobile terminals belonging to the terminal group calculate a GO selection priority on an individual terminal basis. Typical specific examples of the GO selection priority include an Intent value which will be described below. Other specific examples of the GO selection priority on an individual terminal basis include the number of messages (packets) which are stored in each terminal for relay and transfer to the outside of the terminal group, the relative position of each terminal within the terminal group before the dissolution of the group, an average participation duration in which each terminal participates in the group in a certain period of time in the past, the average time of the transmission time or the reception time of the transfer data by each terminal in a certain period of time in the past and combinations obtained by combining two or more of the above items. As the GO selection priority, the Intent value, the number of messages (packets) which are stored in each terminal for relay and transfer to the outside of the terminal group, the relative position of each terminal within the terminal group before the dissolution of the group, the average participation duration in which each terminal participates in the group in a certain period of time in the past, the average time of the transmission time or the reception time of the transfer data by each terminal in a certain period of time in the past, combinations obtained by combining two or more of above items and the like can be adopted.

For example, when as the GO selection priority, the "relative position of each terminal within the terminal group before the dissolution of the group" is used, as the distance between the present terminal and the GO is increased or as the number of hops between the present terminal and the GO is increased, the GO selection priority calculated on the present terminal is increased. The Intent value will be descried below in detail later. In this way, when seen from the GO, the number of terminals which are newly added to the group fellow from the outside of the group can be maximized after the reconstruction of the group. Consequently, in the present example, in the process in which the dissolution and reconstruction of the group described above are repeated, the efficiency of the spread and the speed of the spread of the stored data in the relay transfer within the group described above can be maximized.

When as the GO selection priority, the average participation duration S [sec] in which each terminal participates in the group in a certain period of time in the past is used, as the average participation duration is increased, the GO selection priority is increased, with the result that it is possible to form a stable group in which the duration as the group is long. When as the GO selection priority, the average time A [sec] of the transmission time or the reception time of the transfer data by each terminal in a certain period of time in the past is used, as the average time is increased, the GO selection priority is increased, with the result that it is possible to form a group in which the transmission and reception of the transfer data are active. When as the GO selection priority, a combination of the two times S [sec] and A [sec] is used, for example, a parameter W is used to assign a weight, and thus a priority P which is determined by priority $P = W \times S + (1-W) \times A$ (where W is a value of 1 to 0) can be used. In this case, the value of W is changed depending on the scene, and thus it is possible to form a group with consideration given to a balance between the stability and the activity.

In the following description, an example where the Intent value is used as the GO selection priority is used.

For example, when the GO determines that the dissolution of the current terminal group and the group reconfiguration are needed, the GO transmits, to all the child node terminals, an instruction to calculate the Intent value on the present terminal so that all the child node terminals within the terminal group are made to calculate the Intent value. Each of the child node terminals receiving the instruction within the terminal group calculates, as the Intent value, the number of terminals which do not belong to the same terminal group as the present terminal among the adjacent node terminals adjacent to the present terminal. Here, the adjacent node terminals refer to adjacent mobile terminals which respond to an adjacent search beacon issued by the present terminal so as to be wirelessly connected as the subsequent hop nodes to the present terminal. Consequently, in the present embodiment, immediately before the dissolution of the group, the mobile terminal in which the number of adjacent node terminals outside the group is the largest is set to the GO for the group after the reconstruction, when seen from the GO, the number of terminals which are newly added to the group fellow from the outside of the group can be maximized after the reconstruction of the group.

When each of the mobile terminals within the terminal group calculates the Intent value on the itself according to the instruction received from the GO, each of the mobile terminals feeds an adjacent search beacon. Furthermore, each of the mobile terminals within the terminal group described above counts the number of terminals which do not belong to the terminal group described above among the adjacent mobile terminals responding to the adjacent search beacon, and thereby calculates the Intent value on the present terminal. The details of the operation of calculating, by each of the mobile terminals within the terminal group, the Intent value on itself will be described later with reference to FIGS. 19 and 20 in the following description.

The GO which receives the Intent values from all the child node terminals within the terminal group selects, as the subsequent new GO, the child node terminal which transmits the maximum Intent value. Then, the GO transmits, to the selected child node terminal, a selection notification for notifying that the child node terminal is selected as the subsequent new GO, and dissolves the current terminal group. The child node terminal receiving the selection notification starts an operation as the subsequent new GO, and in order to form the subsequent new terminal group, the child node terminal feeds an adjacent search beacon. Finally, the terminal which starts the operation as the subsequent new GO determines whether or not a mobile terminal responding to the adjacent search beacon needs to be wirelessly connected as the child node terminal to the subsequent new GO. Specifically, the degree of the stability of a communication route between the mobile terminal responding to the adjacent search beacon fed by the GO and the GO is evaluated, and whether or not the degree of the stability exceeds a predetermined threshold value is determined. When the degree of the stability exceeds the predetermined threshold value, the adjacent mobile terminal is wirelessly connected to the GO to form the subsequent new terminal group. In this way, the adjacent mobile terminal newly participates in the terminal group where the GO is the center of the network connection topology. When the degree of the stability is equal to or less than the predetermined threshold value, the adjacent mobile terminal is prevented from being wirelessly connected to the GO.

Although in the above description, the GO performs the operation of collecting the Intent values calculated for the individual terminals to select the subsequent new GO, such an operation can also be performed by the child node terminal belonging to the same terminal group. In such as case, when the current Go determines that the subsequent new GO needs to be selected, a nomination message is transmitted to one child node terminal which is randomly selected from the same terminal group. Then, the child node terminal receiving the nomination message collects the Intent values calculated for the terminals including the current GO, and performs an operation of selecting the subsequent new GO. Furthermore, the child node terminal receiving the nomination message can also perform, after the operation of selecting the subsequent new GO, instead of the current GO, an operation of dissolving the current terminal group.

As can be understood from the above description, the Intent value calculated within the terminal group on an individual terminal basis plays a role as a relative priority which indicates whether or not each mobile terminal within the terminal group is preferentially selected as the subsequent new GO as compared with the other terminals within the same group.

Furthermore, in the present embodiment, while the activity of the communication within the terminal group is high, the GO within the terminal group continues to maintain the group without dissolving it, and at the time of the dissolution of the group, a state where processing on all executable communication requests within the group is completed is achieved. Hence, immediately after the dissolution/reconstruction of the existing group, the unprocessed communication request is not present within the previous group. Consequently, in the present embodiment, immediately after the reconstruction of the group, relay data stored before the dissolution of the group can be immediately transferred to the terminals which are newly added to the group fellow from the outside of the group, with the result that it is possible to minimize a notification delay.

In a special case, in the initial state where no terminal group is formed within the wireless network, each of the mobile terminals within the wireless network feeds an adjacent search beacon and thereby calculating, as the Intent value, the number of adjacent node terminals around the present terminal. Then, a plurality of mobile terminals which calculate the Intent values of themselves within the wireless network select the GO by mutual selection based on the magnitudes of the Intent values while exchanging the Intent values with each other. For example, the individual mobile terminals which calculate the Intent values of themselves within the wireless network exchange the Intent values with other mobile terminals which are present adjacent to the present terminal. The communication operation in which the individual mobile terminals exchange the Intent values with other mobile terminals which are present adjacent thereto can be realized by using the same data spread method as the infection-type routing control (Epidemic Routing) in the storage transfer-type system (for example, the DTN system) described above. Consequently, each of the mobile terminals within the wireless network produces a list of the Intent value of itself and the Intent values of all the adjacent mobile terminals, and thus the mobile terminal which determines that the Intent value of the present terminal is the largest in the list can start the operation as the GO.

With reference to FIG. 4, in the wireless network environment described above, only the mobile terminal which is operated in the MANET mode can be a candidate which may be selected as the GO, and the mobile terminal which is operated in the DTN mode can be only wirelessly connected as the child node terminal to the GO. As shown in FIG. 4, in the wireless network environment in which the packet relay systems of the MANET mode and the DTN mode are used in a mixed manner, the network connection topology is stable only in a network domain which is formed by the interconnection of the MANET terminals. Specifically, in the present embodiment, only the mobile terminal in which the wireless connection state between a group of the mobile terminals where the network connection topology is stable is constantly stable can be a candidate which may be selected as the GO. In other words, only the mobile terminal belonging to a group of the mobile terminals which are performing the table drive-type packet relay operation while exchanging the routing control table (routing information) with each other between the mobile terminals can be a candidate which is selected as the GO.

Hence, in the process in which transfer data is spread between a large number of mobile terminals by the multi-hop transfer based on the repeated execution of the dissolution/reconstruction of the terminal group, the transfer data cannot be spread beyond the boundary between the MANET network and the DTN network in FIG. 4 into a DTN domain. Here, the DTN domain refers to a network domain which is formed with only terminals that are operated in the DTN mode in the wireless network environment shown in FIG. 4.

In the present embodiment, the reasons why the data spread process based on the repeated execution of the dissolution/reconstruction of the terminal group described above has the configuration in which it is impossible to spread into the DTN domain are as follows.

(Reason 1) Within the DTN domain in which the routing table is not used at all, an effect of reducing the packet relay transfer processing burden by simplifying an arbitrary mesh-type network connection topology into the star-type network connection topology cannot be sufficiently expected as compared with a case where the MANET is used.

(Reason 2) In the DTN domain in which the wireless channel is unstable and in which the mobility is very high, regardless of the form of the network connection topology, it is difficult to stably maintain a topology formed with three or more mobile terminals. Hence, it is difficult to perform the information management of topologies, group member terminals and the like, and even if the information management is achieved, its effectiveness can hardly be expected. Conversely, such processing attempts to be performed, and thus it is more likely that unnecessary communication control is increased, and that as compared with a case where a mechanism in which two mobile terminals simply passing each other exchange messages is adopted, the performance is degraded.

On the other hand, when the mobile terminal already selected as the GO within the terminal group being operated switches the relay transfer operation for relaying the transfer data to, for example, the execution in the DTN system, the mobile terminal selected as the GO cannot continue the operation as the GO. In other words, when the packet relay operation of the mobile terminal selected as the GO in the wireless network environment of FIG. 4 is transferred from the MANET mode to the DTN mode, the terminal transferred to the DTN mode cannot continue the operation as the GO. Hence, the terminal selected as the GO performs the following operation after the transfer to the DTN mode. First, regardless of the height of a communication activity within a terminal group, the terminal selected as the GO immediately dissolves the terminal group, and then Intent values calculated on an individual mobile terminal basis are exchanged between the mobile terminals. Consequently, each of the mobile terminals produces a list of the Intent value of itself and the Intent values of all the adjacent mobile terminals, and thus the mobile terminal which determines that the Intent value of the present terminal is the largest in the list can start the operation as the subsequent new GO.

Then, with reference to FIG. 12, a scenario will be described in which when an old group is dissolved and a new group is formed, between a mobile terminal storing transfer data before the dissolution of the old group and a mobile terminal that newly becomes a group fellow from the outside of the old group, the transfer data is relayed.

Figure 12:
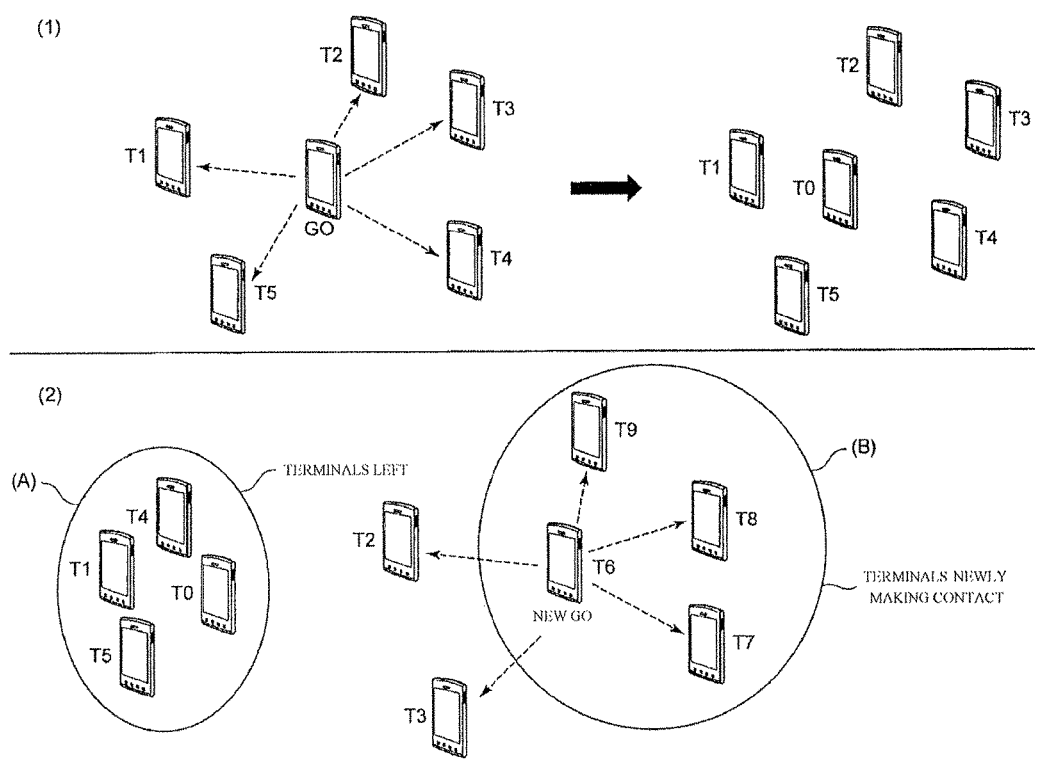
FIG. 12 is a diagram illustrating a scenario in which data is spread through the process of the dissolution/reconfiguration of a group.

In the scenario of FIG. 12, by the repeated execution of the dissolution/reconfiguration of the group, the transfer data stored within the mobile terminal before the dissolution of the group is relayed to the mobile terminal that newly becomes the group fellow after the formation of the new group.

In (1) of FIG. 12, terminals T1 to T5 respond to an adjacent search beacon from the GO to establish wireless connection, and thus a terminal group around the GO is formed. Thereafter, when the terminal group is dissolved, the GO in the terminal group before the dissolution completes the role as the GO and becomes a terminal T0, with the result that the wireless connection between the terminal T0 and the other terminals T1 to T5 disappears.

Then, in (2) of FIG. 12, only the terminals T2 and T3 remain in the positions at the time of the dissolution of the terminal group, and the terminals T0, T1, T4 and T5 included in a circle indicated by (A) in FIG. 12 are moved far. Thereafter, terminals T6 to T9 included in a circle indicated by (B) in FIG. 12 enter a region adjacent to the terminals T2 and T3, GO selection priorities are exchanged between the terminals T2, T3, T6, T7, T8 and T9 and thus the terminal T6 is selected as the new HO. In this case, since the terminals T2 and T3 are terminals which belong to the terminal group before the dissolution of the group indicated by (1) of FIG. 12, they store packets which are communicated between the terminals within the terminal group before the dissolution of the group. Consequently, the packets stored in the terminals T2 and T3 before the dissolution of the group are transferred to the terminals T6 to T9 by communication between the terminals within the new terminal group formed with the terminal T6 set to the new GO.

When such an operation is repeatedly performed, as in the storage transfer-type packet relay system like the DTN, each time the mobile terminal storing the transfer data can be newly and wirelessly connected to another mobile terminal, the transfer data is relayed like a bucket brigade, with the result that the multi-hop communication without the restriction of the number of hops can be realized.

In the present embodiment, it is possible to further increase the efficiency of data spread which is performed for spreading data between a plurality of mobile terminals according to the infection-type (Epidemic), the estimation-type (Estimation) and the coding-type (Coding) routing control disclosed in Non Patent Literatures 10 and 11 and the like. A more specific description will be given below. As compared with the case where as part of the conventional storage transfer-type packet relay operation, the routing control of the infection type, the estimation type, the coding type and the like described above is performed, in the present embodiment, it is possible to efficiently perform communication between terminals for spreading data and to save power consumption in each terminal necessary for communication between terminals. For example, as compared with the case where the routing control of the infection type, the estimation type, the coding type and the like described above is performed, in the present embodiment, it is possible to effectively reduce the number of times a message is transmitted and received between terminals necessary for spreading data to a large number of mobile terminals. Consequently, as compared with the case where the routing control of the infection type, the estimation type, the coding type and the like described above is performed, in the present embodiment, it is also possible to effectively save power consumption in each terminal necessary for spreading data to a large number of mobile terminals.

An illustrative scenario in which as compared with the case where the routing control of the infection type, the estimation type, the coding type and the like described above is performed, in the present embodiment, it is possible to improve the efficiency of data spread and reasons for improving the efficiency of data spread will be described below with reference to FIGS. 13 to 18.

Figure 13:
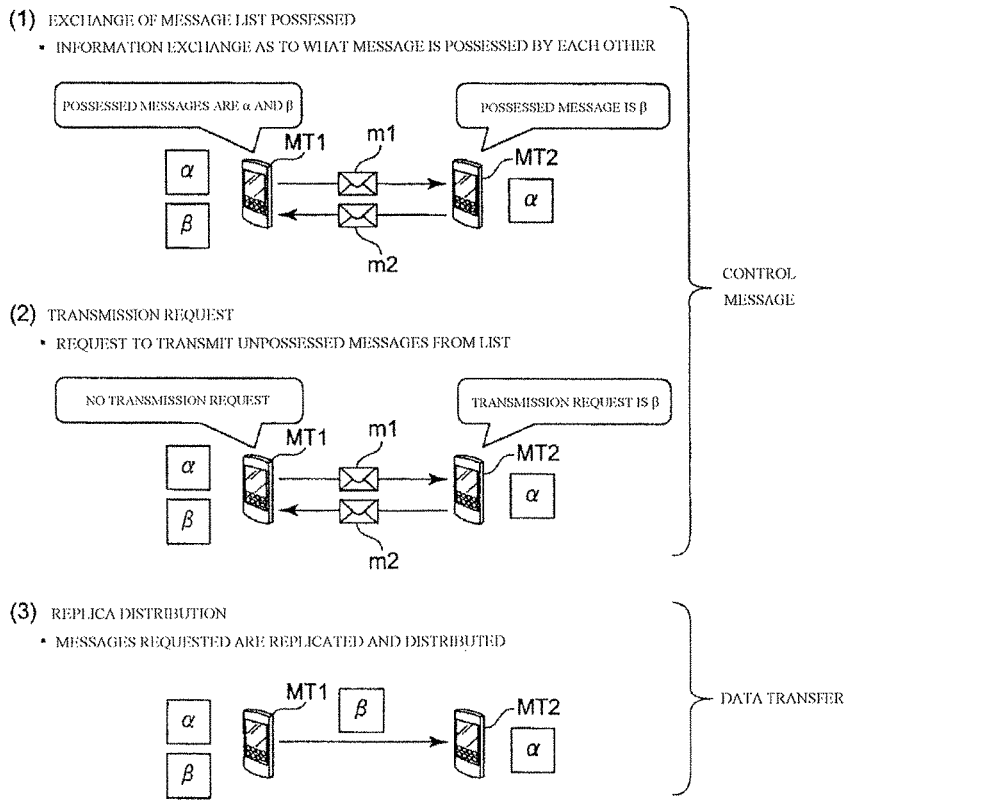
FIG. 13 is a diagram showing effects of replica distribution control in infection (Epidemic)-type routing control.

FIG. 13 shows a scenario illustrating a transfer relay operation in one hop in a process in which data is spread between a large number of terminals according to the infection-type routing control (Epidemic Routing) system.

First, at the time of (1) in FIG. 13, one terminal MT1 stores two pieces of transfer data $\alpha$ and $\beta$, and the other terminal MT2 stores only the data $\alpha$. The MT1 and MT2 exchange messages with each other (messages m1 and m2 indicated in (1) of FIG. 13), and a list of data stored in the present terminal is notified to the terminal on the other side. For example, in (1) of FIG. 13, the MT1 transmits the message m1 to the MT2 so as to notify the MT2 that the MT1 stores the two pieces of transfer data $\alpha$ and $\beta$. At the same time, the MT2 transmits the message m2 to the MT1 so as to notify the MT1 that the MT2 stores only the data $\alpha$.

Then, as shown in (2) of FIG. 13, since the MT2 stores only the data $\alpha$ but does not possess the data $\beta$, the MT2 transmits, to the MT1, as the message m2, a request to transmit the data $\beta$. On the other hand, since the MT1 possesses both the pieces of data $\alpha$ and $\beta$, in the data currently possessed by the MT2, data which is not possessed by the MT1 is not present. Hence, the MT1 transmits, to the MT2, the message m1 indicating that data which is requested to be transmitted from the MT2 is not present.

Finally, as shown in (3) of FIG. 13, the MT1 transmits the data $\beta$ to the MT2 according to the request to transmit the data $\beta$ which is received from the MT2.

In this way, the transfer relay operation in one hop according to the infection-type routing control system is performed, and thus it is possible to share, between two terminals communicating with each other in one hop, all pieces of data possessed by the two terminals between the two terminals.

Figure 14:
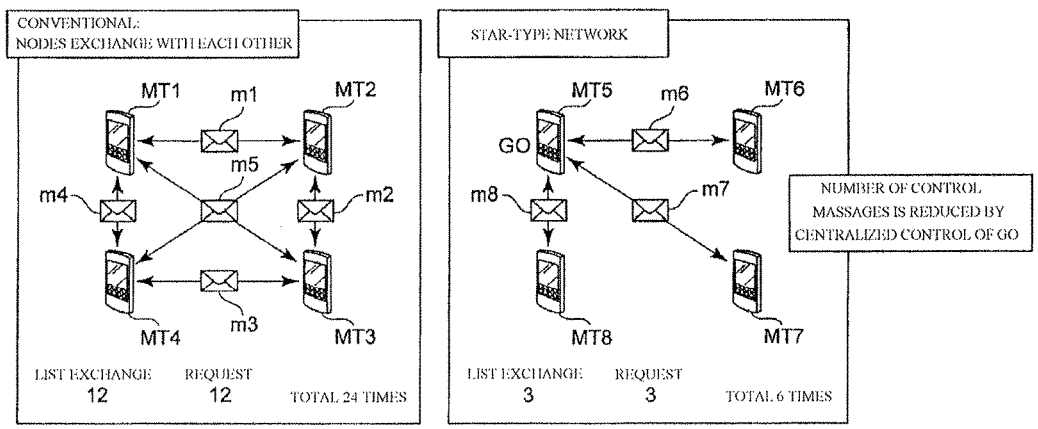
FIG. 14 is a diagram showing effects of the replica distribution control in the infection (Epidemic)-type routing control.

Then, FIG. 14 is a specific example of the result of a comparison between the infection-type routing control (Epidemic Routing) system and the present embodiment in the number of times a message is transmitted and received necessary for sharing, between three or more terminals communicating with each other in one hop, all pieces of data on the terminals. The left diagram of FIG. 14 is a diagram showing, according to the infection-type routing control (Epidemic Routing) system, the transmission and reception of messages necessary for sharing, between four mobile terminals, all pieces of data on the terminals. On the other hand, the right diagram of FIG. 14 is a diagram showing, according to the star connection-type packet relay system of the present embodiment, the transmission and reception of messages necessary for sharing, between four mobile terminals, all pieces of data on the terminals.

In the left diagram of FIG. 14, in order to share, between the four mobile terminals MT1 to MT4, all pieces of data on the terminals, messages represented by m1 to m5 are exchanged. In the left diagram of FIG. 14, the message exchange described above is performed between the four mobile terminals MT1 to MT4, and thus each of the transmission and reception of a list of stored data on an individual terminal basis and the transmission and reception of a request to transmit unpossessed data on an individual terminal basis needs to be performed 12 times.

On the other hand, in the right diagram of FIG. 14, in order to share, between the four mobile terminals MT5 to MT8, all pieces of data on the terminals, messages represented by m6 to m8 are exchanged. In the right diagram of FIG. 14, the message exchange described above is performed between the four mobile terminals MT5 to MT8, and thus the following operation is performed. All stored data and the lists thereof which are possessed by the mobile terminals MT6 to MT8 are collected from the mobile terminals MT6 to MT8 on the MT5 which is operated as the GO. Then, the MT5 which is operated as the GO compares the list of the stored data on an individual terminal basis with the collection of all the data collected from the mobile terminals MT6 to MT8 as described above, and thereby determines what data is not possessed by each of the mobile terminals MT6 to MT8. Finally, the MT5 which is operated as the GO transmits, to the mobile terminals MT6 to MT8, the data which is not possessed by each of the mobile terminals MT6 to MT8. Consequently, in the right diagram of FIG. 14, the message exchange described above is performed between the four mobile terminals MT5 to MT8, and thus each of the transmission and reception of the list of the stored data on an individual terminal basis and each of the transmission and reception of a request to transmit unpossessed data on an individual terminal basis is preferably performed three times.

Hence, in the present embodiment, the advantages of the star-type network connection topology with the GO used as a relay hub are utilized, and thus it is possible to reduce the number of times a message is transmitted and received necessary for sharing, between a plurality of terminals, all pieces of data on the terminals as compared with the infection-type routing control (Epidemic Routing) system. The present embodiment is significant in that not only the number of times a message is transmitted and received is reduced but also it is simultaneously possible to realize the multi-hop communication function in which the transfer data can be relayed and transferred from the transmission source terminal through two or more relay terminals beyond three hops.

Figure 15:
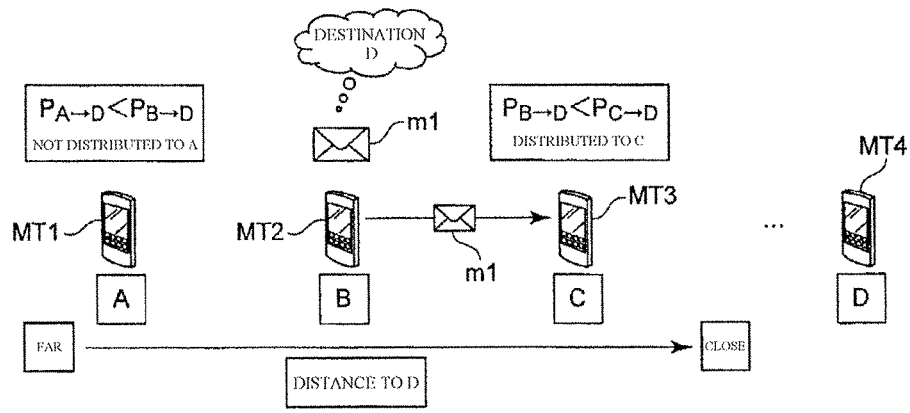
FIG. 15 is a diagram showing effects of replica distribution control in estimation (Estimation)-type routing control.

FIG. 15 shows a scenario illustrating a data transfer relay operation in a process in which data is spread between a large number of terminals according to the estimation-type routing control (Estimation Routing) system. In the estimation-type routing control (Estimation Routing) system, in a series of relay transfer processes for sequentially transferring the transfer data from the mobile terminal of the transmission source to the mobile terminal of the final destination, relay destinations in each hop are selected based on a probability that contact between two terminals occurs. Specifically, when in the relay transfer processes described above, a terminal currently storing the transfer data finds a mobile terminal which has a higher probability that the terminal makes contact with the terminal of the final destination than the present terminal, the found terminal is used as the subsequent hop node, and the transfer data is relayed. However, with respect to the probability of making contact with the terminal of the final destination, when the terminal currently storing the transfer data has a higher probability than the other terminals, the terminal currently storing the transfer data itself uses the terminal of the final destination as the subsequent hop to directly transfer the data.

The term "contact" described above refers to the fact that in a case where connectivity between mobile terminals is intermittent within a network domain in which the storage transfer-type packet relay system such as the DTN is operated, the mobile terminals are brought into a state where they can communicate with each other. Although it is not always possible to previously predict the time and place that mobile terminals make contact with each other, it is possible to previously estimate a probability that specific two terminals make contact with each other. Hence, the probability that the "contact" can occur between two terminals and that is estimated by using the estimation model described above or the like is referred to as "contact probability" between two terminals.

In FIG. 15, it is assumed that the mobile terminal MT2 is the transmission source, that the mobile terminal MT4 is the final destination and that the message m1 is relayed and transferred. It is assumed that when the terminal B serving as the transmission source first relays the message m1, the MT2 is highly likely to make contact with the mobile terminal MT1 and the mobile terminal MT3. Here, when the MT2 relays the message m1 to the subsequent hop, the MT2 determines whether or not the probability that the MT2 itself makes contact with the final destination MT4 is higher than the MT1. At the same time, when the MT2 relays the message m1 to the subsequent hop, the MT2 determines whether or not the probability that the MT2 itself makes contact with the final destination MT4 is higher than the MT3. In FIG. 15, $P_{A \to D}$ represents the contact probability of the MT1 (terminal A) with respect to the MT4 (terminal D) serving as the final destination, $P_{B \to D}$ represents the contact probability of the MT2 (terminal B) with respect to the MT4 (terminal D) serving as the final destination and $P_{C \to D}$ represents the contact probability of the MT3 (terminal C) with respect to the MT4 (terminal D) serving as the final destination. Since in FIG. 15, "$P_{A \to D} < P_{B \to D}$", the MT2 (terminal B) does not relay data to the MT1 (terminal A). On the other hand, since in FIG. 15, "$P_{B \to D} < P_{C \to D}$", the MT2 (terminal B) relays data to the MT3 (terminal C) serving as the subsequent hop. The MT3 (terminal C) to which the data is relayed from the MT2 (terminal B) selects, as in the above case, according to the contact probability with respect to the MT4 (terminal D) serving as the final destination, the mobile terminal serving as the subsequent hop to which the data needs to be relayed. Then, until the data reaches the MT4 (terminal D) serving as the final destination, the same relay transfer operation is repeated.

Figure 16:
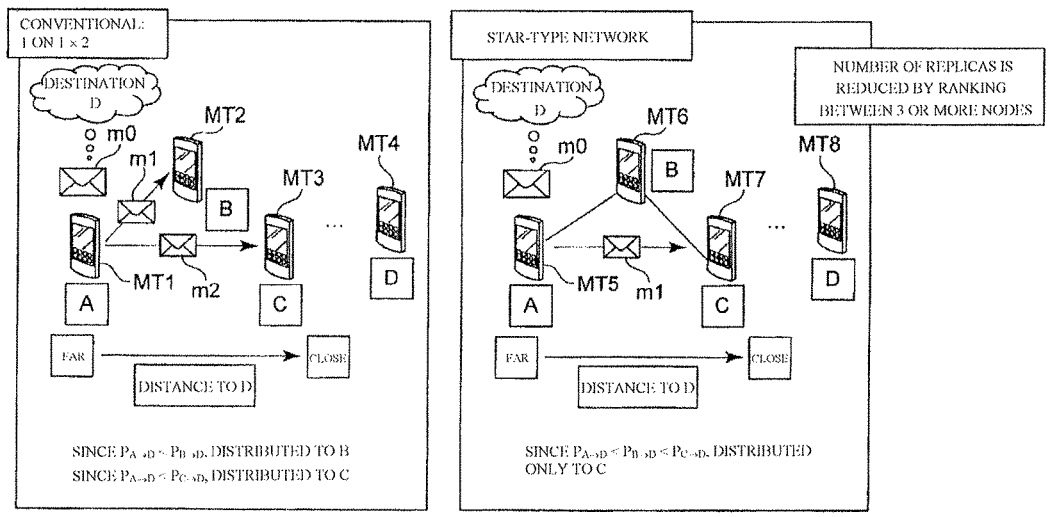
FIG. 16 is a diagram showing effects of the replica distribution control in the estimation (Estimation)-type routing control.

Then, FIG. 16 is a specific example of the result of a comparison between the estimation-type routing control (Estimation Routing) system and the present embodiment in the number of pieces of transfer data replicated in the middle of a process in which the MT1 (terminal A) is assumed to be the transmission source, in which the MT4 (terminal D) is assumed to be the final destination and in which a message m0 is relayed and transferred.

The left diagram of FIG. 16 shows how the transfer data is replicated in the middle of a process in which in the estimation-type routing control (Estimation Routing) system, the MT4 is assumed to be the final destination and in which the message m0 is relayed and transferred. When the MT1 (terminal A) serving as the transmission source first relays the message m0, since "$P_{A \to D} < P_{B \to D}$", the MT1 (terminal A) serving as the transmission source relays the data to the MT2 (terminal B) serving as the subsequent hop. At the same time and in parallel, since "$P_{A \to D} < P_{C \to D}$", the MT1 (terminal A) serving as the transmission source relays the data to the MT3 (terminal C) serving as the subsequent hop. In this case, the MT1 (terminal A) replicates the message m0 to form two messages m1 and m2, and relays and transfers the replicated two messages m1 and m2 to the MT2 (terminal B) and the MT3 (terminal C), respectively.

On the other hand, the right diagram of FIG. 16 shows, in the present embodiment, a process in which the MT5 (terminal A) is assumed to be the transmission source, in which the MT8 (terminal D) is assumed to be the final destination and in which the message m0 is relayed and transferred, and the terminals MT5 (terminal A) to MT7 (terminal C) are assumed to belong to the same terminal group. The GO within the terminal group can collect, from the terminals MT5 (terminal A) to MT7 (terminal C), contact probability information indicating a probability that each of the terminals MT5 (terminal A) to MT7 (terminal C) makes contact with the MT8 (terminal D) serving as the final destination. Here, any one of the terminals MT5 (terminal A) to MT7 (terminal C) can be operated as the GO within the terminal group. The GO sorts all the mobile terminals belonging to the terminal group under control in descending order of the contact probability of making contact with the MT8 (terminal D) serving as the final destination, and can notify the identifier of the terminal whose contact probability is the largest to the MT5 (terminal A) serving as the transmission source of the data. For example, in the case of the right diagram of FIG. 16, the GO sorts all the terminals belonging to the terminal group under control according to the contact probability described above, and consequently, it is found that "$P_{A \to D} < P_{B \to D} < P_{C \to D}$". Hence, the GO determines that within the terminal group under control, the terminal in which the contact probability of making contact with the MT8 (terminal D) serving as the final destination is the largest is the MT7 (terminal C), and instructs the MT5 (terminal A) to relay the message m0 to the MT7 (terminal C) serving as the subsequent hop (m1 in the right diagram of FIG. 16).

Hence, in the case of the present embodiment shown in the right diagram of FIG. 16, it is sufficient that one message is relayed to the subsequent hop without the message m0 being replicated to form the two messages as in the left diagram of FIG. 16.

In the estimation-type routing control (Estimation Routing) system shown in the left diagram of FIG. 16, the present terminal storing the data only determines whether or not the adjacent node terminal is higher in the contact probability with respect to the final destination than itself, and if the adjacent node terminal is higher than itself, the present terminal only relays the data to the adjacent node terminal. Hence, when two or more adjacent node terminals which can simultaneously communicate with the present terminal storing the data are present, it is impossible to determine, between these adjacent node terminals, a relative magnitude relation of the contact probability with respect to the final destination. By contrast, in the present embodiment shown in the right diagram of FIG. 15, processing for determining the relative magnitude relation of the contact probability with respect to the final destination between all the terminals belonging to the same terminal group can be performed by the GO.

Hence, in the present embodiment, the advantages of the star-type network connection topology with the GO used as a relay hub are utilized, and thus it is possible to improve the efficiency of the spread of messages between an unspecified large number of terminals. The present embodiment is significant in that not only the number of times a message is transmitted and received is reduced but also it is simultaneously possible to realize the multi-hop communication function in which the transfer data can be relayed and transferred from the transmission source terminal through two or more relay terminals beyond three hops.

Figure 17:
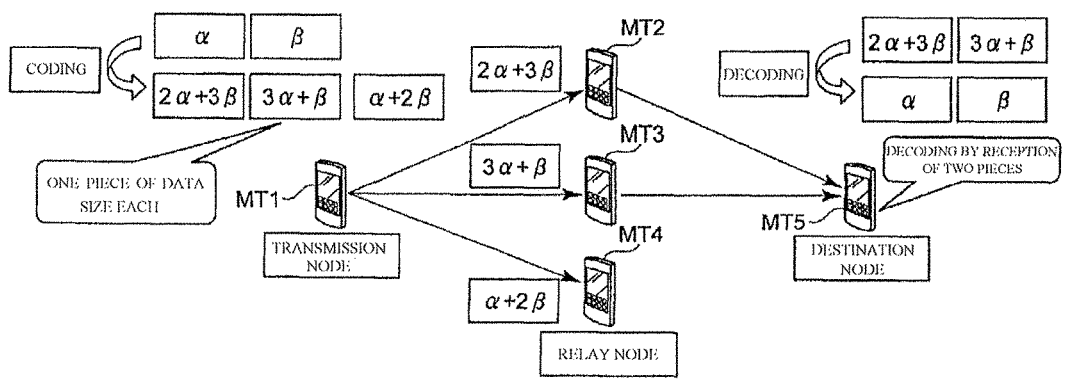
FIG. 17 is a diagram showing effects of replica distribution control in estimation (Coding)-type routing control.

FIG. 17 shows a scenario illustrating a data transfer relay operation in a process in which data is spread between a large number of terminals according to the coding-type routing control (Coding Routing) system. In the infection-type routing control (Epidemic Routing) system, in order to increase a packet arrival rate to the final destination, it is necessary to spread between a large number of mobile terminals while each packet is replicated a sufficient number of times. In the coding-type routing control (Coding Routing) system, since a plurality of information packets can be included in one coded packet, while a high message arrival rate to the final destination is maintained, it is possible to reduce the number of messages replicated when the message spread is performed between a large number of mobile terminals.

In the coding-type routing control (Coding Routing) system, when the number of pieces of data which need to reach the terminal serving as the final destination from the terminal of the transmission source is assumed to be N, the number of messages replicated when the message spread is performed between a large number of mobile terminals is N+R. Here, R represents a redundant number among the number of messages replicated to increase a probability that N pieces of data reach the final destination. For example, in FIG. 17, since the terminal MT1 serving as the transmission source possesses two pieces of data α and β as data which needs to reach the terminal serving as the final destination, N=2. In FIG. 17, since three messages replicated by coding in the MT1 are respectively relayed and transferred to the three terminals MT2 to MT4 serving as the subsequent hops, N+R=3, and R=1. In the MT1, the two pieces of data α and β are replicated based on a Reed-Solomon coding system or the like as three coded messages "2α+3β", "3α+β" and "α+2β". The coded message "2α+3β" is a message which is obtained by synthesizing, through coding, information obtained by doubling the data α and information obtained by tripling the data β. Likewise, the coded message "3α+β" is a message which is obtained by synthesizing, through coding, information obtained by tripling the data α and information obtained by multiplying the data β by 1. Likewise, the coded message "α+2β" is a message which is obtained by synthesizing, through coding, information obtained by multiplying the data α by 1 and information obtained by doubling the data β. In FIG. 17, when the terminal MT5 serving as the final destination receives the two coded messages "2α+3β" and "3α+β", the MT5 decodes the two pieces of data α and β from these two coded messages with Reed-Solomon decoding processing, and thereby acquires them. The data decoding performed with the Reed-Solomon decoding processing can be considered to be an analogy to the solving of a simultaneous equation in which two equations "first coded message=$2\alpha+3\beta$" and "second coded message=$3\alpha+\beta$" are simultaneous. Hence, it is found that in order to acquire N pieces of data in the final destination by decoding, it is preferable for the final destination to receive at least N coded messages among N+R coded messages replicated and spread between a large number of relay terminals.

Figure 18:
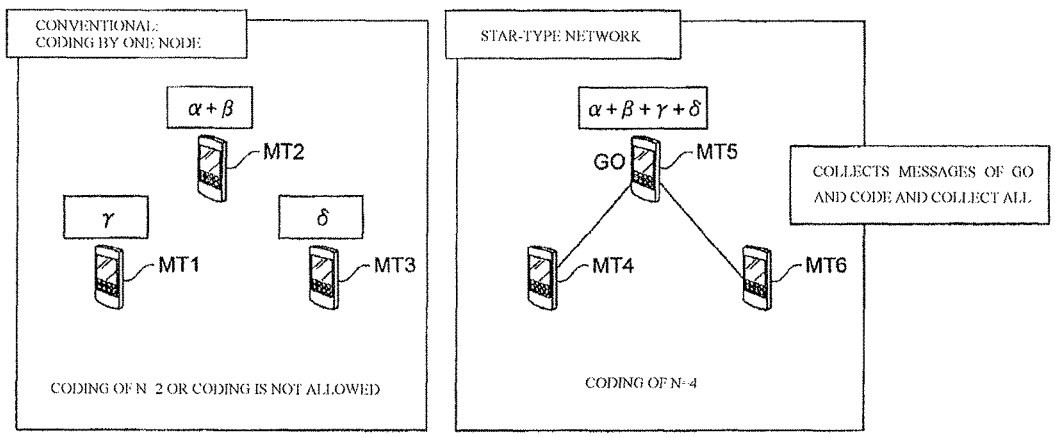
FIG. 18 is a diagram showing effects of the replica distribution control in the estimation (Coding)-type routing control.

FIG. 18 is a specific example of the result of a comparison between the coding-type routing control (Coding Routing) system and the present embodiment in the number of pieces of data which can be synthesized and included within one coded message by Reed-Solomon coding.

The left diagram of FIG. 18 illustrates a scenario in which data is coded by the transmission source terminal according to the coding-type routing control (Coding Routing) system, and illustrates the three terminals MT1 to MT3 each of which is a data transmission source. In the left diagram of FIG. 18, the MT2 possesses two pieces of data $\alpha$ and $\beta$ which need to be delivered to the final destination, the MT1 possesses one piece of data $\gamma$ which needs to be delivered to the final destination and the MT3 possesses one piece of data $\delta$ which needs to be delivered to the final destination. Since each of the MT2 and the MT3 possesses only one piece of data which needs to be delivered to the final destination, the data cannot be synthesized by coding.

On the other hand, the right diagram of FIG. 18 illustrates a scenario in which data is coded by the transmission source terminal according to the present embodiment, and illustrates the three terminals MT4 to MT6 each of which is a data transmission source. In the right diagram of FIG. 18, it is assumed that the three terminals MT4 to MT6 belong to the same terminal group, that the MT5 is operated as the GO and that the MT5 can collect, as the GO, data from all the terminals within the group. In this case, the MT5 collects all pieces of data $\alpha$, $\beta$, $\gamma$ and $\delta$ possessed by all the three terminals MT4 to MT6 on the present terminal, synthesizes, by coding (for example, Reed-Solomon coding processing), these four pieces of data $\alpha$, $\beta$, $\gamma$ and $\delta$ and thereby can generate a single coded message "$\alpha+\beta+\gamma+\delta$".

Hence, in the coding-type routing control (Coding Routing) shown in the left diagram of FIG. 18, the MT1 and MT3 cannot synthesize a coded message by coding a plurality of pieces of data, and the MT2 can synthesize only a coded message of N=2 whereas in the present embodiment shown in the right diagram of FIG. 18, it is possible to generate a coded message of N=4 by coding all the pieces of data collected from all the terminals within the group. Hence, in the present embodiment, it is possible to spread, in the form in which a larger number of pieces of data than the conventional method are included on one message by the use of coding, the message between a large number of relay terminals.

Hence, in the present embodiment, the advantages of the star-type network connection topology with the GO used as a relay hub are utilized, and thus it is possible to spread, in the form in which a larger number of pieces of data than the conventional method are coded on one message, the message between a large number of relay terminals. The present embodiment is significant in that not only the amount of information which can be coded on one message is increased as described above but also it is simultaneously possible to realize the multi-hop communication function in which the transfer data can be relayed and transferred from the transmission source terminal through two or more relay terminals beyond three hops.

Although in the present embodiment, consideration is not given to the number of channels in each terminal, basically, under a dispersion control system such as CSMA/CA with RTS/CTS, the operation can be performed with only one channel. However, as the number of channels is increased, the efficiency of the operation is enhanced. For example, in the multiplex communication of a frequency-division system or a time-division system such as an orthogonal frequency division multiplexing system used in WLAN, LTE or the like or a system obtained by combining these systems, a plurality of frequency regions and time regions divided are allocated to each channel, and thus it is possible to use each channel for a different application. Examples of such an application include the following applications.

(A) Applications for mutual selection of the GO
   (a) Exchange of priorities (such as the Intent value) between terminals
   (b) Collection of information necessary for calculating priorities from adjacent terminals (B) Applications for group formation
   (a) Transmission of an adjacent search beacon in order to notify the presence of the GO serving as the new GO
   (b) Communication for a response to participate in the GO and a decision to participate therein between terminals (C) Applications for group management
   (a) Communication for checking the presence of the child node terminal
   (b) Notification of the dissolution of the group These applications are allocated to the individual channels, and thus it is possible to perform the efficient operation. Among these applications, the individual channels are divided into a channel in which transmission is performed from the GO to the child node terminal and a channel in which transmission is performed from the child node terminal to the GO, and thus the management and control of the operation are facilitated.

<5-2> Second Example

A second example will be described below with reference to FIG. 19. In the following description of the second example, the same description as in the first example will be omitted, and only differences from the first example will be described.

As in the first example, in the second example, after the GO determines that the dissolution and the reconfiguration of the terminal group are performed, the GO which receives the Intent values from all the child node terminals within the terminal group selects, as the subsequent new GO, the child node terminal which transmits the maximum Intent value. Then, the GO transmits, to the selected child node terminal, a selection notification for notifying that the child node terminal is selected as the subsequent new GO, and dissolves the current terminal group. The child node terminal receiving the selection notification starts an operation as the subsequent new GO, and in order to form the subsequent new terminal group, the child node terminal feeds an adjacent search beacon.

As in the first example, in the initial state where no terminal group is formed within the wireless network, each of the mobile terminals within the wireless network feeds an adjacent search beacon and thereby calculating, as the Intent value, the number of adjacent node terminals around the present terminal. Then, a plurality of mobile terminals which calculate the Intent values of themselves within the wireless network select the GO by mutual selection based on the magnitudes of the Intent values while exchanging the Intent values with each other.

In any case, when in the second example, a new GO which needs to be the center of a new terminal group that will be formed in the future is selected, in the second example, the following operation is performed. The terminal that starts the operation as the new GO which needs to be the center of the new terminal group determines whether or not an adjacent mobile terminal responding to the adjacent search beacon needs to be wirelessly connected as the child node terminal to the new GO. Specifically, the degree of the stability of a communication route between the adjacent mobile terminal responding to the adjacent search beacon fed by the new GO and the GO is evaluated, and whether or not the degree of the stability exceeds a predetermined threshold value is determined. When the degree of the stability exceeds the predetermined threshold value, the adjacent mobile terminal is wirelessly connected to the GO to form the subsequent new terminal group. In this way, the adjacent mobile terminal newly participates in the terminal group where the GO is the center of the network connection topology. When the degree of the stability is equal to or less than the predetermined threshold value, the adjacent mobile terminal is prevented from being wirelessly connected to the GO.

As described above, unlike the case of the first example, it is likely that the mobile terminal which newly participates in the terminal group as the child node terminal can be wirelessly connected to the GO through a communication route of two hops or more. For example, in FIG. 19, a child node terminal C-A is a child node terminal which is directly connected to the GO without the intervention of another relay terminal so as to newly participate in the terminal group as the adjacent node terminal located in the subsequent hop when seen from the GO. As with the GO, the child node terminal C-A starts to feed an adjacent search beacon. The adjacent search beacon fed by the new child node terminal C-A is, as with the adjacent search beacon fed by the GO, a trigger for making other unparticipated terminals C-B to C-E located around a terminal group g1 to which the terminal C-A of the beacon feeding source belongs participate in the terminal group.

Figure 19:
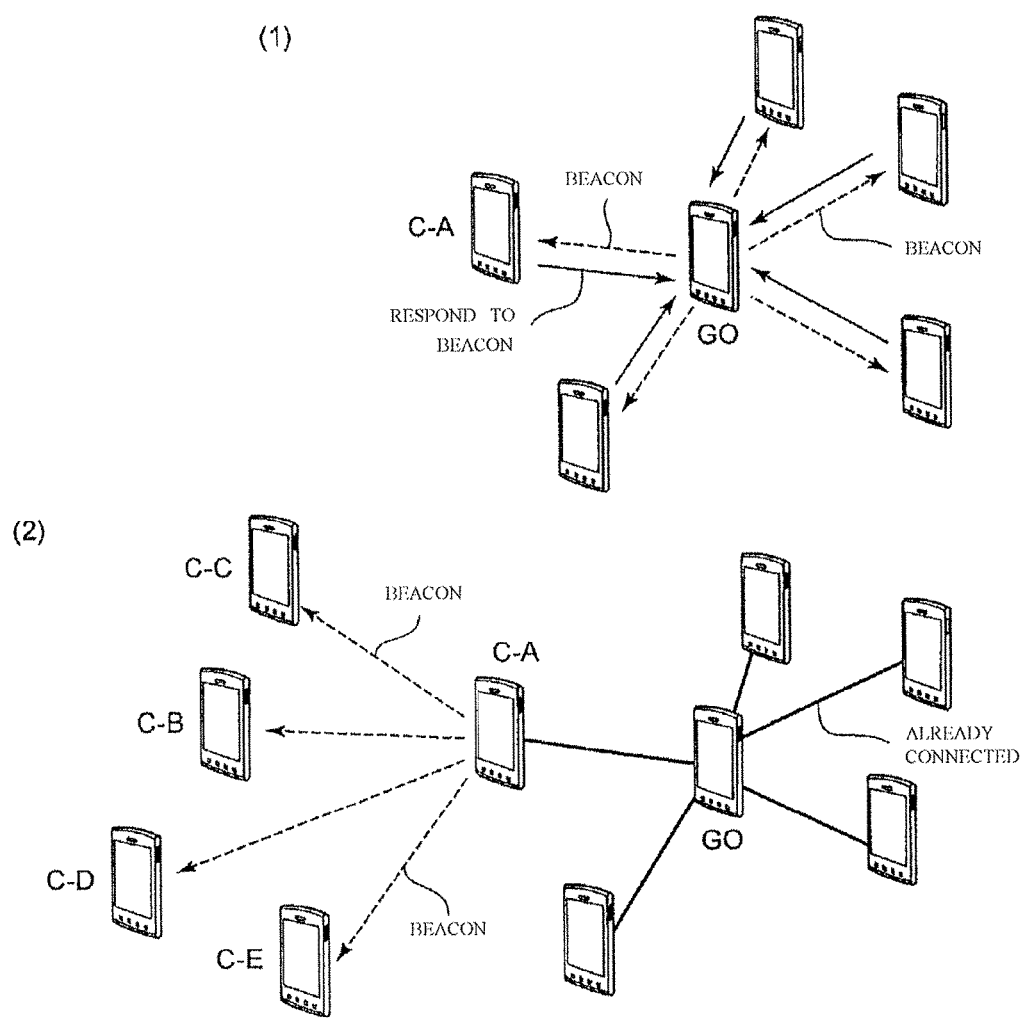
FIG. 19 is a diagram showing how a terminal group is formed in a second example according to the present embodiment.

When the child node terminal C-B shown in FIG. 19 responds to the adjacent search beacon fed by the child node terminal C-A serving as the beacon feeding source, in the second example, the degree of the stability of a communication route which ranges from the terminal C-B to the GO and which has a length of two or more hops with the child node terminal C-A serving as the beacon feeding source used as a relay node is evaluated. For example, the geographical linear distance between the terminal which attempts to newly connect to the GO as the child node terminal and the GO, the number of hops in the communication route between the GO and the terminal which attempts to connect thereto and the like can be used as the indexes for the degree of the stability of the communication route. Moreover, a beacon for communication route diagnosis is reciprocated a plurality of times between the GO and the terminal which attempts to connect thereto, and the communication success rate of the beacon for diagnosis and the average round-trip time of the beacon for diagnosis are measured, with the result that these values can also be used as the indexes for the degree of the stability of the communication route. When the degree of the stability evaluated on the communication route which ranges from the terminal C-B to the GO and which has a length of two or more hops exceeds a predetermined threshold value, the terminal C-B uses the terminal C-A as a relay node to indirectly connect to the GO, and further participates in the terminal group as the new child node terminal. When the degree of the stability evaluated on the communication route which ranges from the terminal C-B to the GO and which has a length of two or more hops is equal to or less than the predetermined threshold value, the terminal C-B does not participate in the terminal group.

As described above, even in the second example, for one or more mobile terminals which attempt to wirelessly connect to the GO as the child node terminal within each terminal group, the degree of the stability of the End-To-End communication route with the GO is evaluated. When the terminal which attempts to connect to the GO evaluates the stability of the End-To-End communication route with the GO, and consequently, the degree of the stability of the communication route is higher than the predetermined threshold value, the terminal is wirelessly connected as the GO to the child node terminal so as to participate in the terminal group around the GO. When the terminal which attempts to connect to the GO evaluates the stability of the End-To-End communication route with the GO, and consequently, the degree of the stability of the communication route is lower than the predetermined threshold value, the terminal is not wirelessly connected as the GO to the child node terminal, and does not participate in the terminal group around the GO. As described above, with one or more child node terminals in which the degree of the stability of the End-To-End communication route with the GO around the GO is equal to or more than the predetermined threshold value, the network connection topology of the terminal group is formed, and the size of the resulting terminal group is selected as an appropriate size.

<6> Calculation of Intent Value

A method of calculating the Intent value on an individual mobile terminal basis when the mobile terminal serving as the GO for managing the terminal group is selected will be described below with reference to FIGS. 20 and 21. In the following calculating method which will be described with reference to FIGS. 20 and 21, for ease of the description, it is assumed that the mobile terminals are grouped into terminal groups which have the network connection topology shown in FIG. 3, and that the mobile terminals perform the packet relay transfer operation described in the first example.

Figure 20:
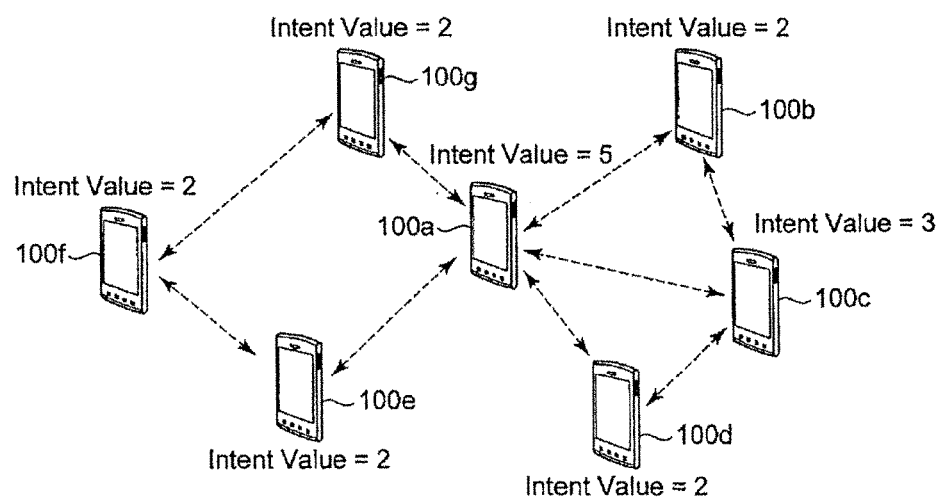
FIG. 20 is a diagram illustrating a method of determining an Intent value in an initial state.

FIG. 20 is a diagram for illustrating a method of calculating the Intent value on an individual mobile terminal basis in the initial state where no terminal group is formed within the wireless network. In the initial state shown in FIG. 20, each of the mobile terminals within the wireless network feeds an adjacent search beacon to calculate the number of adjacent node terminals around the present terminal as the Intent value. Here, the adjacent node terminal refers to an adjacent mobile terminal which responds to the adjacent search beacon issued by the present terminal so as to be wirelessly connected as the subsequent hop node to the present terminal.

For example, in FIG. 20, the Intent values of the terminals 100a, 100b, 100c, 100d, 100e, 100f and 100g are 5, 2, 3, 2, 2 and 2, respectively. Then, the terminals 100a, 100b, 100c, 100d, 100e, 100f and 100g which have calculated the Intent values of themselves within the wireless network select the GO based on the magnitudes of the Intent values by mutual selection while exchanging the Intent values with each other. For example, each of the terminals 100a, 100b, 100c, 100d, 100e, 100f and 100g which have calculated the Intent values of themselves within the wireless network exchanges the Intent values with other mobile terminals adjacent to the present terminal. Consequently, the terminal 100a which has the maximum Intent value is selected as the GO.

Figure 21:
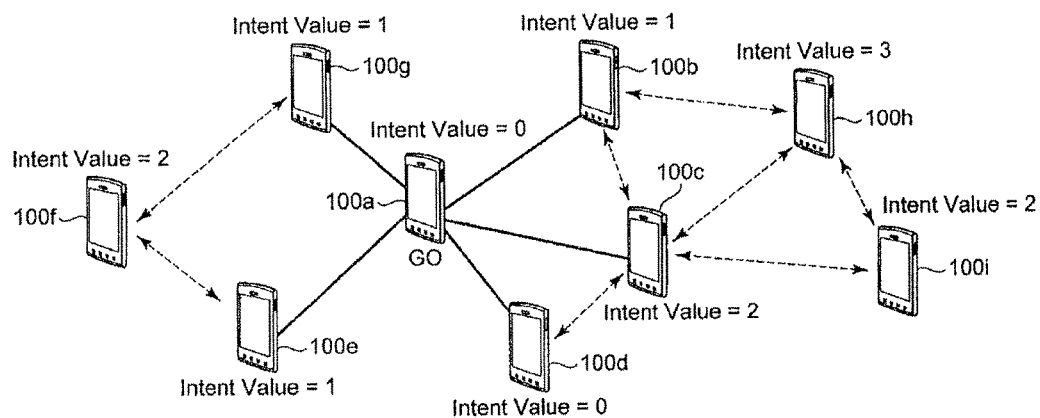
FIG. 21 is a diagram illustrating a method of determining the Intent value when an existing group is temporarily dissolved and a new group is reconstructed.

FIG. 21 is a diagram for illustrating a method of calculating the Intent value on an individual mobile terminal basis in a state where the first terminal group is formed after the initial state in which no terminal group is formed and where the repeated execution process of the dissolution and reconfiguration of the terminal group is already started. In this state, when the GO determines that it is necessary to perform the dissolution of the current terminal group and the reconfiguration of the group, in order to make all the child node terminals within the terminal group calculate the Intent values, the GO transmits an instruction to calculate the Intent value of the present terminal to the all the child node terminals.

For example, in FIG. 21, the terminals 100a, 100b, 100c, 100d, 100e and 100g belong to the same terminal group, and the terminal 100a is the GO which manages the terminal group. In FIG. 21, terminals 100f, 100h and 100i do not belong to the terminal group described above. When the terminal 100a determines that it is necessary to perform the dissolution of the current terminal group and the reconfiguration of the group, the terminal 100a transmits an instruction to calculate the Intent value to the child node terminals 100b, 100c, 100d, 100e and 100g within the terminal group.

Each of the child node terminals 100b, 100c, 100d, 100e and 100g within the terminal group which receive the instruction counts, among the terminals 100f, 100h and 100i which do not belong to the terminal group, the number of terminals that are connected as the adjacent node terminals to the present terminal, and thereby calculates the Intent value. In FIG. 21, since the two terminals 100h and 100i which do not belong to the terminal group are connected as the adjacent node terminals to the child node terminal 100c, the Intent value of the child node terminal 100c is calculated to be 2. Likewise, in FIG. 21, the Intent values of the terminals 100a, 100b, 100d, 100e and 100g are calculated to be 0, 1, 0, 1 and 1, respectively.

The Intent values of the terminals 100f, 100h and 100i which do not belong to the terminal group can be previously determined by the same method as shown in FIG. 20 regardless of the state of the operation of the terminal group described above.

Figure 22:
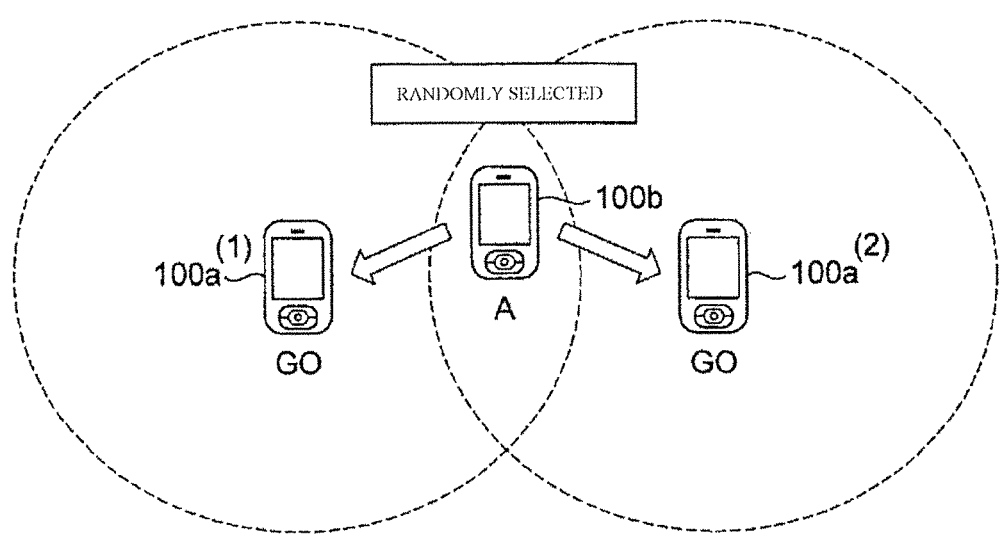
FIG. 22 is a diagram illustrating a scenario in which when two or more GOs (group owner) are simultaneously present within the communication allowable range of the present terminal, the present terminal is selectively connected to any one of the GOs.

When the GO is temporarily selected based on the Intent value calculated according to the method described with reference to FIG. 20 or 21 on an individual mobile terminal basis, the other mobile terminals located adjacent thereto respond to an adjacent search beacon from the selected GO so as to be wirelessly connected to the GO. In this way, each of the mobile terminals responding to the adjacent search beacon participates in the terminal group around the GO. Here, when as shown in FIG. 22, one mobile terminal 100b almost simultaneously receives adjacent search beacons from two or more GOs (the terminals 100a $^{(1)}$ and 100a $^{(2)}$) located adjacent thereto, the terminal 100b randomly selects the GO which needs to be wirelessly connected. In other words, in FIG. 22, the mobile terminal 100b randomly selects any one of the terminals 100a $^{(1)}$ and 100a $^{(2)}$ as a connection terminal.

<7> Flow of the Detailed Operation in the Present Embodiment

The flow of the detailed processing operation in the present embodiment will be described below with reference to the flow charts of FIGS. 23 to 25. The present embodiment can be practiced as communication control software which is read on the memory 12 in the mobile terminal 100 shown in FIG. 7 and which is performed by the control processor 11. More specifically, the present embodiment can be implemented as part of the function of the application 110 in the software configuration diagram of the mobile terminal 100 shown in FIG. 9.

FIG. 26 shows a plurality of terminal states which can be taken, when in the wireless network environment shown in FIG. 4, each of a plurality of mobile terminals performs the packet relay transfer according to the present embodiment, by each of the mobile terminals. The terminal state of each mobile terminal is changed between a plurality of terminal states shown in FIG. 26 according to various trigger phenomena which occur in the process of the execution of the packet relay transfer according to the present embodiment. The conditions of the occurrence of the trigger phenomenon triggering this state change are shown in FIG. 27.

Figure 23:
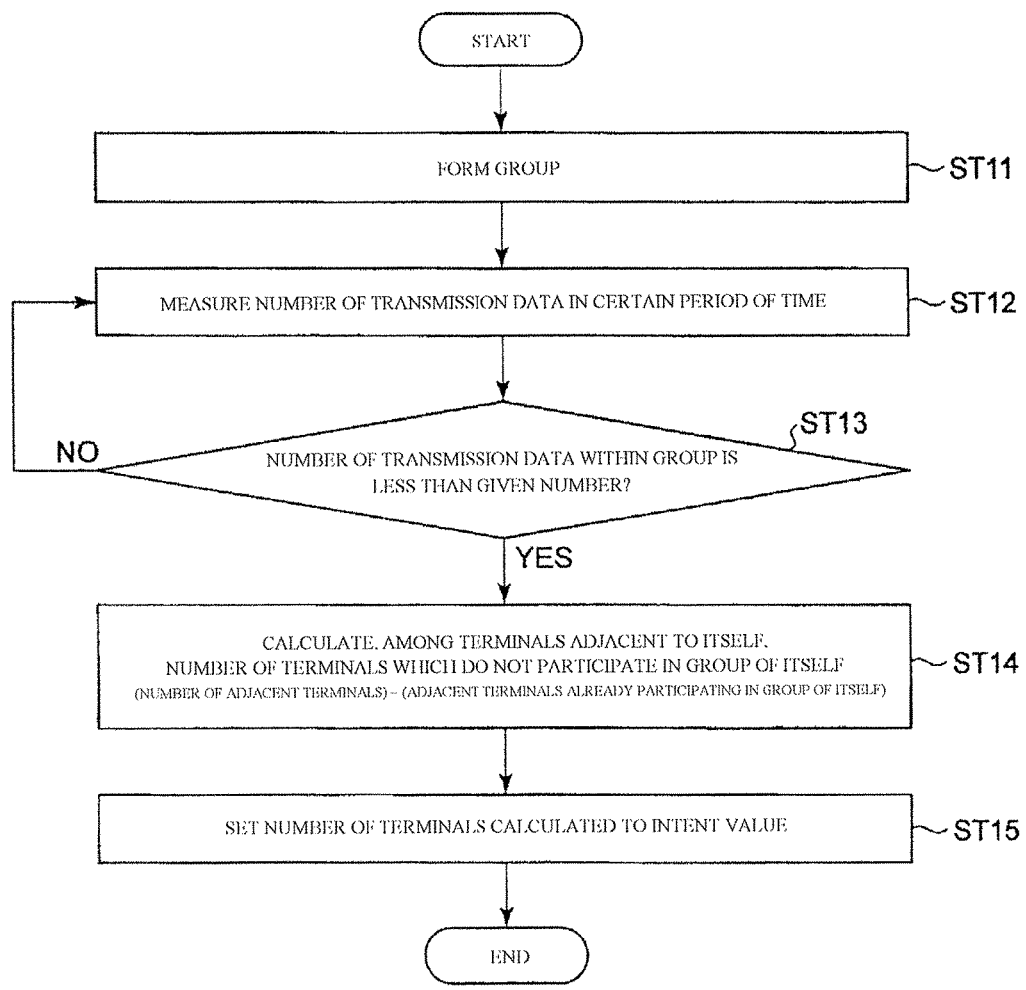
FIG. 23 is a flow chart illustrating a series of processing operations which are performed in the initial state according to the present embodiment.

FIG. 23 is a flow chart illustrating the flow of the processing operation in which in the initial state where no terminal group is formed within the wireless network, the first terminal group is formed and in which the group is dissolved. In the initial state, the state of all the mobile terminals is a state S1 in the state change diagram of FIG. 26.

First, in step ST11, the first terminal group is formed. Specifically, each of the mobile terminals within the wireless network calculates a GO selection priority indicating a priority in which the present terminal is selected as the new GO. Then, a plurality of mobile terminals which calculate the GO selection priorities of themselves within the wireless network select the GO based on the magnitudes of the GO selection priorities by mutual selection while exchanging the GO selection priorities with each other. This corresponds to the change from the state S1 to the state S8 in the state change diagram of FIG. 26. For example, each of the mobile terminals which calculate the GO selection priorities of themselves within the wireless network exchanges the GO selection priorities with other mobile terminals adjacent to the present terminal. Consequently, each of the mobile terminals with the wireless network produces a list of the GO selection priority of itself and the GO selection priorities of all the mobile terminals adjacent thereto, and the mobile terminal which determines that the GO selection priority of the present terminal is the maximum in the list starts the operation as the GO.

For example, when as the GO selection priority, the Intent value described below is used, each of the mobile terminals within the wireless network feeds an adjacent search beacon so as to calculate the number of adjacent node terminals for the present terminal as the Intent value. Then, a plurality of mobile terminals which calculate the Intent values of themselves within the wireless network select the GO based on the magnitudes of the Intent values by mutual selection while exchanging the Intent values with each other. For example, each of the mobile terminals which calculate the Intent values of themselves within the wireless network exchanges the Intent values with other mobile terminals adjacent to the present terminal. Consequently, each of the mobile terminals within the wireless network produces a list of the Intent value of itself and the Intent values of all the mobile terminals adjacent thereto, and the mobile terminal which determines that the Intent value of the present terminal is the maximum in the list starts the operation as the GO.

When in FIG. 20, the GO is temporarily selected based on the GO selection priority on an individual mobile terminal basis calculated according to the method described above, the newly selected GO feeds an adjacent search beacon to other mobile terminals located adjacent thereto so as to make the adjacent node terminal responding thereto participate in the terminal group around the GO. This corresponds to the change of the GO from the state S8 to the state S7 in the state change diagram of FIG. 26. At the same time, this corresponds to the fact that terminals which do not participate in the terminal group receive the adjacent search beacon to change from the state S1 to the state S2 and that then these terminals which connect to the GO as the child node terminals are in the middle of changing from the state S2 to the state S3.

As described above, it is likely that the mobile terminal which newly participates in the terminal group as the child node terminal can be wirelessly connected to the GO through a communication route of two or more hops. In other words, it is likely that the mobile terminal which newly participates in the terminal group as the child node terminal uses, as a relay node, another terminal which has already participated in the terminal group so as to be indirectly connected to the GO. In such a case, not only the GO but also the relay node feeds an adjacent search beacon, and the mobile terminal which responds to the adjacent search beacon from the relay node so as to newly participate in the terminal group becomes a candidate which can be wirelessly connected as the child node terminal to the GO through a communication route of two or more hops. In any case, no matter how many hops the number of hops in the communication route for connection to the GO is, as long as the stability of the communication route between the terminal group and the GO is sufficiently satisfied, each of the mobile terminals around the terminal group responding to the adjacent search beacon fed from the terminal group is connected to the GO so as to participate in the terminal group. This corresponds to the fact that in the state change diagram of FIG. 26, the GO is changed from the state S7 to the state S6 and that each terminal which is connected as the child node terminal to the GO is changed from the state S2 to the state S3.

For example, in FIG. 19, the child node terminal C-A is a child node terminal which is directly connected to the GO without the intervention of another relay terminal so as to newly participate in the terminal group as the adjacent node terminal located in the subsequent hop when seen from the GO. As with the GO, the child node terminal C-A starts to feed an adjacent search beacon. The adjacent search beacon fed by the new child node terminal C-A is, as with the adjacent search beacon fed by the GO, a trigger for making the other unparticipated terminals C-B to C-E located around the terminal group g1 to which the terminal C-A of the beacon feeding source belongs participate in the terminal group.

When the child node terminal C-B shown in FIG. 19 responds to the adjacent search beacon fed by the child node terminal C-A serving as the beacon feeding source, in the second example, the degree of the stability of a communication route which ranges from the terminal C-B to the GO and which has a length of two or more hops with the child node terminal C-A serving as the beacon feeding source used as a relay node is evaluated. For example, the geographical linear distance between the terminal which attempts to newly connect to the GO as the child node terminal and the GO, the number of hops in the communication route between the GO and the terminal which attempts to connect thereto and the like can be used as the indexes for the degree of the stability of the communication route. Moreover, a beacon for communication route diagnosis is reciprocated a plurality of times between the GO and the terminal which attempts to connect thereto, and the communication success rate of the beacon for diagnosis and the average round-trip time of the beacon for diagnosis are measured, with the result that these values can also be used as the indexes for the degree of the stability of the communication route. When the degree of the stability evaluated on the communication route which ranges from the terminal C-B to the GO and which has a length of two or more hops exceeds a predetermined threshold value, the terminal C-B uses the terminal C-A as a relay node to indirectly connect to the GO, and further participates in the terminal group as the new child node terminal. When the degree of the stability evaluated on the communication route which ranges from the terminal C-B to the GO and which has a length of two or more hops is equal to or less than the predetermined threshold value, the terminal C-B does not participate in the terminal group.

As described above, each of the mobile terminals around the terminal group responding to the adjacent search beacon fed from the terminal group participates in the terminal group around the GO if the stability of the communication route with the GO in the terminal group is sufficiently satisfied. Here, it is likely that the terminal which newly participates in the terminal group is wirelessly connected to the GO through a communication route of two or more hops so as to participate in the terminal group.

Then, the processing of the flow chart in FIG. 23 proceeds to step ST12, and the GO measures the number of pieces of transmission data within the terminal group for a certain period of time. This corresponds to an operation of monitoring, by the GO, the height of the activity of the communication within the terminal group. Here, in the state change diagram of FIG. 26, the state of the current GO is the state S6. Then, the processing proceeds to step ST13, and the GO determines whether or not the number of pieces of transmission data within the terminal group drops below a predetermined threshold value. This corresponds to an operation of determining, by the GO, whether or not the activity of the communication within the terminal group drops below a predetermined level. The above-described operation for determining whether or not the activity of the communication within the terminal group drops below the predetermined level can be performed by the child node terminal within the same terminal group as the current GO. In this case, the current GO transmits a monitoring operation start message to one child node terminal which is randomly selected from the same terminal group. Then, the child node terminal receiving the monitoring operation start message starts the operation for monitoring the height of the activity of the communication within the terminal group, and when the child node terminal determines that the activity of the communication within the terminal group drops below the predetermined level, the child node terminal can notify the fact to the GO. In a case where the child node terminal receiving the nomination message from the GO plays a role in controlling the operation of selecting the subsequent new GO and the following operation of dissolving the terminal group, the child node terminal receiving the nomination message can notify the fact that the activity of the communication drops below the predetermined level to the child node terminal receiving the nomination message.

When the number of pieces of transmission data within the terminal group drops below the predetermined threshold value, the processing proceeds to step ST14 whereas when not, the processing returns to step ST12. When the processing proceeds to step ST14, in the state change diagram of FIG. 26, the state of the current GO is changed to the state S5 whereas when the processing returns to step ST12, the state of the current GO remains the state S6.

In step ST14, before the dissolution of the current terminal group, the GO determines that it is necessary to calculate, for each of the terminals within the terminal group, the GO selection priority that is the priority in which each of the terminals is selected as the subsequent new GO. Consequently, based on an instruction message from the GO, each of all the mobile terminals belonging to the terminal group calculates the GO selection priority on an individual terminal basis. Here, in the state change diagram of FIG. 26, the state of the GO is changed from the state S5 to the state S4. A typical specific example of the GO selection priority includes the Intent value which will be described below. Other specific examples of the GO selection priority on an individual terminal basis can include the number of messages (packets) stored in each of the terminals for relay and transfer to the outside of the terminal group and the relative position of each of the terminals within the terminal group before the dissolution of the group.

When the Intent value is used as the GO selection priority, each of all the mobile terminals belonging to the terminal group calculates, according to the calculation method described above with reference to FIG. 21, the number of terminals which do not belong to the same terminal group as the present terminal among the adjacent node terminals adjacent to the present terminal. Here, the adjacent node terminal refers to the adjacent mobile terminal which responds to an adjacent search beacon issued by the present terminal so as to be wirelessly connected as the subsequent hop node to the present terminal. Then, in step ST15, each of all the mobile terminals belonging to the terminal group sets the number of terminals calculated as described above as the Intent value for the present terminal, and transmits it to the GO.

When the "relative position of each of the terminals within the terminal group before the dissolution of the group" is used as the GO selection priority, as the distance between the present terminal and the GO is increased or as the number of hops between the present terminal and the GO is increased, the GO selection priority calculated on the present terminal is increased.

Then, the GO which receives the GO selection priorities from all the child node terminals within the terminal group selects, as the subsequent new GO, the child node terminal which transmits the maximum GO selection priority. Then, the GO transmits, to the selected child node terminal, a selection notification notifying that it is selected as the subsequent new GO, dissolves the current terminal group and completes the flow chart of FIG. 23. The child node terminal receiving the selection notification starts the operation as the subsequent new GO, and feeds an adjacent search beacon in order to form the subsequent new terminal group. Here, in the state change diagram of FIG. 26, the state of the terminal selected as the subsequent new GO is changed from the state S4 to S7.

When the GO is temporarily selected based on the GO selection priority on an individual mobile terminal basis calculated according to the method described with reference to FIG. 21, the newly selected GO feeds an adjacent search beacon to other mobile terminals located adjacent thereto so as to make the adjacent node terminal responding thereto participate in the terminal group around the GO.

Figure 24:
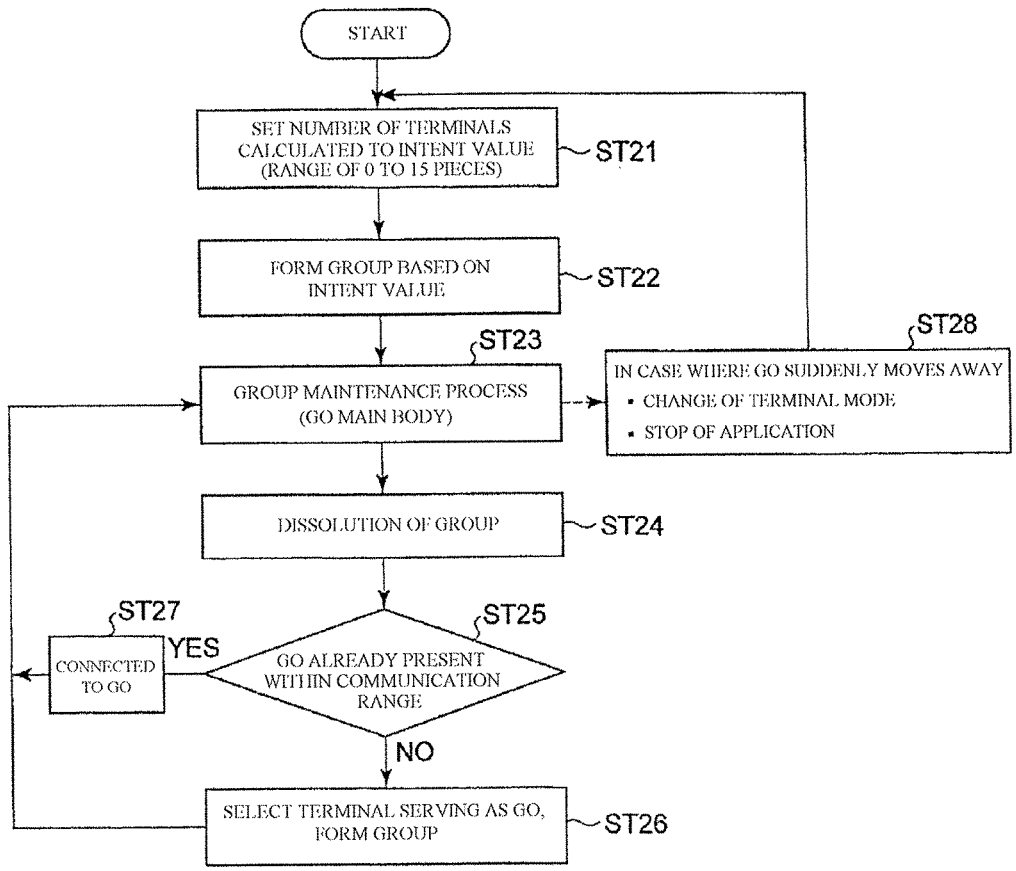
FIG. 24 is a flow chart illustrating a series of processing operations which are performed according to the present embodiment after the start of the repeated execution process of the dissolution/reconstruction of the group.

FIG. 24 is a flow chart illustrating the flow of the processing operation performed in the present embodiment so that the processing operation is started from the initial state where no terminal group is formed and that the repeated execution process of the dissolution/reconfiguration of the terminal group is repeatedly performed.

Although in the following discussion, the case where the Intent value is used as the GO selection priority will be described, as the GO selection priority, the number of packets stored on an individual terminal basis or the relative position of each of the terminals within the terminal group described above can also be used.

First, in step ST21, each of the mobile terminals within the wireless network feeds an adjacent search beacon so as to calculates, as the Intent value, the number of adjacent node terminals for the present terminal. Then, the processing of the flow chart in FIG. 24 proceeds to step ST22. Then, a plurality of mobile terminals which calculate the Intent values of themselves within the wireless network select the GO by mutual selection based on the magnitudes of the Intent values while exchanging the Intent values with each other so as to form a new terminal group around the GO. This corresponds to the fact that in the state change diagram of FIG. 26, the GO starts from the state S8 or the state S4, and is changed to the state S6 through the state S7 and that each of the terminals which are connected as the child node terminals to the GO is changed from the state S2 to the state S3.

Then, the processing of the flow chart in FIG. 24 proceeds to step ST23, and a process for maintaining the terminal group around the GO newly selected in step ST22 is performed. The above-described process for maintaining the terminal group can be performed, for example, according to the procedure described above in steps ST12 and ST13 of the flow chart of FIG. 23.

Then, the processing of the flow chart in FIG. 24 proceeds to step ST24, and the current terminal group around the GO selected in step ST22 is dissolved. As a result of the dissolution of the group, in the state change diagram of FIG. 26, the state of each of the terminals within the dissolved terminal group is changed from the state S5 to the state S4, the terminal selected as the subsequent new GO in the state S4 is changed to the state S7 and the other terminals are changed to the state S2 through the state S1. Then, the processing of the flow chart in FIG. 24 proceeds to step ST25, and each of the mobile terminals which do not belong to the group by the dissolution of the terminal group determines whether or not the existing GO is present within the communication possible range of the present terminal.

When the existing GO is present, each of the mobile terminals which do not belong to the group is wirelessly connected to the GO (step ST27 in FIG. 24) whereas when not, a terminal which becomes the GO between the mobile terminals which do not belong to the group is selected according to the same method as in the flow chart of FIG. 23, and then a new terminal group is formed (step ST26 in FIG. 24).

When in the execution of step ST23, the mobile terminal which is being operated as the GO switches the packet relay transfer operation for relaying the transfer data, for example, from the execution of the MANET system to the execution of the DTN system, the mobile terminal which is selected as the GO cannot continue the operation as the GO. In other words, when in the wireless network environment of FIG. 4, the packet relay transfer operation by the mobile terminal which is selected as the GO is transferred from the MANET mode to the DTN mode, the terminal which transfers to the DTN mode cannot continue the operation as the GO. In such a case, the processing of the flow chart in FIG. 24 proceeds to step ST28, an application program for performing the present embodiment on the mobile terminal is stopped, the processing is returned to step ST21 and the processing of the flow chart in FIG. 24 is restarted from the beginning. This corresponds to the fact that in the state change diagram of FIG. 26, the GO is changed from the state S6 to the state S1 by a "trigger phenomenon J" and that the other child node terminals within the terminal group are changed from the state S3 to the state S1 by the "trigger phenomenon J".

Figure 25:
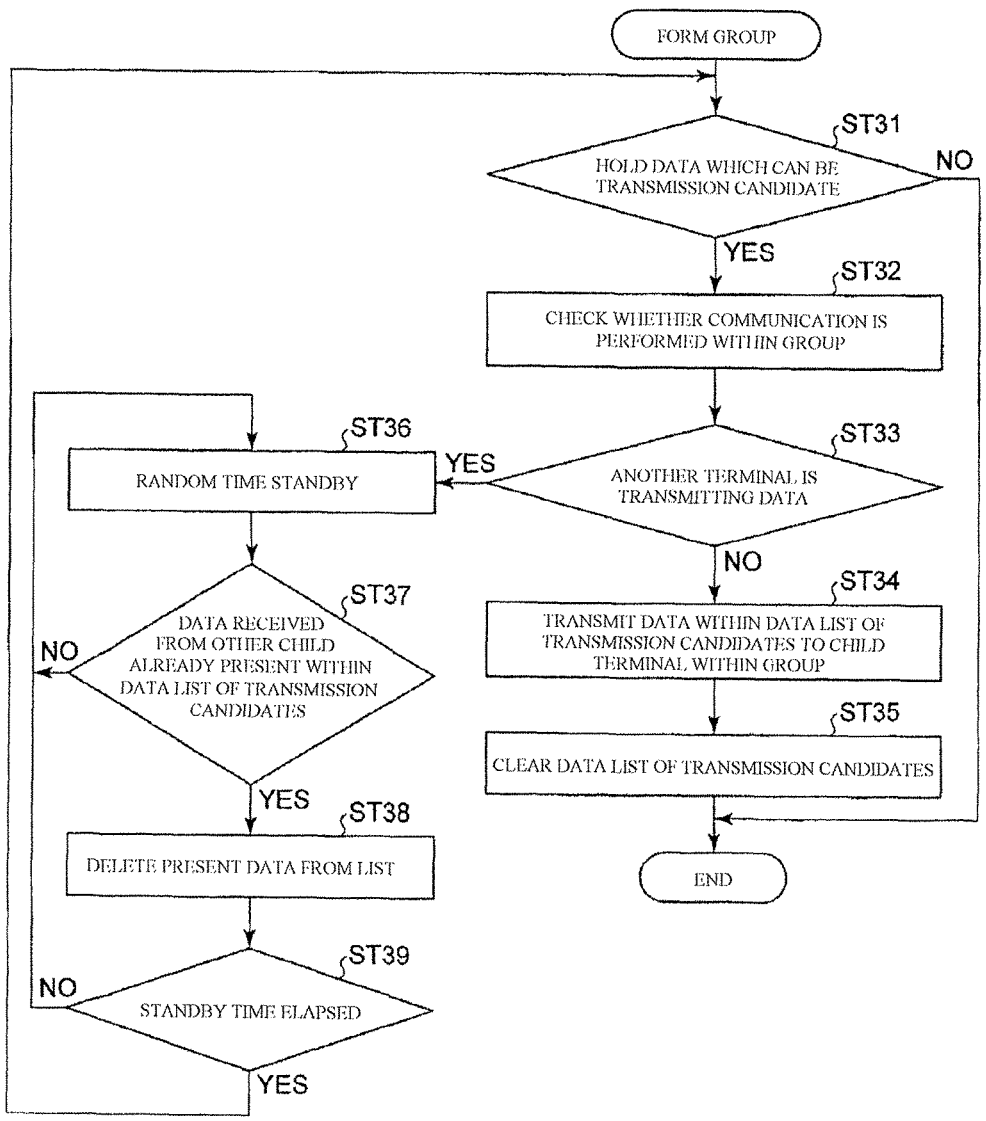
FIG. 25 is a flow chart illustrating an operation of controlling communication within the group after the formation of the group according to the present embodiment.

FIG. 25 is a flow chart illustrating a communication operation which is performed, after the formation of a terminal group, between the mobile terminals within the terminal group.

The processing of the flow chart in FIG. 25 first proceeds to step ST31, and each of the mobile terminals within the terminal group determines whether or not the present terminal holds data for a transmission candidate. When the present terminal holds data for a transmission candidate, the processing of the flow chart in FIG. 25 proceeds to step ST32 whereas when not, the processing of the flow chart in FIG. 25 is completed.

In step ST32, each of the mobile terminals within the terminal group checks whether or not another mobile terminal belonging to the same terminal group is in the process of transmitting data. Then, in step ST33, each of the mobile terminals within the terminal group determines whether or not another mobile terminal belonging to the same terminal group is in the process of transmitting data. When it is in the process of transmitting data, the processing proceeds to step ST36 whereas when not, the processing proceeds to step ST34.

In step ST34 in the flow chart of FIG. 25, each of the mobile terminals transmits, to a transmission destination within the terminal group, all the pieces of data included in a list of data held by the present terminal as the transmission candidate, and then in step ST35, the list of the transmission candidate data is cleared.

In step ST36, each of the mobile terminals within the terminal group is on standby for a random length of time. Then, the processing of the flow chart in FIG. 25 proceeds to step ST37, and each of the mobile terminals within the terminal group determines whether or not data received from another child node terminal belonging to the same terminal group is present in the list of the transmission candidate data. When such data is included in the list, the processing proceeds to step ST38, each of the mobile terminals deletes such data from the list of the transmission candidate data and the processing proceeds to step ST39. When such data is not included in the list, the processing of the flow chart in FIG. 25 returns to step ST36. In step ST39 of the flow chart in FIG. 25, each of the mobile terminals within the terminal group determines whether or not a predetermined standby time has elapsed, and when it has elapsed, the processing of the flow chart in FIG. 25 returns to step ST31 whereas when not, the processing of the flow chart in FIG. 25 returns to step ST36.

<8> Specific Method for Performing Direct Communication Between MANET Mode Terminal and DTN Mode Terminal A method for performing direct communication between the MANET mode terminal and a DTN mode terminal serving as the subsequent hop nodes will be specifically described below with reference to FIG. 28.

FIG. 28 is a diagram showing conditions in which a DTN terminal 100G which is being operated in the DTN mode enters a range capable of performing wireless communication with a wireless ad-hoc network formed with a plurality of MANET terminals 100A to 100F. In FIG. 28, in the wireless ad-hoc network formed with the MANET terminals 100A to 100F, packets are mutually routed in the MANET mode, and the wireless ad-hoc network formed with the MANET terminals 100A to 100F is connected to a communication provider network or the Internet through a gateway node which will be described later.

The gateway node includes wireless access points (AP 200A and AP 200B in FIG. 28) and a base station (BS 300 in FIG. 28) themselves and a wireless terminal which is fixedly guaranteed to be able to constantly perform direct wireless communication with them. For example, a note PC 400 in FIG. 28 is installed in such a fixed position as to constantly perform direct wireless communication with the wireless access point represented by AP 200A in FIG. 28, and thus it is possible to constantly relay communication between the wireless access point 200A and the MANET terminals 100A to 100F. Hence, the note PC 400 can be the gateway node for the MANET terminals 100A to 100F.

Furthermore, the DTN terminal 100G stores packets which need to be transferred in the DTN mode. In FIG. 28, the MANET terminals 100A to 100F overlap each other in the wireless communication coverage, and simultaneously, the DTN terminal 100G is located within the wireless communication coverages of the MANET terminals 100C and 100D. Hence, while the packets stored in the DTN terminal 100G are being transferred in the DTN mode, when the DTN terminal 100G feeds an adjacent search beacon, the MANET terminals 100C and 100D directly receive the adjacent search beacon from the DTN terminal 100G. The adjacent search beacon fed by the DTN terminal 100G can be the IPND (IP Neighbor Discovery) packets in the DTN standard standardized by the Internet Engineering Task Force, and the details of the IPND packets are described in RFC4838 and RFC5050 issued by the Internet Engineering Task Force. Then, each of the MANET terminals 100C and 100D receiving the adjacent search beacon from the DTN terminal 100G calculates the number of hops in the shortest route from the present terminal to the gateway node. The number of hops in the shortest route is the number of hops in a route corresponding to the shortest routing route among one or more routing routes in which the MANET terminal receiving the IPND packets reaches the gateway node through another MANET terminal functioning as a packet relay terminal. For example, in FIG. 28, when the note PC 400 is the gateway node, the number of hops in the shortest route of the MANET terminal 100C is three, and the number of hops in the shortest route of the MANET terminal 100D is two. Then, each of the MANET terminals 100C and 100D stores, in response packets, the IP address of itself and the number of hops in the shortest route of the present terminal, and returns the response packets to the DTN terminal 100G. Then, the DTN terminal 100G receiving the response packets from each of the MANET terminals 100C and 100D associates the IP address and the number of hops in the shortest route included in the received response packets with each other, and stores them within an adjacent node list on an individual terminal basis. The adjacent node list is a correspondence table in which the IP address is associated with the number of hops in the shortest route on an individual mobile terminal basis. Then, the DTN terminal 100G searches the adjacent node list for the IP address of the MANET terminal having the minimum number of hops in the shortest route among the MANET terminals 100C and 100D, and selects it as the IP address of the subsequent hop node on the routing route. For example, in the example of FIG. 28, even when the gateway node is any one of the note PC 400 or the BS (base station) 300, the MANET terminal 100D has a smaller number of hops in the shortest route than the MANET terminal 100C. Hence, the DTN terminal 100G selects the IP address of the MANET terminal 100D as the IP address corresponding to the subsequent hop node. Finally, based on the IP address of the MANET terminal 100D selected as the subsequent hop, the DTN terminal 100G is wirelessly connected to the MANET terminal 100D so as to transfer the data and packets stored. Here, a header portion of the data and packets to be transferred includes the IP address of the MANET terminal 100D and an EID on the final destination node. The EID is the terminal identifier of the final destination node when the data and packets are subjected to the End-To-End transfer by a routing function defined by the DTN standard.

A specific example of an operation in which the MANET terminal 100D to which the data and packets are transferred from the DTN terminal 100G determines the subsequent hop node that is a packet relay destination in the MANET mode routing will then be described.

First, the MANET terminal 100D takes the EID indicating the final destination node of the End-To-End out of the header portion of the data and packets transferred from the DTN terminal 100G, and uses the EID as a key to search for the IP address of the final destination node.

The MANET terminal 100D acquires the final destination IP address which is searched for based on the EID taken out of the header portion of the data and packets. The acquired IP address is an IP address corresponding to the EID indicating the final destination node of the End-To-End. Then, the MANET terminal 100D uses the acquired IP address as the final destination IP address to search for the routing control table 130, and acquires the IP address of the MANET terminal corresponding to the subsequent hop node and wireless interface information.

After acquiring the IP address of the subsequent hop node, the MANET terminal 100D uses the IP address and the wireless interface information acquired so as to be wirelessly connected to the MANET terminal corresponding to the subsequent hop node. Finally, the MANET terminal 100D uses the wireless connection to wirelessly transfer the data and packets to a relay destination.

An operation of the MANET terminal when contrary to the above description, the packets are relayed and transferred from the MANET terminal side to the DTN terminal side will be described below. For example, it is assumed that the final destination terminal of the packets which are relayed and transferred by the MANET terminal with the MANET system is transferred to the DTN mode so as to be the DTN terminal. Then, the MANET terminal side cannot search the routing control table 130 for an adjacent node corresponding to the destination IP address within the packets which is the final destination of the End-To-End. In this way, the MANET terminal is transferred to the DTN mode so as to be the DTN terminal, and simultaneously, stores the packets which need to be relayed and transferred. Then, as described later in the following discussion, when the DTN terminal feeds an adjacent search beacon and detects a response from another DTN terminal to the beacon, the DTN terminal which responds thereto is recognized as an adjacent node, and the packets are relayed and transferred to the adjacent node with the DTN system.

In the network environment of FIG. 28, the gateway node, the wireless access points (AP 200A and AP 200B in FIG. 28) and the base station (BS 300 in FIG. 28) are provided. However, in the embodiment shown in FIG. 28, even when the mobile terminals 100A to 100G shown in FIG. 28 form an independent wireless network without being connected to an electrical communication provider network or the Internet through these access points, since the MANET mode terminal and the DTN mode terminal directly communicate with each other as the subsequent hop nodes, the method described above can be performed.

<9> Comparison and Examination Between the Present Embodiment and Conventional Technology The central diagram in FIG. 29 corresponds to the packet relay transfer system according to the present embodiment, and the left diagram and the right diagram respectively correspond to the packet relay transfer systems of the MANET mode and the DTN mode, which are conventional. FIG. 29 shows that the number of hops which can be reached in the End-To-End is increased in the order of the MANET mode→the present embodiment→the DTN mode. FIG. 29 simultaneously shows that the transmission failure rate of the End-To-End is increased in the order of the MANET mode→the present embodiment→the DTN mode. FIG. 29 simultaneously shows that a capacity capable of relaying and transferring communication data under a predetermined End-To-End arrival probability is increased in the order of the DTN mode→the present embodiment→the MANET mode. FIG. 29 simultaneously shows that a data-drop probability on the End-To-End transfer route is increased in the order of the DTN mode→the present embodiment→the MANET mode.

FIG. 30 shows a case where when it is assumed that a communication success rate per one hop in the End-To-End packet relay transfer is p and that the total number of hops in the End-To-End is N, the expected value E of the number of times the transfer data is resent according to the failure of the End-To-End transfer is calculated as a theoretical value on each of three types of packet relay transfer systems based on the MANET mode and the DTN mode, which are conventional and the present embodiment.

When in FIG. 30, in the End-To-End packet relay transfer based on the conventional MANET mode, the expected value E of the number of times the transfer data is resent by a failure of the transfer corresponding to each arrow is calculated as a theoretical value, the expected value E is as follows:
[Formula 1]

When in FIG. 30, in the End-To-End packet relay transfer based on the conventional DTN mode, the expected value E of the number of times the transfer data is resent by the failure of the transfer corresponding to each arrow is calculated as a theoretical value, the expected value E is as follows:
[Formula 2]

When in FIG. 30, in the End-To-End packet relay transfer based on the present embodiment, the expected value E of the number of times the transfer data is resent by the failure of the transfer corresponding to each arrow is calculated as a theoretical value, the expected value E is as follows:
[Formula 3]

Figure 31:
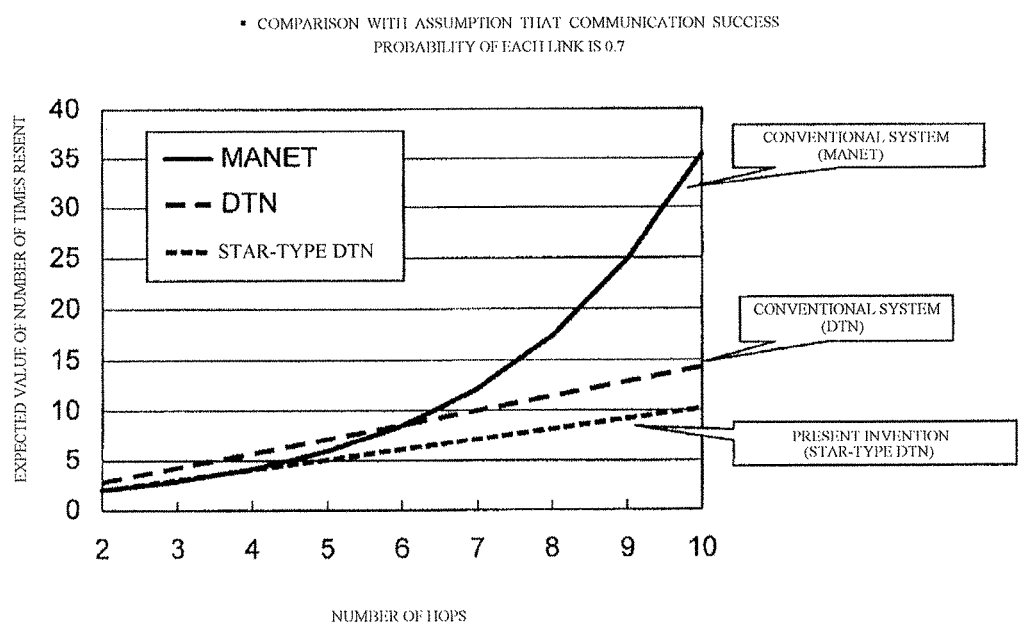
FIG. 31 is a diagram illustrating a comparison between the present embodiment and the conventional technology (MANET and DTN).

When in a two-dimensional graph in which the expected value E of the number of times the transfer data is resent is a vertical axis and in which the number of relay hops in the End-To-End packet relay transfer is a horizontal axis, on each of the three types of packet relay transfer systems "MANET", "DTN" and "present embodiment", the theoretical values of the expected value E are plotted, the results are as shown in FIG. 31. On each of the three types of packet relay transfer systems "MANET", "DTN" and "present embodiment", the theoretical values of the expected value E are calculated from the three types of theoretical formulas shown in FIG. 30.

It is found from the two-dimensional graph of FIG. 31 that as compared with the packet relay transfer systems based on the MANET mode and the DTN mode, which are conventional, in the packet relay transfer system based on the present embodiment, it is possible to reduce the increase in the number of times the transfer data is resent by the failure of the transfer corresponding to each arrow.

<10> Effects of the Present Embodiment

As described above, in the present embodiment, since the existing group is dissolved and reconstructed, and thus a mobile terminal outside the group newly becomes a group fellow with a mobile terminal storing relay data before the dissolution, the relay data is relayed and transferred to the terminal which newly becomes the group fellow within the new group after the reconstruction. Hence, the operation of relaying the transfer data stored within the mobile terminal before the dissolution of the group to the mobile terminal which newly becomes the group fellow from the outside of the group is repeated any number of times by the repeated execution of the dissolution/reconfiguration of the group. Consequently, in the present embodiment, it is possible to realize the multi-hop communication for relaying and transferring the transfer data even if the upper limit (two hops) of the number of relay hops in the star connection-type relay system is exceeded.

At that time, since in the present embodiment, the mobile terminal in which immediately before the dissolution of the group, the number of adjacent node terminals outside the group is the largest is set to the GO for the group after the reconstruction, when seen from the GO, the number of terminals which are newly added to the group fellow from the outside of the group can be maximized after the reconstruction of the group. Consequently, in the present embodiment, in the process in which the dissolution and reconstruction of the group described above are repeated, the efficiency of the spread and the speed of the spread of the stored data in the relay transfer within the group described above can be maximized.

Consequently, in the present embodiment, a wide variety of packet relay systems are used together, and thus it is possible to realize a mechanism which can solve the problems in the reachability of the communication, the scalability of the communication capacity, the efficiency of the communication and the optimization of the efficiency of the consumption of terminal power described above.

INDUSTRIAL APPLICABILITY

In the present invention, in order for a mobile terminal to form an autonomous network with other mobile terminals without the intervention of a wireless access point and a base station so as to realize the function of communicating with each other through the network, it is possible to utilize communication software which can be installed in the mobile terminal. The present invention can also be utilized as a mobile terminal which forms a wireless ad-hoc network with other mobile terminals so as to communicate with each other through the network and as a network system formed with such a mobile terminal.

REFERENCE SIGNS LIST 11 control processor
12 memory
13 storage
14 user input/output device
15 transmission/reception antenna
16 RF transmission/reception circuit
17 baseband processor
18 three-axis acceleration sensor
19 remaining battery capacity meter
20 GPS transmission/reception device
21 bus
22 signal line
23 signal line
100 mobile terminal
101 switching control module
102 APL socket interface
103 MANET model
104 APL socket interface
105 DTN module
106 OS/API
107 TCP/IP socket interface
110 application including user interface
111 MANET/DTN switching determination portion
112 message reception portion
113 received message destination analysis portion
120 MANET transmission portion
130 routing control table
140 DTN transmission portion
141 IPND transmission/reception portion
142 received IPND analysis portion
150 protocol lower layer
160 correspondence table
200 wireless LAN router or wireless access router
300 base station
400 note PC

The invention claimed is:

1. A communication control method including, in a wireless network in which terminal-to-terminal communication of a packet is relayed in units of a terminal group formed with a relay terminal selected from two or more mobile terminals and one or more mobile terminals connected to the relay terminal, a communication control operation of repeatedly performing:

a step in which when any terminal within a first terminal group determines that a communication activity between terminals within the first terminal group drops below a predetermined threshold value, the terminal within the first terminal group selects a new relay terminal based on a priority calculated on an individual mobile terminal basis, and in which the first terminal group is dissolved; and a step in which the selected new relay terminal forms a second terminal group together with a mobile terminal capable of being wirelessly connected to the selected new relay terminal, and in which each mobile terminal within the second terminal group is made to start communication, wherein the priority is calculated such that efficiency of spread of the packet between an unspecified large number of mobile terminals is improved through the dissolution of the first terminal group and the formation of the second terminal group, and a communication route between mobile terminals connected to the relay terminal within the first and second terminal groups and the relay terminal satisfies a predetermined stability condition.

2. The communication control method according to claim 1, wherein the priority is calculated according to a number of mobile terminals which newly participate from an outside of the first terminal group in the second terminal group formed by using each of the mobile terminals as the new relay terminal.

3. The communication control method according to claim 2,
wherein an operation of the calculation of the priority includes:
an operation of calculating a number of mobile terminals capable of being wirelessly connected, from the outside of the first terminal group, in one hop to each of the mobile terminals within the first terminal group on an individual mobile terminal basis within the first terminal group; and
an operation of setting the number of mobile terminals calculated on an individual mobile terminal basis to a value of the priority on an individual mobile terminal basis, and
an operation of the selection of the new relay terminal includes an operation in which the relay terminal collects the value of the priority on an individual mobile terminal basis within the first terminal group, and in which a mobile terminal whose value of the priority is the maximum is selected from the first terminal group as the new relay terminal.

4. The communication control method according to claim 1,
wherein the priority is calculated according to a number of packets stored within each of the mobile terminals within the terminal group by the terminal-to-terminal communication of the packet in units of a terminal group.

5. The communication control method according to claim 4,
wherein in order to respond to reception of an instruction to calculate the priority on an individual mobile terminal basis by each of the mobile terminals within the first terminal group from the relay terminal so as to perform the calculation of the priority, each of the mobile terminals is configured so as to perform:
an operation of calculating, on an individual mobile terminal basis within the first terminal group, the number of packets stored in each of the mobile terminals within the terminal group by the terminal-to-terminal communication of the packet in units of a terminal group; and
an operation of setting the number of packets calculated on an individual mobile terminal basis to the value of the priority on an individual mobile terminal basis.

6. The communication control method according to claim 1,
wherein the priority is calculated according to a relative position of each of the mobile terminals around the relay terminal within the terminal group, and as a number of hops or a distance between each of the mobile terminals and the relay terminal within the terminal group is increased, a higher priority is calculated.

7. The communication control method according to claim 6,
wherein in order to respond to reception of an instruction to calculate the priority on an individual mobile terminal basis by each of the mobile terminals within the first terminal group from the relay terminal so as to perform the calculation of the priority, each of the mobile terminals is configured so as to perform:
an operation in which as the priority on an individual mobile terminal basis within the first terminal group, the priority is calculated according to the relative position of each of the mobile terminals around the relay terminal within the terminal group and in which as the number of hops or the distance between each of the mobile terminals and the relay terminal within the terminal group is increased, a higher priority is calculated; and
an operation of setting, within the present terminal, the value of the priority on an individual mobile terminal basis calculated on an individual mobile terminal basis.

8. The communication control method according to claim 1,
wherein the priority is an average participation duration S [sec] in which each of the mobile terminals participates in a group in a certain period of time in past, an average time A [sec] of a transmission time or a reception time of transfer data by each of the mobile terminals in a certain period of time in past or the priority determined, using a parameter W to assign a weight to these two times, by priority $P=W \times S+(1-W) \times A$ (where W is a value of 1 to 0).

9. The communication control method according to claim 8,
wherein in order to respond to reception of an instruction to calculate the priority on an individual mobile terminal basis by each of the mobile terminals within the first terminal group from the relay terminal so as to perform the calculation of the priority, each of the mobile terminals is configured so as to perform:
an operation in which as the priority on an individual mobile terminal basis within the first terminal group, the priority is calculated as an average participation duration S [sec] in which each of the mobile terminals participates in a group in a certain period of time in past, an average time A [sec] of a transmission time or a reception time of transfer data by each of the mobile terminals in a certain period of time in past or, using a parameter W to assign a weight to these two times, by priority $P=W \times S+(1-W) \times A$ (where W is a value of 1 to 0); and
an operation of setting, within the present terminal, the value of the priority on an individual mobile terminal basis calculated on an individual mobile terminal basis.

10. The communication control method according to claim 1,
wherein an operation of the formation of the second terminal group by the selected new relay terminal includes an operation in which among mobile terminals responding to a terminal discovery signal fed from the relay terminal, only a mobile terminal where a geographical linear distance with the relay terminal and/or a number of hops in a communication route with the relay terminal drops below a predetermined threshold value is connected to the relay terminal such that the terminal group is formed.

11. The communication control method according to claim 1,
wherein the operation of the formation of the second terminal group by the selected new relay terminal includes, on each of the mobile terminals responding to the terminal discovery signal fed from the relay terminal:
a stage in which a beacon for diagnosis is reciprocated a plurality of times with the relay terminal;

a stage in which a communication success rate of the beacon for diagnosis and/or an average round-trip time of the beacon for diagnosis is measured; and a stage in which only when the communication success rate and/or the average round-trip time drops below a predetermined threshold value, the connection to the relay terminal is allowed.

12. The communication control method according to claim 1, wherein in an initial state where none of the terminal groups are formed within the wireless network, each of the mobile terminals within the wireless network calculates the priority of the present terminal and then exchanges the calculated priority with the other mobile terminals, the priority calculated on an individual mobile terminal basis is calculated according to a number of the other mobile terminals which can be wirelessly connected in one hop to each of the mobile terminals, and among the mobile terminals within the wireless network, a mobile terminal which determines that the priority of the present terminal is the maximum starts an operation of a relay terminal in a terminal group that is first formed from the initial state.

13. The communication control method according to claim 1, wherein each of the mobile terminals includes a plurality of channels for communication, is configured so as to perform multiplex communication with the other mobile terminals, respectively allocates frequency regions and/or time regions divided to the channels and is set such that the channels are respectively used for different applications.

14. A mobile terminal that is operated in a wireless network in which terminal-to-terminal communication of a packet is relayed in units of a terminal group formed with a relay terminal selected from two or more mobile terminals and one or more mobile terminals connected to the relay terminal, the mobile terminal comprising:

a control portion which controls a communication operation of the mobile terminal; and a wireless transmission/reception portion which transmits and receives data to and from another mobile terminal, wherein the control portion is configured so as to perform, when the present terminal is selected as the relay terminal within a first terminal group:

an operation of instructing, when a communication activity between terminals within the first terminal group drops below a predetermined threshold value, the wireless transmission/reception portion to feed an instruction to calculate a priority on an individual mobile terminal basis to each of the mobile terminals within the first terminal group; and an operation of instructing the wireless transmission/reception portion to collect, from each of the mobile terminals, the priority calculated on an individual mobile terminal basis within the first terminal group and to feed, to a mobile terminal selected based on the priorities collected, a notification indicating that the mobile terminal is selected as a new relay terminal, the priority is calculated such that efficiency of spread of the packet is improved between an unspecified large number of mobile terminals through dissolution of the first terminal group and formation of a second terminal group and a communication route between mobile terminals connected to the relay terminal within the first and second terminal groups and the relay terminal satisfies a predetermined stability condition.

15. The mobile terminal according to claim 14, wherein the control portion is further configured so as to perform, when the present terminal is not selected as the relay terminal within the first terminal group:

an operation of instructing, when the notification is received through the wireless transmission/reception portion, the wireless transmission/reception portion to feed a terminal discovery signal to the other mobile terminals so as to form the second terminal group; and an operation of wirelessly connecting the present terminal to the new relay terminal through the wireless transmission/reception portion when the terminal discovery signal is received from the new relay terminal through the wireless transmission/reception portion.

* * * * *